(12) United States Patent
Sim

(10) Patent No.: US 7,181,523 B2
(45) Date of Patent: Feb. 20, 2007

(54) METHOD AND APPARATUS FOR MANAGING A PLURALITY OF SERVERS IN A CONTENT DELIVERY NETWORK

(75) Inventor: Siew Yong Sim, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 1097 days.

(21) Appl. No.: 09/681,669

(22) Filed: May 18, 2001

(65) Prior Publication Data

US 2002/0083118 A1 Jun. 27, 2002

Related U.S. Application Data

(62) Division of application No. 09/681,644, filed on May 15, 2001, now Pat. No. 6,970,939.

(60) Provisional application No. 60/266,286, filed on Oct. 26, 2000.

(51) Int. Cl.
*G06F 13/00* (2006.01)
(52) U.S. Cl. ........................ 709/226; 709/220; 709/224; 709/238
(58) Field of Classification Search ................ 709/201, 709/202, 203, 220, 223, 224, 226; 718/102, 718/104, 105
See application file for complete search history.

(56) References Cited

U.S. PATENT DOCUMENTS 4,466,060 A 8/1984 Riddle (Continued)

FOREIGN PATENT DOCUMENTS

EP 0 967 559 A1 12/1999

OTHER PUBLICATIONS

Dilly et al. "Enhancement and Validation of Squid's Cache Replacement Policy", HP Labs Technical Reports, HPL-1999-69, pp. 1-18, May 1999. http://www.hpl.hp.com/techreports/1999/HPL-1999-69.pdf.

(Continued)

*Primary Examiner*—Viet D. Vu
(74) *Attorney, Agent, or Firm*—Blakely, Sokoloff, Taylor & Zafman LLP

(57) ABSTRACT

Large payload files are selectively partitioned in blocks and the blocks distributed to a plurality of distribution stations at the edge of the network qualified to have the data. Each qualified station decides how much and what portion of the content to save locally, based on information such as network location and environment, usage, popularity, and other distribution criteria defined by the content provider. Different pieces of a large payload file may be available from different nodes, however, when a user requests access to the large payload file, for example, through an application server, a virtual file control system creates an illusion that the entire file is present at the connected node. However, since only selective portions of the large payload file may actually be resident at that node's storage at the time of request, a cluster of distribution servers at the distribution station may download the non-resident portions of the file as the application server is servicing the user. The download may be in parallel and usually from the least congested nodes. New nodes added to the network learn from other nodes in the network what content they should have and download the required content, in a desired amount, onto their local storage devices from the nearest and least congested nodes without interrupting network operation. Each node manages its local storage and decides what content to prune based on information such as usage patterns.

25 Claims, 33 Drawing Sheets

U.S. PATENT DOCUMENTS

| | | | | |
|---|---|---|---|---|
| 4,914,571 | A | 4/1990 | Baratz et al. | |
| 5,079,767 | A | 1/1992 | Perlman | |
| 5,367,698 | A | 11/1994 | Webber et al. | |
| 5,630,184 | A | 5/1997 | Roper et al. | |
| 5,751,968 | A | 5/1998 | Cohen | |
| 5,812,773 | A | 9/1998 | Norin | |
| 5,872,773 | A | 2/1999 | Katzela et al. | |
| 5,903,566 | A | 5/1999 | Flammer, III | |
| 5,905,847 | A | 5/1999 | Kobayashi et al. | |
| 5,924,094 | A | 7/1999 | Sutter | |
| 5,924,116 | A | 7/1999 | Aggarwal et al. | |
| 5,926,101 | A | 7/1999 | Dasgupta | |
| 5,991,804 | A | 11/1999 | Bolosky et al. | |
| 6,014,701 | A | 1/2000 | Chaddha | |
| 6,038,061 | A | 3/2000 | Sugaya | |
| 6,038,601 | A | 3/2000 | Lambert et al. | |
| 6,081,840 | A | 6/2000 | Zhao | |
| 6,088,333 | A | 7/2000 | Yang et al. | |
| 6,105,029 | A | 8/2000 | Maddalozzo, Jr. et al. | |
| 6,108,703 | A | 8/2000 | Leighton et al. | |
| 6,145,089 | A * | 11/2000 | Le et al. | 714/4 |
| 6,212,240 | B1 | 4/2001 | Scheibel et al. | |
| 6,222,530 | B1 * | 4/2001 | Sequeira | 715/500.1 |
| 6,269,080 | B1 | 7/2001 | Kumar | |
| 6,356,903 | B1 | 3/2002 | Baxter et al. | |
| 6,363,416 | B1 * | 3/2002 | Naeimi et al. | 709/209 |
| 6,370,146 | B1 | 4/2002 | Higgins et al. | |
| 6,374,336 | B1 | 4/2002 | Peters et al. | |
| 6,415,373 | B1 | 7/2002 | Peters et al. | |
| 6,427,212 | B1 | 7/2002 | Frey, Jr. | |
| 6,456,599 | B1 | 9/2002 | Elliott | |
| 6,460,039 | B1 | 10/2002 | Pinter et al. | |
| 6,460,087 | B1 | 10/2002 | Saito et al. | |
| 6,498,795 | B1 | 12/2002 | Zhang et al. | |
| 6,502,125 | B1 | 12/2002 | Kenner et al. | |
| 6,515,967 | B1 | 2/2003 | Wei et al. | |
| 6,523,064 | B1 | 2/2003 | Akatsu et al. | |
| 6,523,069 | B1 | 2/2003 | Luczycki et al. | |
| 6,535,869 | B1 | 3/2003 | Housel, III | |
| 6,587,866 | B1 * | 7/2003 | Modi et al. | 718/105 |
| 6,647,408 | B1 * | 11/2003 | Ricart et al. | 718/105 |
| 6,691,165 | B1 | 2/2004 | Bruck et al. | |
| 6,691,312 | B1 | 2/2004 | Sen et al. | |
| 6,708,217 | B1 | 3/2004 | Colson et al. | |
| 6,711,607 | B1 * | 3/2004 | Goyal | 709/203 |
| 6,718,361 | B1 | 4/2004 | Basani et al. | |
| 6,718,486 | B1 * | 4/2004 | Roselli et al. | 714/41 |
| 6,748,447 | B1 | 6/2004 | Basani et al. | |
| 6,760,765 | B1 | 7/2004 | Asai et al. | |
| 6,765,868 | B1 | 7/2004 | Dunn et al. | |
| 6,772,209 | B1 | 8/2004 | Chernock et al. | |
| 6,772,217 | B1 | 8/2004 | Baumann et al. | |
| 6,772,337 | B1 | 8/2004 | Yener | |
| 6,785,704 | B1 | 8/2004 | McCanne | |
| 6,842,896 | B1 * | 1/2005 | Redding et al. | 717/172 |
| 6,845,396 | B1 | 1/2005 | Kanojia et al. | |
| 6,922,724 | B1 * | 7/2005 | Freeman et al. | 709/223 |
| 6,931,397 | B1 | 8/2005 | Sundaresan | |
| 6,970,939 | B2 | 11/2005 | Sim | |
| 6,993,587 | B1 * | 1/2006 | Basani et al. | 709/229 |
| 7,093,000 | B1 * | 8/2006 | Yamagishi et al. | 709/219 |
| 2002/0040479 | A1 | 4/2002 | Ehrman et al. | |
| 2002/0059325 | A1 * | 5/2002 | Beizer et al. | 707/203 |
| 2002/0073086 | A1 | 6/2002 | Thompson et al. | |
| 2002/0112069 | A1 | 8/2002 | Sim | |
| 2002/0138640 | A1 | 9/2002 | Raz et al. | |
| 2003/0099202 | A1 | 5/2003 | Lear et al. | |

OTHER PUBLICATIONS

Gruber, S. et al., "Design Considerations for an RTSP-Based Prefix-Caching Proxy for Multimedia Streams", AT&T Labs Research, Sep. 7, 1999, 21 pgs.

Mui, Allen et al., "Performance Analysis of a Dynamic Parallel Downloading Scheme from Mirror Sites Throughout the Internet", 6892 Term Paper, Dec. 1999, pp. 1-13.

Noghami, B. et al., "A Novel Approach to Reduce Latency on the Internet: Component-Based Download", Dept. of Electrical and Computer Engineering, University of Manitoba, Jun. 2000, 6 pgs.

Rodriguez, P. et al., "Parallel-Access for Mirror Sites in the Internet", Infocom 2000, 19th Annual Joint Conference of the IEEE Computer and Communications Societies, IEEE Tel Aviv, Israel, Mar. 26-30, 2000, pp. 864-873.

Search Report for PCT/US01/42816; mailed Dec. 8, 2002; 2 pages.

Search Report for PCT/US01/32638; mailed Jan. 30, 2003; 3 pages.

* cited by examiner

METHOD AND APPARATUS FOR MANAGING A PLURALITY OF SERVERS IN A CONTENT DELIVERY NETWORK

CROSS REFERENCE TO RELATED APPLICATIONS

This application is a divisional of U.S. application Ser. No. 09/681,644, filed on May 15, 2001, entitled "Method and Apparatus For Large Payload Distribution in a Network," now U.S. Pat. No. 6,970,939 which claims the benefit of U.S. Provisional Application Ser. No. 60/266,286, filed on Oct. 26, 2000, entitled "Large Payload Delivery Networks Having Integrated Content Management Services," the specification of which is herein incorporated by reference.

BACKGROUND OF INVENTION

This invention relates to the field of content delivery. More specifically the invention relates to delivering large payloads (i.e., files) closer to users in a network environment.

Content delivery in a network environment involves sending information (e.g., in the form of a file) from a content provider to multiple content servers which may serve their content to multiple users residing at various destinations on the network. The content provider generally puts the information that is to be distributed onto a computer connected to a network. This computer is often referred to as a content server. Any client-server or peer-to-peer communication protocols may be applied for a content server to further transfer the information to a group of content servers in the same or different networks that are assigned to serve the information. The source content server is usually called the origin server. The information resides in a file on a content server and is available to users of the network. When users request access to the information, the contents of the file are delivered from any of the content servers that are assigned to serve the content to the requesting users using the desired file transfer protocol (i.e., method of transfer). A content server may receive the information from an origin server before any user request, or it may retrieve the information from an origin server upon user request. A content server may be assigned to serve information from multiple origin servers, and an origin server may forward only part of its information to a set of content servers. The owner of the content servers is usually called content delivery network (CDN) provider. In a network such as the Internet, for example, a user may access the network via an Internet Service Provider (ISP) connecting through a central office (CO) of a telephone company or a head end (HE) of a cable company. Thus, the ISP acts as the user's gateway to the Internet. Examples of ISPs include America On Line™ (AOL™) and Earthlink™ Some telephone companies and cable companies are also ISPs. ISPs may interconnect to each other's network, they may connect to a backbone provider, telephone company's network, cable company's network, or any private or public network. Backbone providers provide high bandwidth connectivity for ISPs, enterprise, etc. Through the ISP, CO, or HE, the user may access services (e.g., data) available from content providers from any content servers in the network.

Various types of data (i.e., information) may be transmitted over a network. For example, when a user desires access to web pages, text documents, application programs, static images, audio, video, or any other type of data available from a remote content server, the contents of the files containing the desired data (i.e., information) must then be delivered to the user from the content server. Files containing web pages and text documents are generally small compared to some other file types, such as files containing video or multimedia data. Therefore, transferring a web page from a content server in a remote location, such as Australia, to a user in United States may take less than a few seconds. However, transferring a video file, for example, may take minutes to hours depending on the size of the video file and the speed of the users connection. Such transfers place a huge demand on the network that may result in lost data. For example, when data is sent across the Internet the receiving system may not receive all of the data transmitted from the content server. This is because the data packets (data is generally transferred in packets) may pass through some routers where some packets may be dropped due to congestion. The receiving system notifies the server of the missing data so that it may resend the data. In some cases, dropped packets can slow or halt the delivery of content because if many servers keep resending data to their clients, the routers get even more congested and thus more dropped packets.

Network-based content delivery that relies on a single source to simultaneously distribute various types of information to multiple remote locations may, depending on the size of files being transferred, encounter network-loading problems around the server or the server itself may be over tasked. For example, since transferring a small file (e.g., a web-page) usually takes only a few seconds, the massive distribution of a small file from one source to thousands of destination locations may not create large impact on the network traffic near the source. Transferring a large file (i.e., a large payload), in contrast, can take tens of minutes to hours. If the distribution of such payloads relies on a single source, the network performance near the source, and the subsequent delivery of content, could degrade severely and become unacceptable.

Therefore, while it may be acceptable to rely on a single source to distribute small files (e.g., web pages, text, or small images), the potential for server and/or network overload calls for using multiple sources to distribute large files to multiple clients.

The fast-paced expansion of the broadband industry has fueled the push for rich media (e.g., full length movies, video, or other types of multimedia data). Broadband technology brings high-speed connection capabilities for content delivery to remote users hence large payloads can be transferred faster. Also, broadband technology makes it possible to send audio and/or video data using streaming media whereby the data is sent in streams for real-time playback, for example. Thus, the quality of rich media at the user's terminal, more than that of any other type of information, is now more dependent on the performance capabilities of the delivery technology. In order to minimize delivery delays, network congestion, and other related problems, some systems attempt to locate content on server systems that are located in close proximity to, i.e., a few hubs of connections away from the end-users. These server locations approximately define the concept known as the "edge" of the network. For example, the Internet service providers are in close proximity to the end-user thus may be regarded as being at the edge of the network. When servers are placed in such locations, the servers are said to be at the edge of the network. End-user systems that are configured to obtain content from network nodes located at the edge of the network are therefore beyond the edge of the network (a.k.a. last mile). However, it is important to note that systems located beyond the edge of the network are still coupled to the network and capable of communicating with the server computers located at the edge. Placing content at the edge of the network is advantageous because it can reduce the latency in servicing users located beyond the edge. Current approaches for delivering large payloads to the "edge" consist of mirroring or caching. These approaches and the limitations inherent in each approach will now be discussed in detail so as to give the reader an understanding of the advancements made by the invention.

Caching

A simple example of caching is web caching. In its simplest form, web caching involves a cache appliance located between a client user and an origin server such that data fetched once from the origin server is saved in the cache device (appliance) to service subsequent requests for the same data. An illustration of caching is shown in FIG. 1, for example. A client user at browser 104 in Local Area Network (LAN) 108 desiring to obtain data available from origin server 100 enters the Universal Resource Locator (URL) address of the desired data into browser 104. LAN 108 may be an ISP's network, for example. The request is forwarded to cache appliance 102, which is an HTTP (Hyper Text Transport Protocol) proxy server in this illustration. The proxy server which may, for example, be owned by the ISP is typically located at the ISP's local network. Like any other server, proxy servers (cache appliance) 102 and 103 are computers with local processing and memory. A subset of that memory is known as the proxy cache. Cache is generally used as temporary storage for frequently used information. Note that, although only one cache appliance is shown in each ISP's local area network of FIG. 1, an actual implementation may have more than one cache appliance in an ISP's local area network.

Proxy server (i.e., cache appliance) 102 processes the request received from client at browser 104 and searches its cache (i.e., memory) for the requested data, if the data is not available in its cache, proxy server 102 forwards the request to origin server 100 via network router 101. In this illustration, network router 101's sole purpose is to forward requests to origin server 100. Origin server 100 is an HTTP server with single TCP/IP (Transmission Control Protocol/Internet Protocol) connection path 110 to client user at browser 104.

Origin server 100 services the request and forwards the requested data to cache appliance 102. Upon receipt of the data, cache appliance 102 may save the data in its local cache memory and also forwards it to browser 104. The data is said to be cached in HTTP proxy (cache appliance) 102. A subsequent client user at browser 105 desiring the same data gets their request serviced by HTTP proxy server (cache appliance) 102 without the request being forwarded to HTTP server 100. However, users 106 and 107 at LAN 109 requesting the same data would have their initial request serviced by HTTP server 100 because users 106 and 107 are not connected through HTTP proxy 102 which has the data cached in memory. Instead, HTTP proxy 103 would perform the same processes as discussed above for HTTP proxy 102 to obtain and cache the data in its memory. Thus, proxy servers 102 and 103, which are said to be at the edge of the network, are populated upon user demand.

Once the data is cached in HTTP proxy 102 and 103, origin server 100 would not need to service requests for the same data from users connecting through HTTP proxy servers 102 and 103. By caching the data at various proxy servers closer to the users, delivery of content is distributed thereby reducing the load around the network server. How-ever, caching is only good for delivering static content data that is fixed in memory such as static web pages. Caching does not work for dynamic information such as services (e.g., functions, transactions, etc.), streaming media, or any other type of dynamic information.

The HTTP protocol is well known to those of ordinary skill in the arts; therefore software to perform the caching function at HTTP proxy servers 102 and 103 is readily available. However, this is not the case with streaming media because different providers of streaming servers use differing protocols to transmit data to the recipient player (e.g., a browser). FIG. 2 is an illustration of a typical streaming server connection to a player.

In contrast to HTTP TCP/IP connections to the browser, Streaming server 200 is connected to player 201 via three connection paths. Path 202 is the Real-Time Streaming Protocol (RTSP) connection. RTSP is a protocol that provides for control over delivery of data with real-time properties such as audio and video streams. RTSP contains a description of media data and provides playback controls such as play, rewind, fast-forward, and pause to player 201. Playback may be done with an offset so that a player can start receiving the data from a specified point. For example, when player 201 rewinds, a different offset, corresponding to the desired playback position, is sent to streaming server 200 and incoming data is sent through path 203 starting from the new offset. Path 203 utilizes the Real-Time Transport Protocol (RTP) and may contain the data being played back. The third connection, path 204, utilizes the RTP Control Protocol (RTCP) and it may provide flow control of the data.

Caching does not work well for streaming media because the various providers of streaming servers use differing intelligence to compute the data being sent over connection 203 as a function of the offset and the flow control. Moreover, server providers do not follow a common standard, therefore placing a cache appliance between streaming server 200 and player 201 would not be readily feasible unless the intelligence, which in today's implementation is in the streaming server, is included either in the streams of information being sent over the connection paths, or if the cache appliance contains the intelligence used by every streaming server provider. Thus, existing systems do not currently provide a viable way to cache streaming media data. Also, since caching is usage based, when content is not cached the proxy will need to fetch the content hence there is a potential for misses and there is no guarantee of quality.

Despite these limitations, caching has advantages such as ease of growth because a new cache appliance can be added anywhere and it will be up and running; a cache appliance can be shared by different content providers; and a cache appliance is very lightweight (i.e., does not require special configuration) and thus easier to manage.

Mirroring

Mirroring is a scheme for providing content-delivery to users at the "edge" of the network that addresses many of the limitations of centralized systems by replicating content to the edge of the network, thereby minimizing the distance between where content is requested and where it is served. In so doing, mirroring saves network bandwidth as compared to delivery to multiple users from one centralized source. The fundamental principles underlying mirroring includes central control of content and the network, efficient distribution of content to the servers at the edge of the network, and automatic redirection of content requests from a user to a local edge server.

In mirroring, file servers are placed throughout the network (e.g., Internet), close to where the content requests originate. This principle mirrors some of the functionality of caches, but with distinct differences. In particular, these file servers work together in a centrally controlled collaborative fashion to ensure overall network performance. Like a cache, content is replicated from the origin server to the server only once, regardless of the number of times the content is served. However, mirroring provides greater content control. By pre-populating the server, the content will be available for fast delivery to the user, eliminating cache misses and increasing the hit rate. Mirroring, in combination with caching, delivers a better-integrated solution with the benefits of both approaches.

One URL applies to all the servers in a mirroring implementation. When a browser requests the URL, the system determines a local delivery server based on: geographical and network location; presence of content; and current status of server (both availability and load).

FIG. 3 is an illustration of a network content delivery scheme employing mirroring to push content to the edge of the network. Assuming boundary 300 represents the edge of the network, mirroring locates file servers (e.g., FS 301–308) at the edge, as shown in FIG. 3. In this illustration, File Server 301 is the master server controlling all other file servers (e.g., 302–308). All content that needs to be pushed to the edge are loaded into master server 301, and then replicated into all the other file servers 302–308 using a preferred push method. For example, the content could be replicated using the multicast method discussed below.

Unlike caching, where the content must be static (i.e., does not change with time), mirroring works well for non-static data such as transactions because transaction data can be synchronized from the master server (e.g., FS 301) to the file servers at the edge of the network (e.g., FS 302–308). The various methods of replicating data to file servers at the edge may include broadcast, a transmission from the master server to all listening file servers in the network; anycast, a transmission to the nearest group of servers; unicast, a transmission to a specific receiver; and multicast, a transmission to multiple specific receivers (a more detailed discussion of multicasting is discussed below). Once content is delivered at the edge, a user at browser 330 requesting access to content is automatically routed to the geographically closest server (e.g., server 307) that is able to service that request.

Mirroring also works well for streaming media. Streaming servers can be attached to any of file servers 301–308 to provide service closest to where it is needed. For example, by attaching a streaming server 310 to file server 302 a user at player 320, in the geographic vicinity of file server 302, can playback streaming media data without much latency. Thus, in mirroring implementations, streaming servers can be attached to any of the file servers to overcome the limitations of caching. However, current methods suffer significant disadvantages, for example, a large object such as video that is popular may create a hotspot on a disk because of repeated access to the content and because disk input/output bandwidth is limited. Moreover, the large object needs to be fully transferred to either the application server or the cache appliance before satisfaction of an end-user client request for the data may commence thereby creating potential latency issues.

Mirroring, also, can be very expensive due to scalability issues, storage limitations, management costs, and inadequate load balancing. Scalability issues arise from the need to store entire large files, such as video, within a storage media. Therefore, new storage must be added to all the file servers in the network when available storage is inadequate for storing a particular large file. Since all the file servers in the network must maintain the same file configuration, upgrading all the file servers in the mirroring environment could prove to be very expensive. Additionally, new file servers brought into the network would need to be configured to conform to all other file servers in the network.

Adding more storage requires rack space for mounting the new storage devices. Rack space is usually limited and sometimes expensive. Moreover, as storage capacity increases, more system administration functions (e.g., backup) are needed to manage the configuration. Since cost of system administration is expensive and rack space is limited, mirroring suffers.

Content Distribution Using Multicast

Multicast is simultaneous communication between a single sender and multiple selected receivers on a network. FIG. 4 is an illustration of a distribution network that uses multicast technology to push information to multiple content servers on a network.

The source provider uploads the large payload (e.g., video file, image data, or any other file having a size significant enough to strain network resources) onto the root server 400 which may be, for example, a content server located in Los Angeles. The root server may also be referred to as the origin server. Root server 400 subsequently multicasts the video data to multiple servers (e.g., servers 401 through 403) that are at the second level of the network server tree, usually in differing geographical locations. For example, server 401 may be located in San Diego, server 402 in San Jose, and server 403 in San Francisco. After receiving the video data, servers 401 through 403 will multicast the video data to servers in the next level of the server tree. For example, server 401 multicasts the data to servers 404 through 406, server 402 multicasts the data to servers 407 through 409, and server 403 multicasts the data to servers 410 through 412. In this illustration, each server multicasts to three other servers, however, most implementations involve multicast to more than three servers (e.g., ten servers).

After the video data is distributed amongst servers 400 through 412, the video data becomes available from multiple servers that are located in different geographical localities on the network. This distribution method pushes content to the edge into a mirroring type architecture where user requests may be serviced from one of multiple servers, usually from the geographically closest server. Multicasting the entire large payload file may still cause congestion due to insufficient capacity on a particular communication link; network equipment congestion due to processing speed of networking equipment; server congestion due to data processing speed of the server; and latency in the network due to the time associated with the data traveling over long distances.

Load Balancing

Load balancing is the task of distributing the network load and the processing load to a cluster of servers to improve system performance, while simultaneously increasing the reliability of the service provided by the servers. A load balancer is often implemented as either a switch or a router and called a load balancing switch or a load balancing router respectively. A load balancer's network interface, the Virtual IP address (VIP), serves as a virtual external interface for the server cluster. Each server in a cluster has both an internal (local IP address) and an external (IP address) network interface. Most load balancers provide a feature called Network Address Translation (NAT), which translates VIP to a local IP address, which are useable on the Internet. A load balancer accepts all data packets addressed to its VIP, and distributes them equally to the most available servers.

A load balancer maintains a state table (e.g., what server is servicing what client), so that data packets of a persistent session flow to and from the same client and server end points. Many load balancers have a configurable "sticky" feature that distributes data packets from a client to the same server that the client was previously connected to. The "sticky" feature allows a server to intelligently prepare for possible future requests from its clients.

Load balancers can typically operate in either a "regular" (i.e., non-transparent) mode or a "transparent" mode. The difference between "regular" mode and "transparent" mode lies in the management of inbound and outbound data flow. In "regular" mode, all inbound traffic to and outbound traffic from the server cluster passes through the load balancer. In "transparent" mode, outbound traffic from the server cluster bypasses the load balancer by flowing directly through an IP router. The "transparent" mode can be extremely important for a network of servers delivering large amounts of data, as it reduces the overall load on the load balancing router and thus improves network performance. When a load balancer is operating in "transparent" mode, it does not translate the destination IP in the inbound packets from clients to its server cluster. An IP router must be connected both to the load balancer and the server cluster to do this. The servers in the server cluster are then configured with a loop back interface using the IP address of the load balancer and with a default route to the IP router.

Most load balancers provide either a remote or local Application Programming Interface (API) or scripts to manage their load balancing tasks. In general, current technology uses a round-robin approach (i.e., the next server in the queue services the next client) to load balance a cluster of available servers. This may mean that servers are allocated tasks even if they don't have available bandwidth.

Therefore, there is a need to address the cost, scalability, and load-balancing issues associated with large payload delivery to the edge of the network. However, before discussing the present invention, a general overview of how files are handled in different operating systems is presented.

File Configuration on Computer Systems

The overall structure in which files are named, stored, organized and accessed in an operating system is referred to as a "file system". In the UNIX operating system, for example, each directory can be mounted with a file system. If a directory /X is mounted with file system Y, any storage I/O (Input/Output) request within the sub-tree /X is forwarded to the file system Y. For example, opening of a file /X/foo.txt causes the open request to be forwarded to the corresponding "open" routine in file system Y.

Contemporary operating systems, such as Unix and Windows, support "stackable file systems". A stackable file system is a file system that is built on top of another file system. For example, if a stackable file system F is built above file system K, and if directory /X is mounted with F, then opening of a file /X/foo.txt causes the open request to go to file system F. File system F processes the request and it may or may not generate a request to file system K. In the Windows operating system environment, a stackable file system is called a file filter. A file filter can be placed on any directory. Any I/O access to a directory that has a file filter causes a corresponding file filter routine to be executed. A file filter may or may not send any request to the underlying file system.

A distributed file system is one in which files may be located on multiple servers connected over a local or wide area network. A distributed file system can be implemented using any one of several well-known network file system protocols, e.g., the Common Internet File System (CIFS) and Sun Microsystems, Inc.'s Network File System (NFS) protocol. CIFS is based on the standard Server Message Block (SMB) protocol widely in use by personal computers and workstations running a wide variety of operating systems. The CIFS protocol supports a number of file sharing and representation features, such as: file access, file and record locking, safe caching, read-ahead, and write-behind, file change notification, protocol version negotiation, extended attributes, distributed replicated virtual volumes, and server name resolution. NFS, like CIFS, is intended to provide an open cross-platform mechanism for client systems to request file services from server systems over a network. The NFS protocol provides transparent remote access to shared files across networks because it is designed to be portable across different machines, operating systems, network architectures, and transport protocols. NFS' portability is achieved through the use of Remote Procedure Call primitives (RPC primitives) that are built on top of system implementations that use the External Data Representation standard (XDR). The RPC primitives provide an interface to remote services. A server supplies programs (e.g., NFS), each program including a set of procedures. The combination of a server's network address, a program number, and a procedure number specifies a specific remote procedure to be executed. XDR uses a language to describe data formats. The language can only be used to describe data; it is not a programming language. NFS Implementations exist for a wide variety of systems. NFS mount protocol allows the server to hand out remote access privileges to a restricted set of clients and to perform various operating system-specific functions that allow, for example, attaching a remote directory tree to a local file systems.

The above examples illustrate the limitations and problems associated with current systems for distributing large files. Because of these problems there is a need for a method and apparatus that utilizes a more effective means for delivering large payloads.

SUMMARY OF THE INVENTION

An embodiment of the invention provides an improved mechanism for distributing large files throughout a computer network and delivering such files to an end-user system. When the invention is implemented it provides multiple users with a way to obtain access to large payload files without overburdening network resources. If, for example, a user wishes to download a large file such as a video file an embodiment of the invention provides a way to deliver that video file to the requesting user without putting a strain on the network. The system accomplishes this by breaking the large file into multiple portions and storing those portions in locations (e.g., nodes) distributed throughout the network. The portions stored throughout the network are distributed utilizing a flow optimization technique that provides for the intelligent management of large data files. Thus, the portions of large data file are stored in locations that minimize the amount of time it takes to deliver the portion to the end-user system. These locations are referred to by those of ordinary skill in the art as the edge of the network.

Each node at the edge of the network embodying aspects of the invention is configured to appear as if it has the large file stored locally when portions of the file are really stored on other nodes located throughout the network. This greatly increases the virtual storage capacity of each network node without consuming system resources. When the end-user system issues a request for content (e.g., a large data file) the request is routed to the nearest node and the system delivers the requested content to the node in manner that maximizes data transfer efficiency while minimizing bandwidth consumption. The end result is that each network node has access to numerous large data files without having to store each of those data files locally.

In one embodiment of the invention, the system is optimized so that large payload files can be distributed across existing networks (including the Internet and corporate intranets) using a transport layer network overlay to push content to the edge of the network. Specifically, the embodiments of the invention improve large payload delivery performance, scalability, reliability, and availability.

As mentioned above, one embodiment of the invention breaks the large payload files into multiple portions. This may be accomplished by selectively partitioning the large payload file into blocks that are replicated and distributed to a plurality of distribution stations (a.k.a. nodes) at the edge of the network. Each distribution station is configured to determine how much of the content to save locally, based on information such as usage, popularity, etc. The content provider defines what distribution stations are qualified to function as distribution stations and may also define other distribution criteria. Distribution stations in the network manage storage and transfer content (e.g., portions of large payload files) and other information to one another. Different pieces of a large payload file may be available from different nodes, however, when a user requests access to the large payload file, for example, through an application server (e.g., a streaming server), a virtual file control system creates an illusion that the entire file is present at the connected node. However, since only selective portions of the large payload file may actually be resident at that node's storage at the time of request, the distribution stations may download the non-resident portions of the file as the application server is servicing the user. The download of the non-resident blocks may be in parallel and usually from the least congested nodes. The entire process is transparent to the user.

The required portions of the requested file are received and reassembled in real-time using one or more associated file servers called the virtual file control system server. The virtual file control system provides the reassembled file to the application server servicing the client. The virtual file control system can be implemented either as a stackable file system, as a proxy file server using an underlying network file system such as NFS or CIFS, a storage-area network (SAN), or direct attached storage, or as a combination of these methods. Whichever implementation is used, the virtual file control system obtains the content from the underlying file systems.

Scalable content delivery network stations are geographically dispersed to the edge of the network in order to optimally service end-user client systems that are located beyond the edge. End-user client requests for data are automatically serviced at the nearest least congested station. In one or more embodiments of the invention, the scalable content delivery network is integrated into existing services at the Internet's edge to take advantage of these services (e.g., the Application Servers in some embodiments of the current invention might be Streaming Servers in operation within a service provider's existing base of systems).

In one or more embodiments, new nodes may be added to the network without service interruption. As the new nodes are added, they learn from other nodes in the network what content they should have and download the required content, in a desired amount, onto their local storage from the nearest and least congested nodes.

Thus, a node could be added to the network and it would be up and running after self-initialization.

In one or more embodiments, the portions and amount of a large payload file maintained at each node depends on the available storage, popularity of the content, distribution criteria by the content provider, etc. Thus, least likely to be used blocks of a large payload file may be pruned (i.e., deleted from local storage) to make room for other highly desirable content. However, although the least likely to be used blocks of a file are pruned, the entire content of a large payload file may be maintained at a node in the scalable content delivery network, so long as the content provider wants the content to remain in the network.

DETAILED DESCRIPTION OF THE INVENTION

An embodiment of the invention provides an improved mechanism for distributing large files (referred to as large payloads) throughout a computer network and delivering such files to an end-user system. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

When the invention is implemented in accordance with one embodiment of the invention it provides end-user systems with a way to access large payload files without overburdening the network utilized by the end-user system to transmit data. In one embodiment of the invention, the system accomplishes this by breaking the large payload file into multiple portions and storing those portions in locations (e.g., nodes) distributed throughout the network. The portions stored throughout the network are distributed utilizing a flow optimization technique that provides for the intelligent management of the large payload files. Thus, portions of the large payload file are stored in locations that minimize the amount of time it takes to deliver the portion to the end-user system. These locations minimize the latency associated with delivering the file to the end-user system and are referred to herein as the edge of the network.

Each node at the edge of the network embodying aspects of the invention is configured to appear as if it has the large payload stored locally when portions of the file are really stored in on other nodes located throughout the network. This greatly increases the virtual storage capacity of each network node without consuming system resources. When the end-user system issues a request for content (e.g., a large payload) the request is routed to the nearest node and the system delivers the requested content to the node in manner that maximizes data transfer efficiency while minimizing bandwidth consumption. The end result is that each network node has access to numerous large data files without having to store each of those data files locally. Thus, one or more embodiments of the present invention provide efficient methods and apparatuses for delivering a large payload to the edge of a network without the cost, scalability, load balancing, and other issues associated with prior art methods of content delivery.

Figure 1:
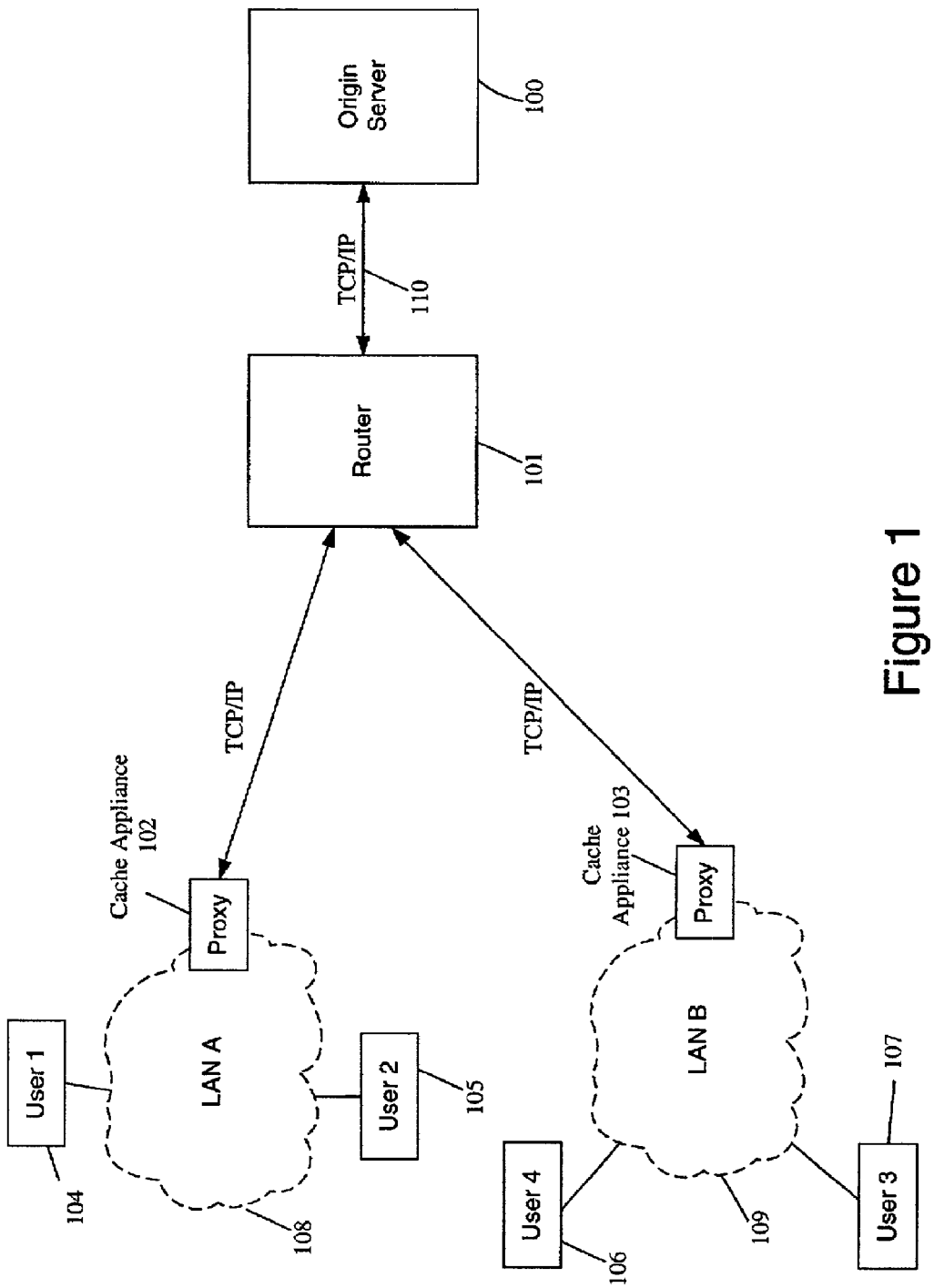
FIG. 1 is an illustration of caching methods of content delivery.
Figure 2:
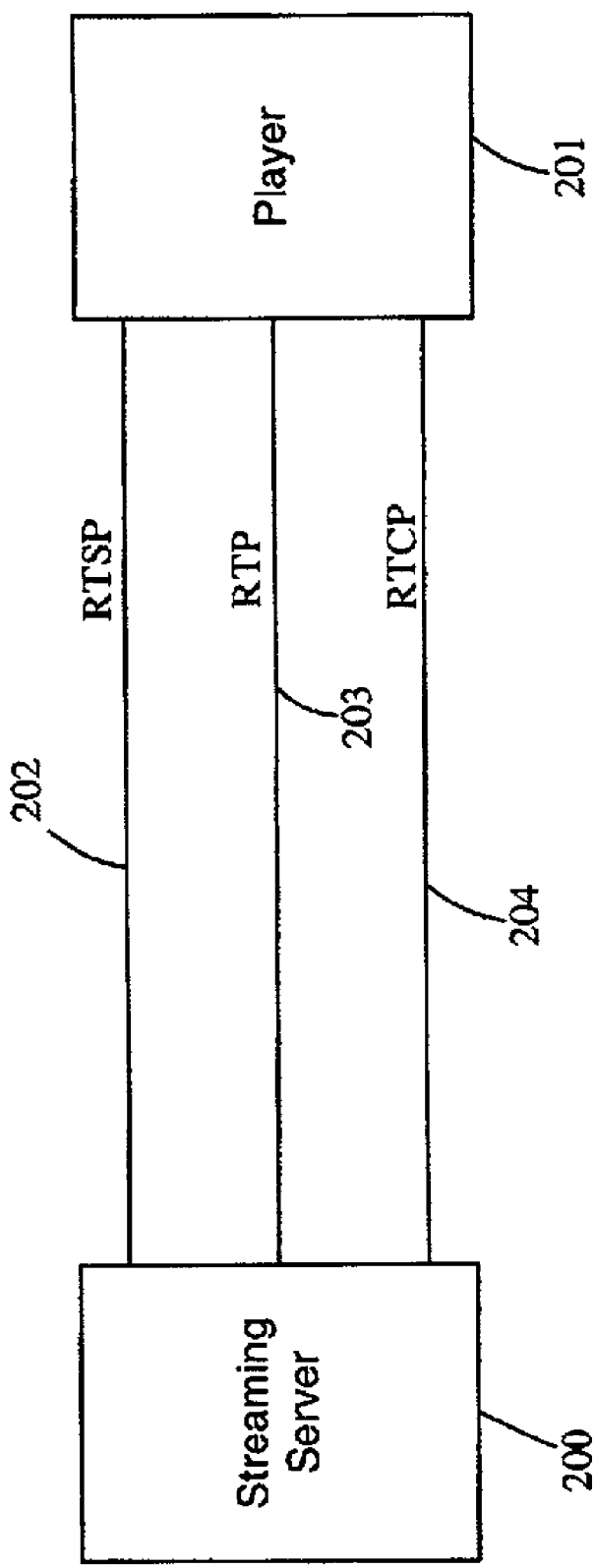
FIG. 2 is an illustration of a typical streaming server connection to a player.
Figure 3:
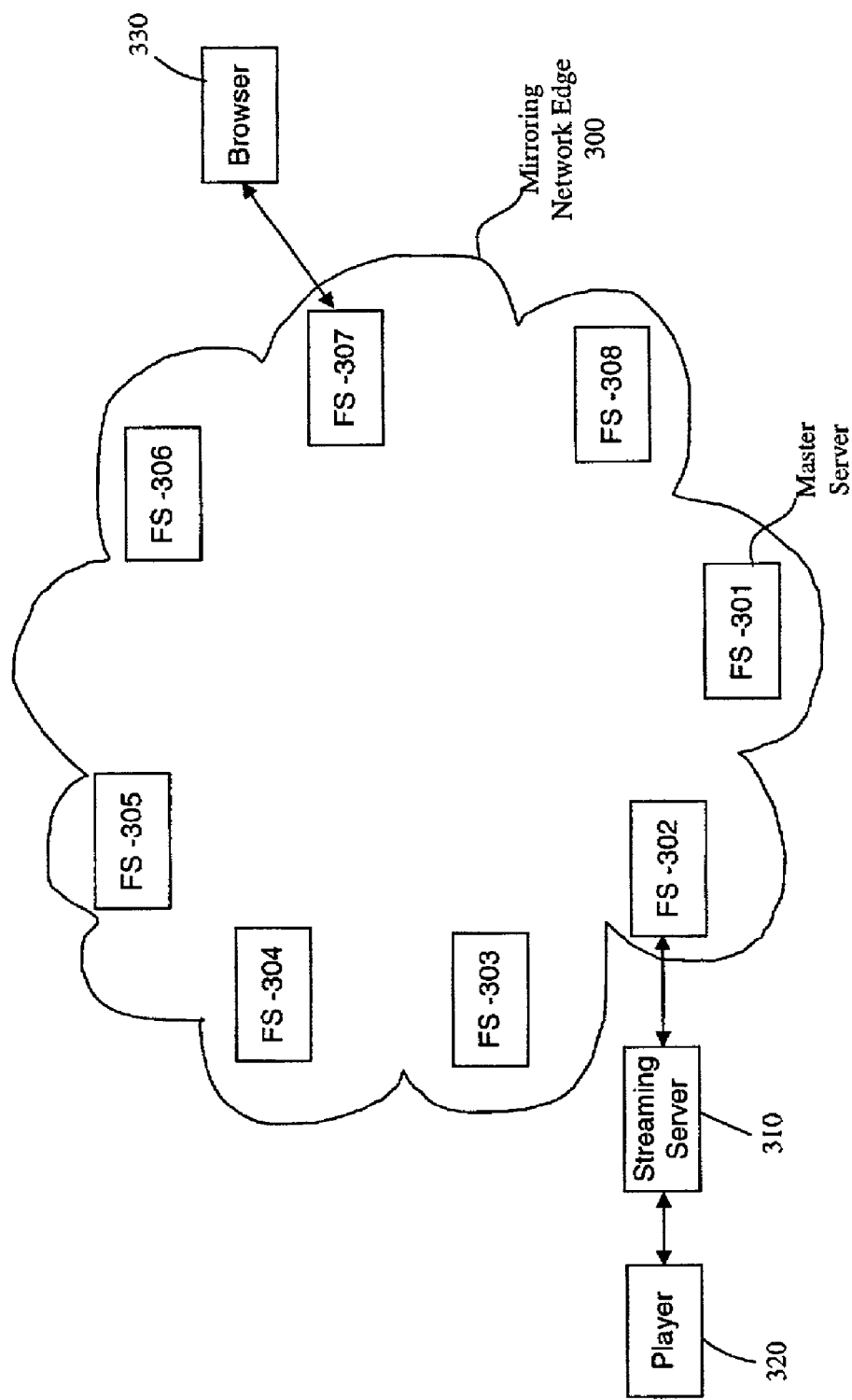
FIG. 3 is an illustration of a network content delivery scheme employing mirroring to push content to the edge of the network.
Figure 4:
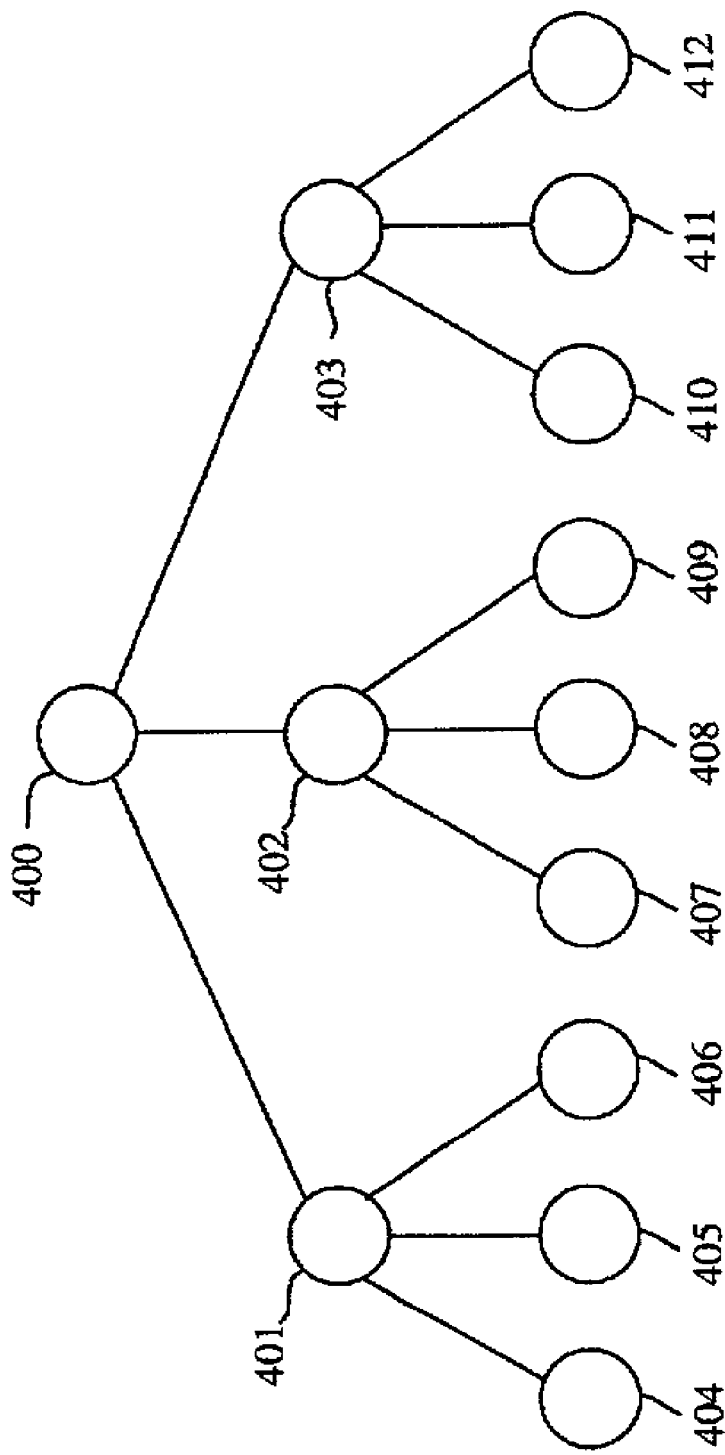
FIG. 4 is an illustration of a distribution network that uses multicast technology to push information to multiple servers on a network.
Figure 5:
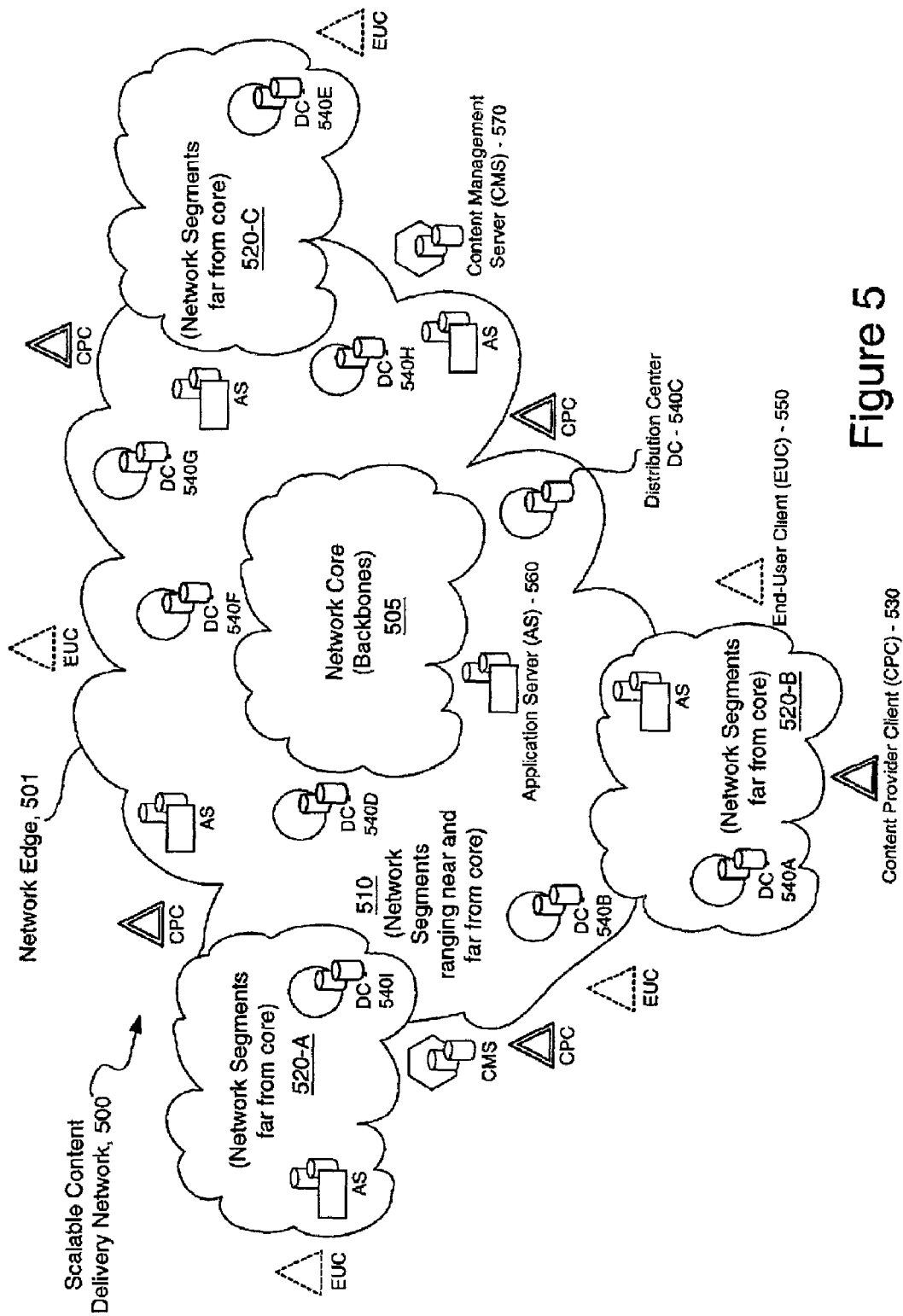
FIG. 5 is an illustration of a scalable content delivery network for delivering large payloads according to an embodiment of the present invention.

FIG. 5 provides a view of a scalable content delivery network (SCDN) for delivering large payloads according to an embodiment of the present invention. SCDN 500 may be a network such as the Internet which conceptually includes a network core 505 (i.e., the backbone), intermediate network segments 510 ranging "near" and "far" from the core, and network segments "far" from core 520-A through 520-C (collectively 520). "Near" "far" relate to distance and are intended to indicate relative path latencies (short or long, respectively) to the core, such latencies generally depend on the number of intermediate hubs (e.g., switches, routers, and the like) that are traversed to reach the high-speed backbones that form the core of the network and through which much of the network traffic is routed. Note that each intermediate hub may perform some limited processing, which adds latency, before forwarding the traffic to the next hub.

FIG. 5 shows a plurality of Content Provider Client (CPC) systems 530, a plurality of End-User Client (EUC) systems 550, and one or more Content Management Servers (CMS) 570, all located beyond Network Edge 501. In general, the content provider client 530 may be connected (or assigned) to a content management server 570, which in turn is connected to its assigned distribution center 540. A content provider uploads and/or manages large payload files in the SCDN 500 through its CPC 530. The EUC 550 provides the end-user access to files in SCDN 500. For example, EUC 550 may be a browser running on the end-user's local computer.

Network Edge 501 generally may be far from network core 505. However, the distance (i.e., path latency) between the core and the edge may not be uniform and may vary considerably for a given CPC or EUC. One embodiment of the present invention places a plurality of Distribution Centers (DC) 540A–540I for maintaining large payloads at the edge of the network thereby resolving the latency issue. Large payload content from a content provider is pushed from one distribution center to other distribution centers at the edge of the network. An end-user seeking access to a large payload is serviced (via an application server) from the nearest distribution center containing the desired content. By distributing content to the end-user (e.g., at EUC 550) via a plurality of Application Servers 560 and distribution centers 540 at the edge, path latency is minimized. Thus, large payload distribution involves obtaining a large payload file from a content provider and geographically placing such file at the distribution centers which are at or as close to the edge of the network as possible.

Figure 6:
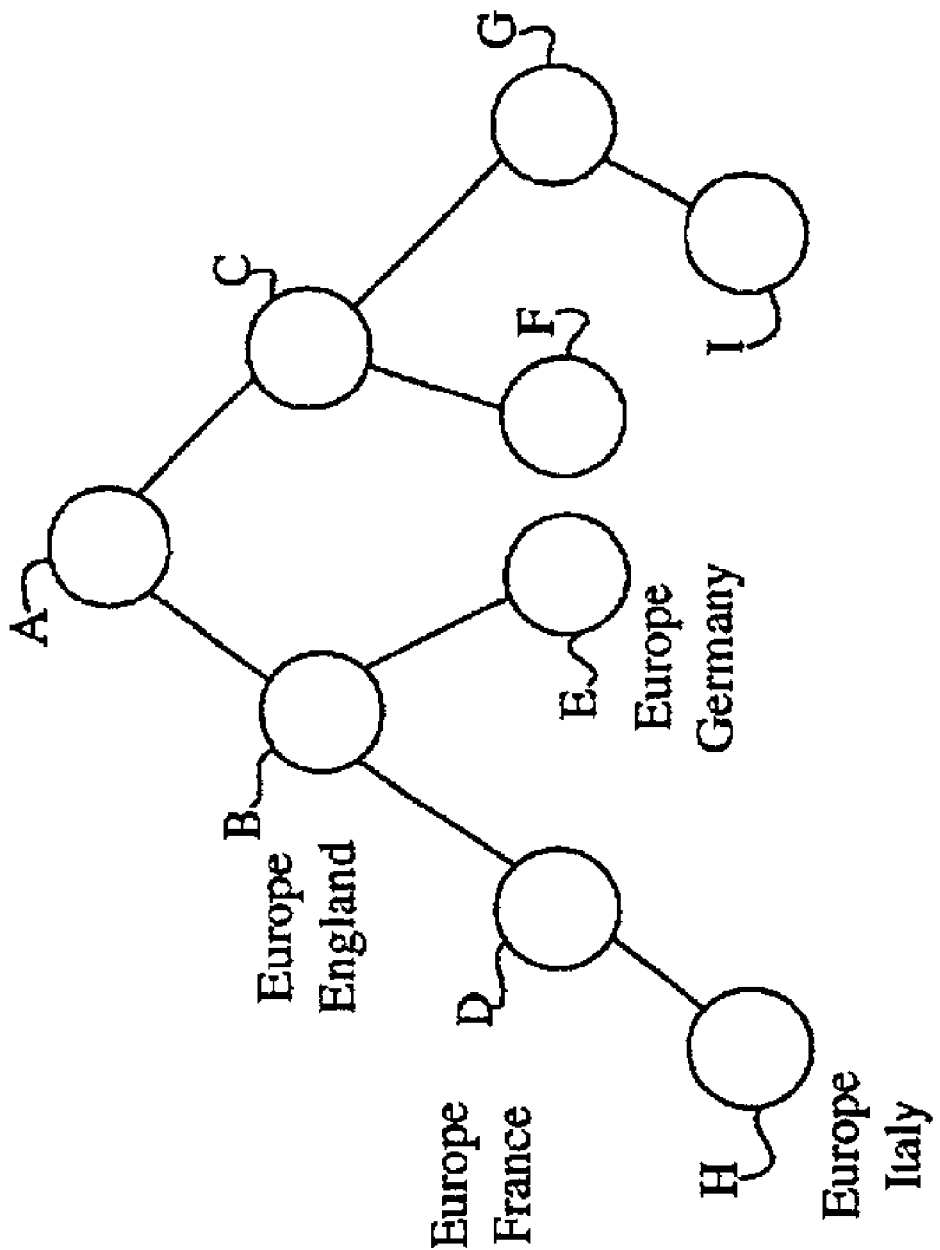
FIG. 6 is an illustration of a virtual tree arrangement of the nodes for control information communication in accordance with an embodiment of the present invention.
Figure 12:
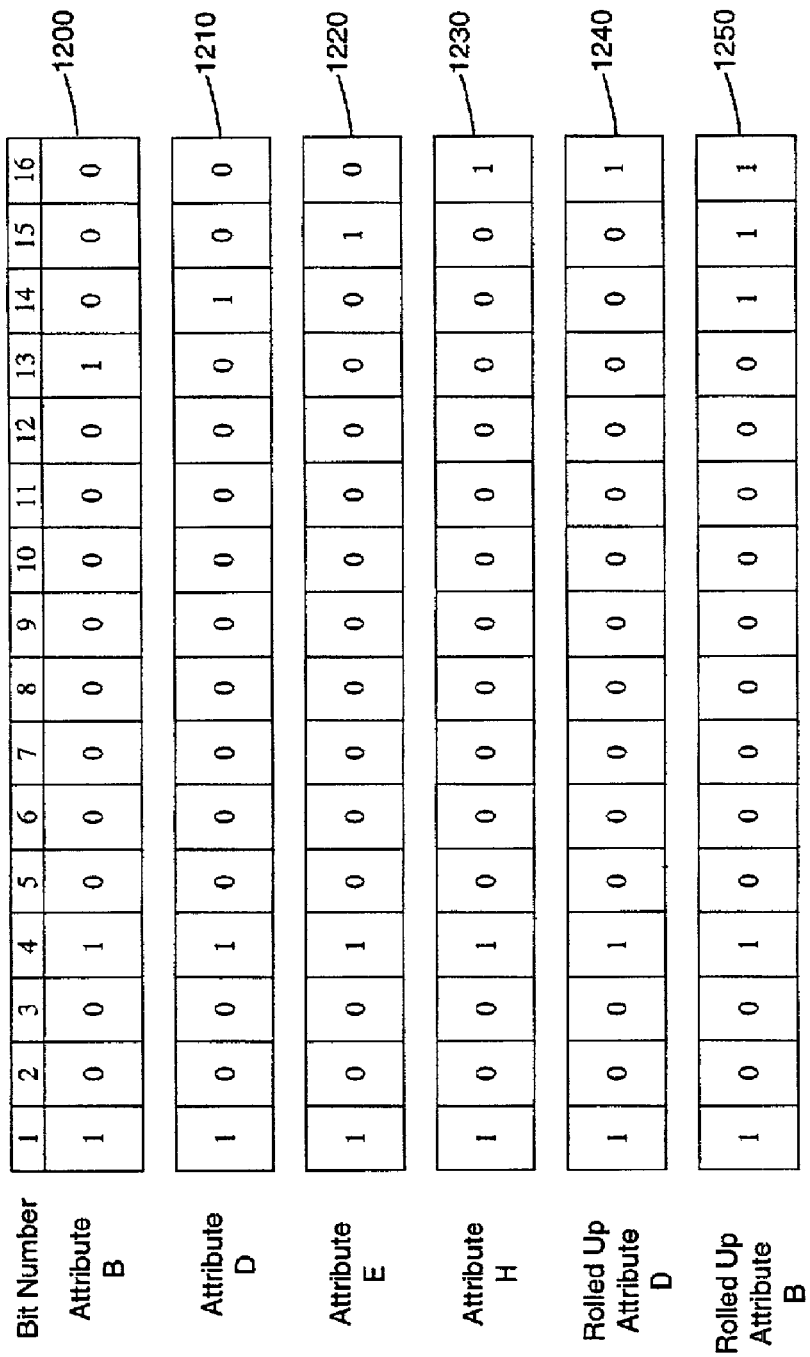
FIG. 12 is an illustration of the attribute bitmap and rolled up bitmap, in accordance with an embodiment of the present invention.

The distribution centers 540A–540I in SCDN 500 of FIG. 5 are virtually arranged in the form of a tree as illustrated in FIG. 6, for example. This virtual tree arrangement is primarily used for communication of control information amongst the nodes of the scalable content delivery network. Data downloads can be performed from any node in the network having the desired data, preferably the nearest node (distance-wise). Nodes A through /of FIG. 6 represent DC 540A through 540I, respectively. The nodes are arranged in a logical order. For example, assuming node B represents Europe-England, then logical child nodes in Europe might be Europe-France (e.g., node D) and Europe-Germany (e.g., node E), and a child node of Europe-France might be Europe-Italy (e.g., node H). In this example where the left side of the tree represents Europe, the right side may represent Asia. Node A is the root node and may represent a central control station, for example. In one or more embodiments, each node in the tree has a unique attribute set representing the name of the node. The attribute set for a node is stored in the node and can be represented in any convenient data structure. For example, the attribute set can be represented as a variable bitmap (a bitmap is the binary representation of an object, e.g., a number). Each node also contains a representation of the attribute set of each of the node's children, grand children, great grandchildren, etc. (i.e., all nodes emanating from that node as a root node lineal descendants). This representation is called the "Rolled Up Set of Attributes" any convenient data structure can be used for it. Thus the rolled up attribute of a node is the representation of the rolled up attribute of its children. For example, a "Rolled Up Bitmap", which is a combination of the rolled up attribute bitmaps of all the node's children, may be used. A "Rolled Up Bitmap" be defined as the "binary OR"(a.k.a. Bitwise OR) of the rolled up attributes of the node's children. FIG. 12 is an illustration of the attribute bitmap and rolled up bitmap, in accordance with an embodiment of the present invention. Bitmaps 1200, 1210,1220, 1230,1240, and 1250 use 16 bits for illustration purposes but since the bitmaps are variable, they may vary as needed to identify each node and provide other necessary information.

Bitmap 1200 representing the attribute set for node B of FIG. 6 has, as its identification, bits 1, 4 and 13 set to 1 and all other bits set to 0. Bit 1 may be set because node B is a child node of A, for example, bit 4 may be set to represent Europe, and bit 13 set to represent England. Bitmap 1210 representing the attribute set for node D of FIG. 6, a child node of B, has bits 1, 4, and 14 set to 1 and all other bits set to 0. Bit 14 may represent France, for example. Bitmap 1220 representing the attribute set for node E of FIG. 6, also a child node of B, has bits 1, 4, and 15 set to 1 and all other bits set to 0. Bit 15 may represent Germany, for example. Bitmap 1230 representing the attribute set for node H of FIG. 6, a child node of D, has bits 1, 4, and 16 set to 1 and all other bits set to 0. Bit 16 may represent Italy, for example. As discussed previously, the rolled up bitmap for node D (e.g., 1240) would be the attribute bitmap of node H(since H does not have any children) and the rolled up bitmap of node B(e.g., 1250) is the binary OR of Bitmaps 1210, 1220, and 1230. The result of the binary OR is that all the bits set in Bitmaps 1210,1220, and 1230 are also set in Rolled Up Bitmap 1250 (i.e., bits 1, 4, 14, 15, and 16).

Content management server 570 may be connected to any node on the tree. Thus, although a content management server and a distribution center may not be collocated, the content management server gives the content provider a vehicle to upload large files (e.g., video) to the distribution centers. In one embodiment, the content management server is a computer that processes the content provider's large payload file for distribution in the network. In another embodiment, the content management server may, for example, be a subset of tools (e.g., machine independent objects) that allows upload of content to the network; thus, the tools may be shipped from a server to the content providers client's computer for processing and distribution of the large payload file in the network. After a content provider loads the large payload file into the content management server, the CMS may process the file and forward it to the distribution center.

Figure 7:
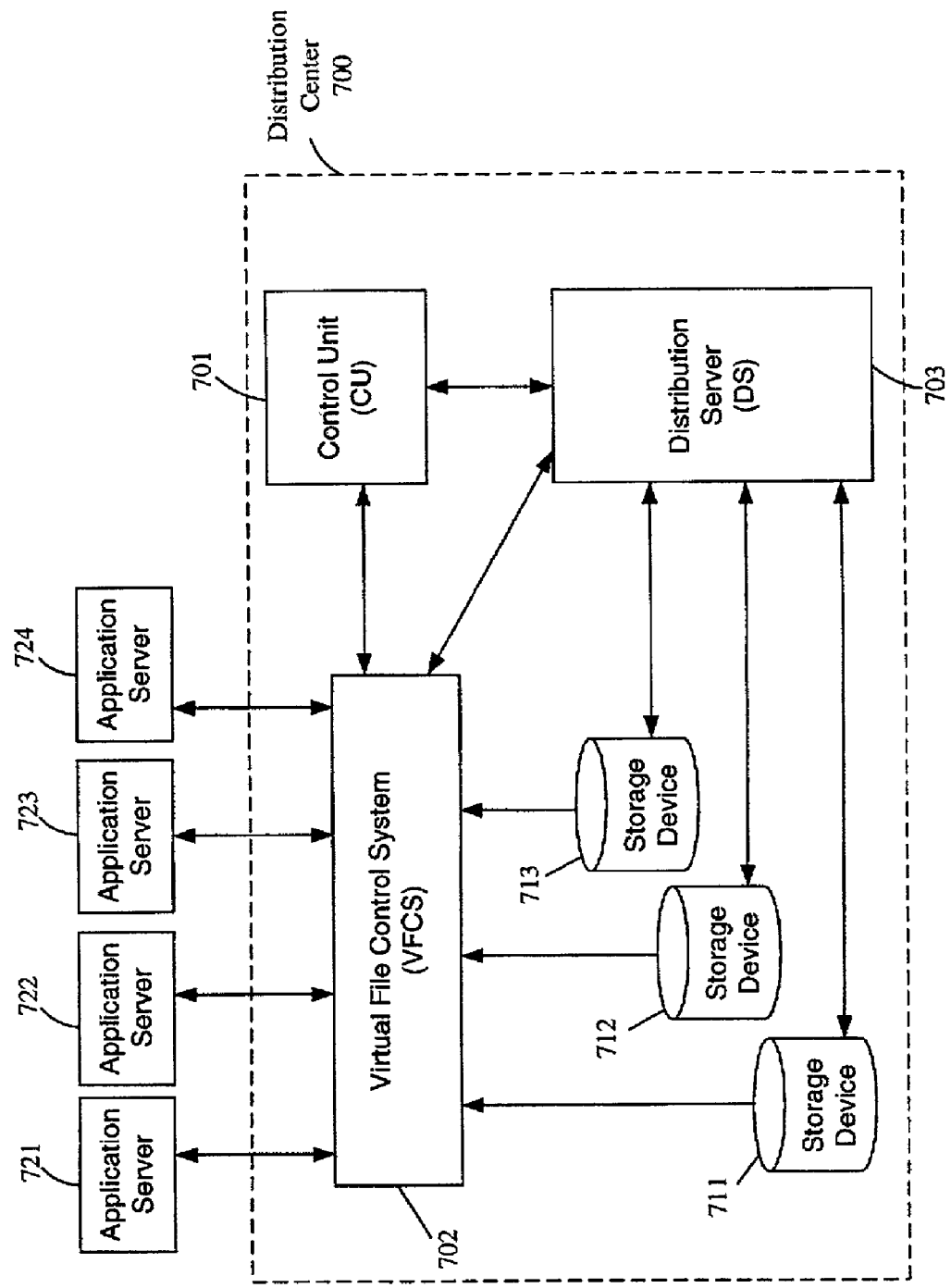
FIG. 7 is a simplified layout of a distribution center in accordance with an embodiment of the present invention.

A simplified layout of a distribution center is illustrated in FIG. 7 in accordance with one embodiment of the present invention. Distribution center 700 comprises control unit 701, one or more Virtual File Control System 702, one or more distribution server 703, and a plurality of storage devices (e.g., 711–713). Control unit 701 is the network manager for the distribution center; its functions are further discussed in a later section. Application servers 721–724 (e.g., streaming servers, FTP servers, and media players), which are not part of distribution center 700, are shown connected to the virtual file control system 702 in this illustration to provide visibility on how end-user clients access large payload files stored in the SCDN. The components of distribution server 700 may not be collocated in the same node. For example, VFCS 702 may be located with the application servers (e.g., 721–724), and the control unit (e.g., CU 701) may be located elsewhere such as with VFCS 702. Thus, it is not necessary for all components of distribution center 700 be collocated at an SCDN node.

A content provider uploads a large payload file to a single content management server using content publishing and management tools running on a content provider client system. After receiving the file, the CMS processes the file and breaks it down, if required, into track files (a.k.a. linear files). A linear file comprises a file that maintains the order associated with the substance (i.e., substantive content) of the file. If, for example, the linear file contained a movie, the beginning of that file would include the beginning portions of the movie. Similarly, the middle and end portions of the movie would be located at the middle and end of the linear file. Linear files are desired because it is easier to reassemble such files using linear superposition, for example. Some media files are non-linear, that is, they contain multiple tracks such that the first part of the movie, for example, is not stored in the beginning of the file. After breaking the file down to linear (i.e., track) files, the CMS transfers the file to the distribution server it is connected to. The distribution server further breaks the track files down to block files, as desired for storage. The block files may subsequently be stored in local storage locations 711–713, for example. A file distribution protocol (e.g., FDP) command is subsequently used to distribute (i.e., replicate) the file, or selected portions thereof, to other distribution server nodes within the scalable content delivery network. For initial replication, the entire block files need not be stored in all nodes however a master copy may be maintained completely in one node (typically the originating node). The FDP includes commands to facilitate file transfers and manipulations within the SCDN. The size of the blocks affects the performance of both content distribution and content delivery and is discussed later in this document.

The Virtual File Control System (VFCS) 702 is able to piece the original (large payload) file back together from the block files. As will be explained later, all the blocks of the large payload file need not be stored at one distribution center, however, the entire file is available within the SCDN. When an end user connects to application server 721 (e.g., a streaming server), the VFCS creates a virtual appearance that the entire file is available at that node. For example, assuming only fifteen percent of a two-gigabyte file is stored in storage 711–713, the VFCS makes streaming server 721 think that the entire two gigabytes is available at the location. Thus, streaming server 721 may start playing the file. As the file is being played, VFCS communicates with DS to locate and retrieve the remaining portions of the file from other nodes in the network.

Decomposing Large Files

A large payload file is divided into blocks in a number of steps, the exact process depending on whether or not it is a linear file or a non-linear file. Using a movie file for example, the file is linear if the first 10% of the movie is located approximately within the first 10% of the file, the next 10% within the next 10% of the file, and so on.

In contrast, a movie file in which the first 10% of the movie is located somewhere other than in the beginning of the file is considered to be a non-linear file.

Figure 8:
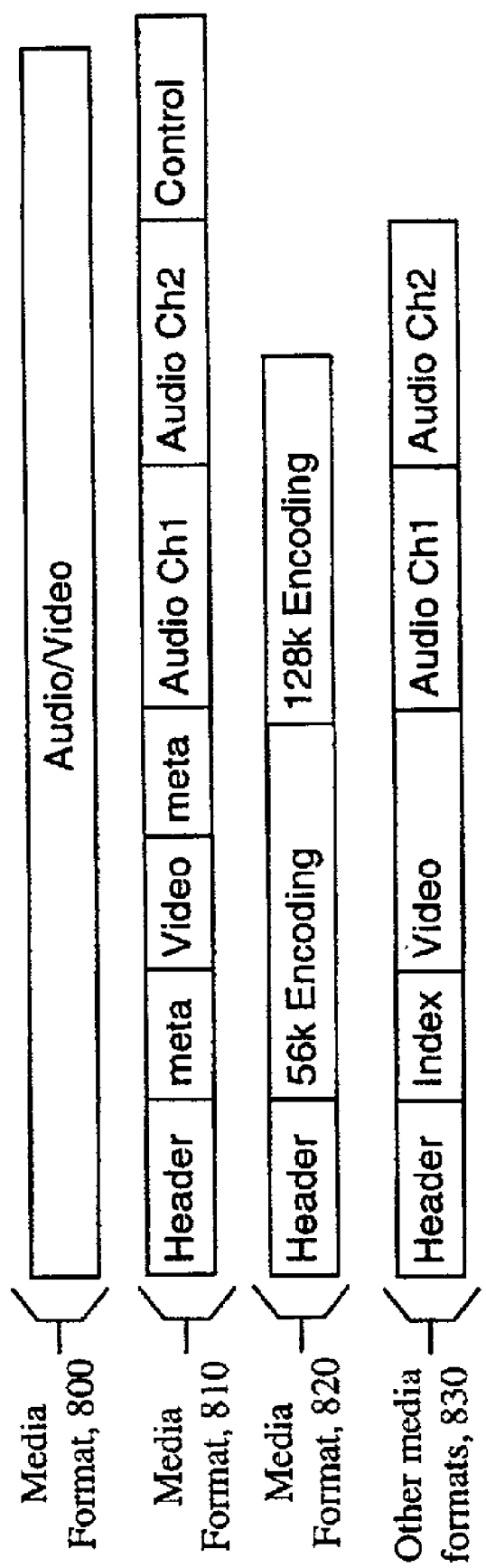
FIG. 8 illustration of linear and non-linear file structures as used in the present invention.

Example linear and non-linear file structures are illustrated in FIG. 8. Data format 800 may represent the mpeg format, for example, which is linear because it contains audio/video data multiplexed together throughout the file in a single track, starting from the beginning. Note that each subdivision in the various formats represent a track hence formats 810-830 each contains multiple tracks. As shown, format 810 is non-linear because it contains header information in the first track of the file, followed by meta information in the next track, then video information in the third track, then meta information in the fourth track, a first audio channel in the fifth track, a second audio channel in the sixth track, and then some control information at the end. Thus, the beginning of a movie formatted for format 810 would not reside in the beginning of the file. Formats 820 and 830 are representations of other possible non-linear media data formats. For example, format 820 may have data formatted such that the file contains header information in the beginning, then some 56K encoding for formats such as mpeg, followed by 128K encoding information. Other media format 830 may contain header information, followed by index information, followed by video, and finally audio information. All these and other non-linear files need to first be converted to linear files for compatibility with the replication algorithm discussed later in this specification.

Figure 9:
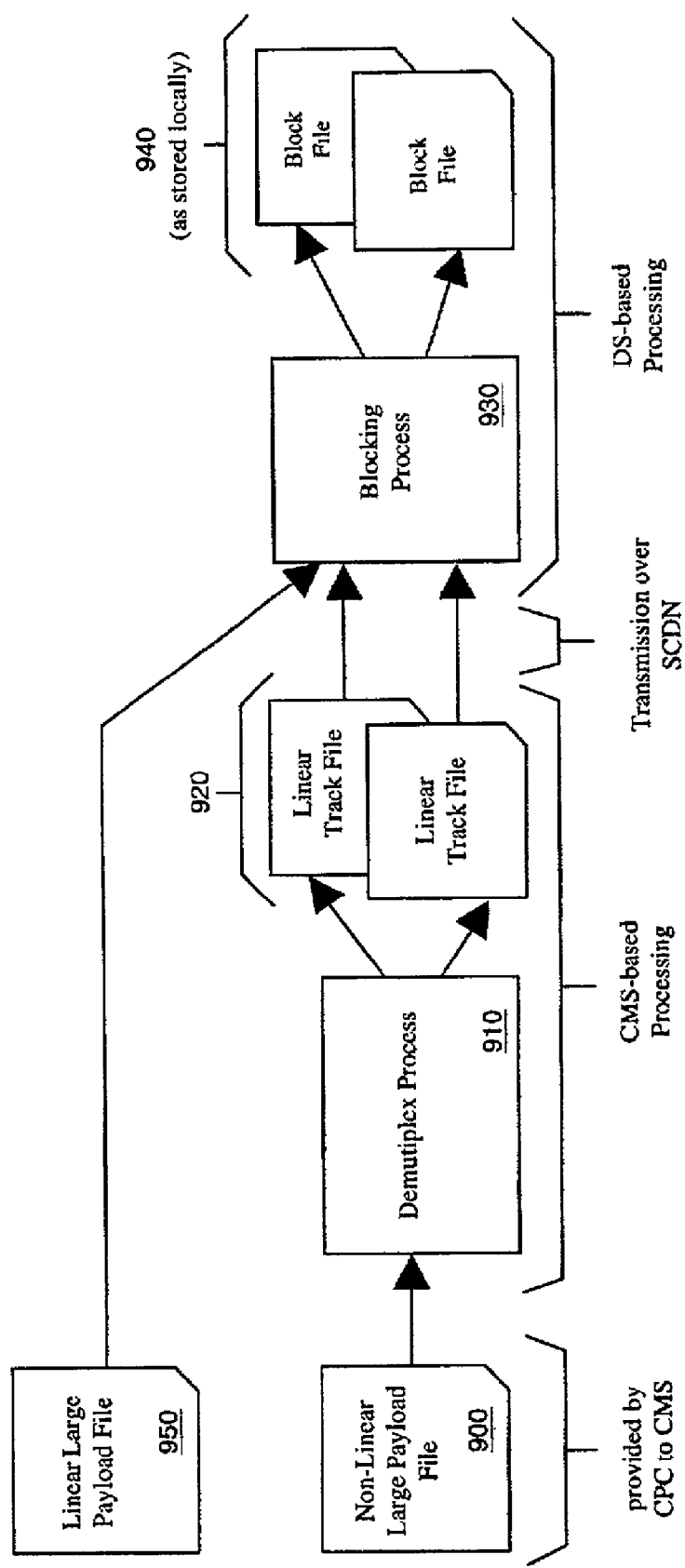
FIG. 9 shows the process of decomposing a large payload file into block files for storage in accordance with an embodiment of the present invention.

FIG. 9 shows the process of decomposing a large payload file into block files for storage. After the content provider uploads the file onto the content management server (CMS), the CMS determines whether the file is linear or non-linear. If the file is linear (e.g., block 950), such as an mpeg movie, the CMS sends the data to the DS at block 930 for the blocking process. However, if the file is non-linear (e.g., block 900), the CMS performs the Demultiplex Process at block 910 to generate Linear Track Files 920. The Demultiplex Process involves breaking up the non-linear (i.e., multiple track) file into files containing single tracks each. For example, using the media data shown in FIG. 10 for illustration, large payload file 1000 contains header in the first track, video in the second track, first audio channel in the third track, second audio channel in the fourth track, and finally control information in the fifth track. The content management server breaks down the Large payload file 1000 into five linear track files 1010 such that one file contains the header, a second file contains video data, a third file contains the first audio channel, and so on.

Referring back to FIG. 9, the Linear Track Files 920 or the Linear Large Payload File 950 (which is also a linear track file) are (is) transmitted by the CMS over the network to a DS that it is connected to. The files may be transmitted in accordance with a File Distribution Protocol (FDP), discussed below. The files from the CMS are input to a DS-based Blocking Process 930, which produces Block Files 940. The Block Files 940 are subsequently stored in the local storage of the DS. After processing, the content may be downloaded by other distribution servers in the network. Generally, there need not be a direct relationship between the size of the files transferred over the network and the block files stored in the local storage system of the DS.

Figure 10:
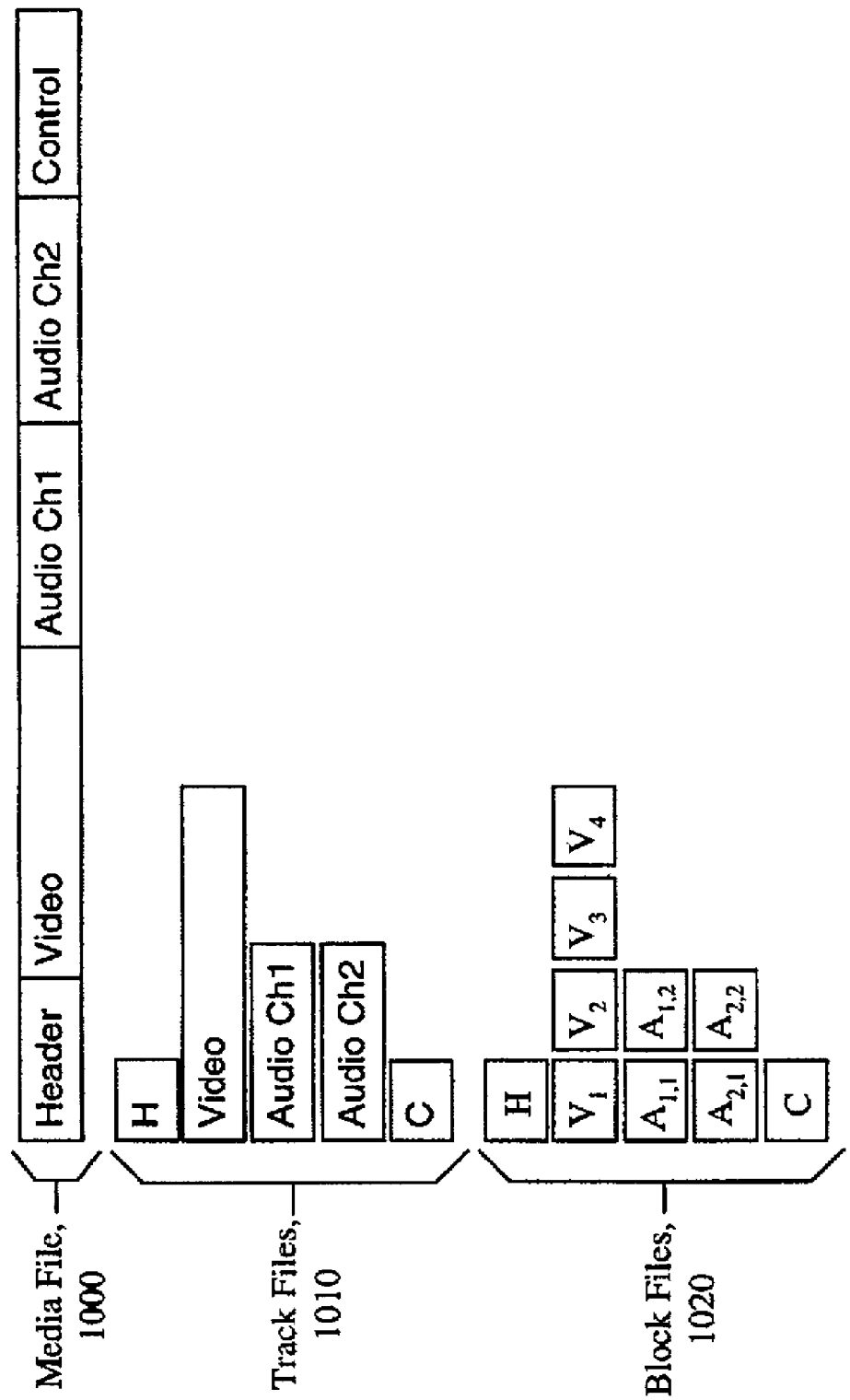
FIG. 10 is an illustration of a decomposed large payload file in accordance with an embodiment of the present invention.

Blocking process 930 breaks down the track files into smaller, manageable units, as shown in block 1020 of FIG. 10. The blocking process produces the multiple block files H, $V_{1-4}$, $A_{1,1-1,2}$, $A_{2,1-2,2}$, and C (collectively referred to as 1020 in FIG. 10). Block files may contain data overlaps or offsets (e.g., shift). For example, block file $V_4$ may contain some part of the Header track, and so on. The only requirement for the block files in one or more embodiments of the invention is that the beginning of each track is contained in the first block file created for that track, for example, the beginning of Audio Ch1 is contained in $A_{1,1}$ and the beginning of Audio Ch2 is contained in $A_{2,1}$, etc. Other embodiments may simply breakdown the large payload file (i.e., non-linear) directly into block files without first going through the demultiplexing process (e.g., block 910) thus each block file may contain overlapping tracks. Breaking down the large payload file into blocks makes it possible to distribute the block files into different storage devices and to add more storage devices when needed without impacting system performance. Thus, for example, more storage devices may be added to the distribution center (FIG. 7) without a need to move files around or reconfigure other nodes as in the prior art. For example, different blocks may be located at different nodes of the SCDN hence on different storage devices. The smaller block files makes it possible to support multiple application servers (e.g., streaming servers) at the same time, thereby increasing access bandwidth. For example, multiple block files of a large payload file can be downloaded in parallel. Fast forward and fast reverse by a user is also possible without the entire file being first downloaded onto the streaming server.

Reconstructing Large Payload File From Block Files

Figure 11:
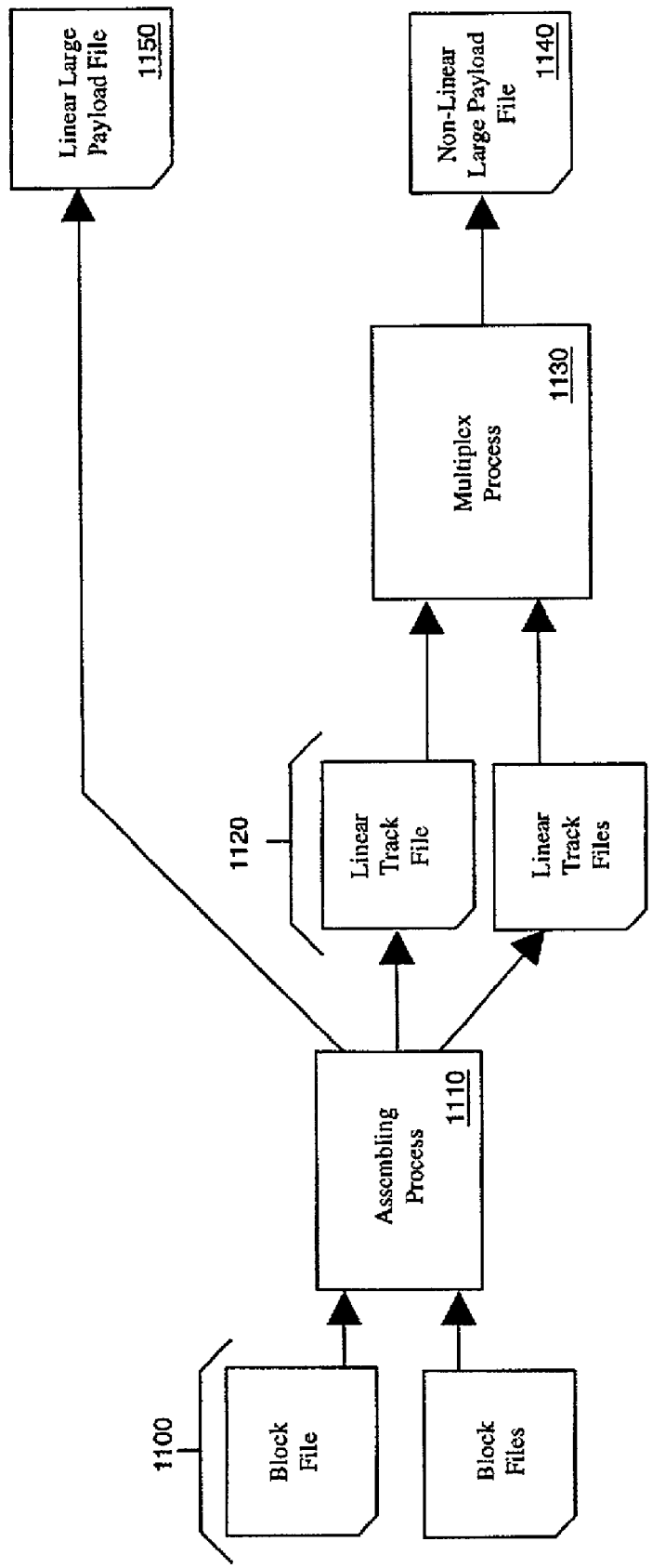
FIG. 11 is a diagram showing the process of reconstructing a large payload file from multiple block files.

FIG. 11 is a diagram showing the process of reconstructing a large payload file from multiple block files by the VFCS. Block files 1100 are input to Assembling Process 1110. The reverse process of blocking, discussed in the previous section, is called "assembling". The Virtual File Control System (VFCS) uses assembling process 1110 to convert multiple block files into linear track files. Assembling process 1110 generates only one linear track file (e.g., Linear large payload File 1150) if the original large payload file is linear. However, where the original large payload file is non-linear, assembling process 1110 generates multiple linear track files 1120. A linear track file is generated by a linear combination of the appropriate block files. For example, the video track file of FIG. 10 is regenerated by linearly combining (i.e., summing) block files $V_1$, $V_2$, $V_3$, and $V_4$. Linear track files 1120 may further be combined in Multiplex Process 1130 to generate Non-Linear Large Payload File 1140. The multiplexing process simply reassembles the track files to generate the original non-linear large payload file.

The File Distribution Protocol (FDP)

The FDP Protocol defines the file management primitives necessary to transfer, store, and manipulate content provider files and file metadata stored in the network. Such primitives include commands that upload, distribute, deliver, modify, and delete files. The FDP commands result in one or more packets being transferred between appropriate servers in the network. It will be evident to those of ordinary skill in the art that the command names and protocol implementation described herein are used for convenience and that other commands or protocols may be added, subtracted, or substituted so long as they result in efficient and reliable transfer of files within the network.

"Put": A content provider uses content management applications running on a Content Provider Client system to upload a file (content) and file metadata (data related to the management of the files being stored, transferred, and manipulated in the network) onto a Content Management Server (CMS). The CMS breaks the file into linear track files and then issues a "put" command to a DS that will eventually distribute the content in the network. In one embodiment, the CMS is connected to a DS at an SCDN node. The CMS sends a "put" command to the DS for each of the track files. In effect, the "put" command is a "push" action, pushing a track from a CMS to a DS. A "put" command may include four packets, for example: "put", "put_response", "put_chunk", and "put_ack". The "put" packet tells the receiving DS to get ready to receive a track file. The "put_response" packet is a packet issued by the DS to indicate to the CMS whether or not the DS needs to receive the track file, and if it needs it, where to begin the transmission. This packet may be useful in the situation when a communication session is broken after part of a track file has been transferred and the CMS needs to re-transfer the remainder part of the file. Once the DS communicates to the CMS where to begin transferring a track file, the CMS may issue a "put_chunk" packet along with the actual track file. The DS may respond with a "put_ack" packet when the entire track file is received to indicate successful transmission. After receiving the track file, the DS divides the linear track files into block files, stores the block files in local storage, and updates the file metadata to reflect the track, block, and location information.

"Distribute": After all of the tracks have been pushed to the DS, the CMS may issue "distribute" packets directing the DS to distribute the file to other nodes in the network. For example, the CMS may issue one "distribute" packet per track file with each packet containing the content provider's distribution criteria. The distribution criteria, for example, may specify which nodes in the network should have the content. The "distribute" command may include two packets, for example: "distribute" and "distribute_ack". The DS may acknowledge receipt of the "distribute" command and track file by issuing a "distribute_ack" packet to the CMS.

"Replicate": In response to the "distribute" command, the DS may issue "replicate" packets to its neighbors. Each neighbor that satisfies the distribution criteria specified by the content provider may issue a command (such as the "get" packet described below) to one or more DS in the distribution path to pull a portion of the file into its local storage. The "replicate" packet starts from the DS where the track files have been pushed. The "replicate" packet acts as a notification to a DS that it may need to pull (i.e., replicate) certain block files from any of the issuing DS into its local storage. The receiving DS may acknowledge the notification by issuing a "replicate_ack" packet and thereafter, it assumes the responsibility of pulling the block files from the issuing DS when it is ready. A DS further notifies its neighbor nodes to determine if they should pull part or the entire file by issuing "replicate" packets to them. A DS may issue a replicate request to its descendent nodes if the rolled up attribute matches the content distribution criteria.

"Get": A DS that needs to pull files from another DS may issue a "get" command, for example. The "get" command may include four types of packets: "get", "get_response", "get_chunk", and "get_ack". For example, the "get" packet may be used to initiate a pull, and the "get_response" packet may be used to report the status of the station and transfer file metadata as needed. The "get_chunk" packet may be used to transfer file data and the "get_ack" packet may be used to acknowledge the end of the "get" sequence and report status. A DS may decide on the size of the file to pull based on: (1) its storage availability; (2) location of the station in the network map; (3) the content's popularity; (4) the truncate-able or non-truncate_able characteristic of the file; and, (5) the bandwidth allowance. A DS may issue "get" command sequences in response to a "replicate" request and a "search_reply" request.

"Prepare": A "prepare" command may include two packets, for example: "prepare" and "prepare_ack". The node's VFCS may issue a "prepare" packet to a DS to pull the non-resident portions of a file for an Application Server. The DS may use the "prepare_ack" packet to acknowledge that it has received the "prepare" packet and that it will perform "prepare" soon as possible.

"Search": When the DS can process the "prepare" request, it may issue a "search" command to locate the missing portions of a file. A "search" command may include three packets, for example: "search", "search_ack", and "search_reply". A DS servicing a "prepare" command issues a "search" packet to initiate a search among its neighbors for the non-resident portions of the file. Each neighbor may issue a "search_ack" packet indicating that it has received the "search" request. The "search_ack" packet is not an acknowledgement that the DS has portions of the requested file. A node that has a portion of the required file may issue a "search_reply" packet. The "search_reply" packet may include information such as the portion of the searched file residing in the station, the network condition of the station, and the load of the station's DS cluster. A DS in the initiating DS cluster receives "search_reply" packets and may select appropriate remote DS nodes based on the information in the "search_reply" packets to download the missing portions of the file. A DS in the initiating DS cluster may issue "get" command, for example, to one or more stations (i.e., selected SCDN nodes) to download the missing content.

"Remove": The "remove" command may include two packets such as "remove" and "remove_ack". The nodes Control Unit may issue a "remove" command to the DS to remove certain blocks. The pruning process, which is described later, uses the "remove" command. A "remove" packet is a notification to a DS that certain blocks have to be removed. The DS may subsequently issue a "remove_ack" packet to acknowledge that it will eventually remove the indicated blocks when ready.

"Clean": The "clean" command may include two packets, "clean" "clean_ack". The CMS may issue a "clean" similar packet to notify a DS located at the same node that it needs to remove a certain file. The DS issues a "clean_ack" similar packet to acknowledge that the file will eventually be removed when ready. Following the path used during the "replicate" command (available in the distribution criteria for the file), the DS issues a "clean" equivalent command to its neighboring nodes requesting deletion of the file and its related file metadata from all the stations in the SCDN.

"Info": The "info" command may include two packets such as "info" "info_ack". The CMS issues an "info" packet to transfer content provider metadata (data related to management of the content providers using the SCDN) or file metadata to a DS. The packet may be used to add, delete, and modify attributes of certain content providers or files. When a DS receives content provider information, it modifies the table where content provider metadata is stored within an SCDN node, issues the "info_ack" packet to the requestor (CMS or DS), and then issues "info" command to all its neighbors except the requestor. An "info" packet that contains content provider information is propagated throughout the entire SCDN. An "info" packet that contains file metadata is propagated based on the distribution criteria for that file. When a CMS sends an "info" packet of a file metadata along with the distribution criteria of the file to a DS, the receiving DS modifies its database containing the file metadata, issues "info_ack" packet to the requestor (CMS or DS), and then issues "info" packet to those neighbors satisfying the distribution criteria (i.e., those that received distribution of the file during the "replicate" command). This process continues until the database containing the file metadata in all the stations satisfying the distribution criteria are updated.

"Learn": The "learn" command may be issued by a Control Unit's learning agent and may be used when a DS is added to the SCDN and its local storage needs to be initialized, or when the station's attribute changes, or with network configuration changes, or during recovery from a failure. The DS receiving the "learn" command propagates the "learn" command to all its neighbors except the requester. The "learn" packet carries the attributes of the originating station. Each DS receiving a "learn" packet determines if its station has files that satisfy the learning station's attributes, if so, it issues "replicate" a DS in the learning station to pull the relevant files.

"Fetch": The "fetch" command may be used by the Control Unit's learning agent while learning in active mode. The "fetch" command may include two types of packets: "fetch" and "fetch_ack." In active learning mode, the learning agent obtains a list of media files to be learned, their associated content provider, and the assigned station of the content provider's CMS. During this time, the file metadata for these media files are not ready in the local station and thus the DS does not have the information to conduct a search and download the files. The learning agent issues a "fetch" packet to a local DS along with the content's origination station. The DS in turn issues a "fetch_info" packet to a DS of the assigned station of the content provider's CMS. After the DS obtains the file metadata for the desired media file, it stores the information into the database containing the file metadata and returns "fetch_ack" the learning agent. The learning agent may subsequently proceed to issue "prepare" commands to download the media file.

"Fetch_info": "Fetch_info" includes two packets, "fetch_info" fetch_info-block". Each "fetch" command has encoded within it the identification of a particular media file and a particular DS guaranteed to have the media file. In response to a "fetch" command, a DS issues "fetch_info" the DS station identified in the "fetch". The remote DS may reply with "fetch_info-block", which contains the information necessary to enable the local DS to save the media, track, and block metadata information into the local metadata database.

"Stop": The "stop" command may include two packets such as "stop" and stop_ack". The "stop" command is used to shutdown a DS. When a DS receives a "stop" packet, it immediately replies with "stop_ack" depending on the termination requirement, the DS may shutdown immediately or shutdown after it completes all the jobs it is executing.

Distributing Large Payload Files

To distribute a file, a content provider sets specific distribution criteria for that file. After the distribution server (DS) stores the uploaded large payload file as blocks, the content provider requests, through the content management server, that the DS distribute the file to other nodes in the SCDN, i.e., to push the content to the edge of the network. The distribution is in accordance with specific distribution criteria set by the content provider and may use the file distribution protocol (FDP) previously described. The distribution criteria may specify regions (e.g., Europe), specific nodes, and other information as desired by the content provider to control distribution of the content. For example, the distribution criteria may include information found in the nodes attribute or rolled up attribute bitmap.

The file distribution proceeds as follows: (1) The DS responds to the content provider's request to distribute a large payload file by sending a notification (i.e., a distribution request) to its neighbors to announce the existence and the distribution criteria of the file; (2) "Qualified" neighbors (i.e., those that meet the criteria) download several portions of the file during this initial distribution process; (3) The notification is then passed on from neighbor to neighbor, but not back to the neighbor from which the distribution request is received; (4) Each neighbor performs steps 2 and 3 until it encounters a leaf node or a "terminating" node. Thus, the distribution of the file in the network is done in stages.

Every node that receives a distribution request passes the request to all its neighbors except to the "requesting" node (i.e., the node from which it received the request). A terminating node is one where neither the node's attribute bitmap nor its rolled up bitmap match the distribution criteria and where the distribution request cannot be sent to the node's parent. For any node whose attribute bitmap matches the content provider's distribution criteria for the file, a portion of file is downloaded from the nearest neighbors in the distribution path that has the portion to be downloaded. Once downloaded, a DS stores the file locally as blocks spread over different storage volumes as shown in FIG. 7, blocks 711–713. In spreading the file over several storage volumes, the Input/Output (I/O) load is distributed across the volumes and thus increasing the overall performance of the DS during content distribution and content delivery. For purposes of the invention, the storage volumes can be any collection of storage devices, e.g., disk arrays attached to a server, RAID (Redundant Array of Independent Disks) systems, or Network Attached Storage (NAS)), or Storage Area Network (SAN).

Figure 13:
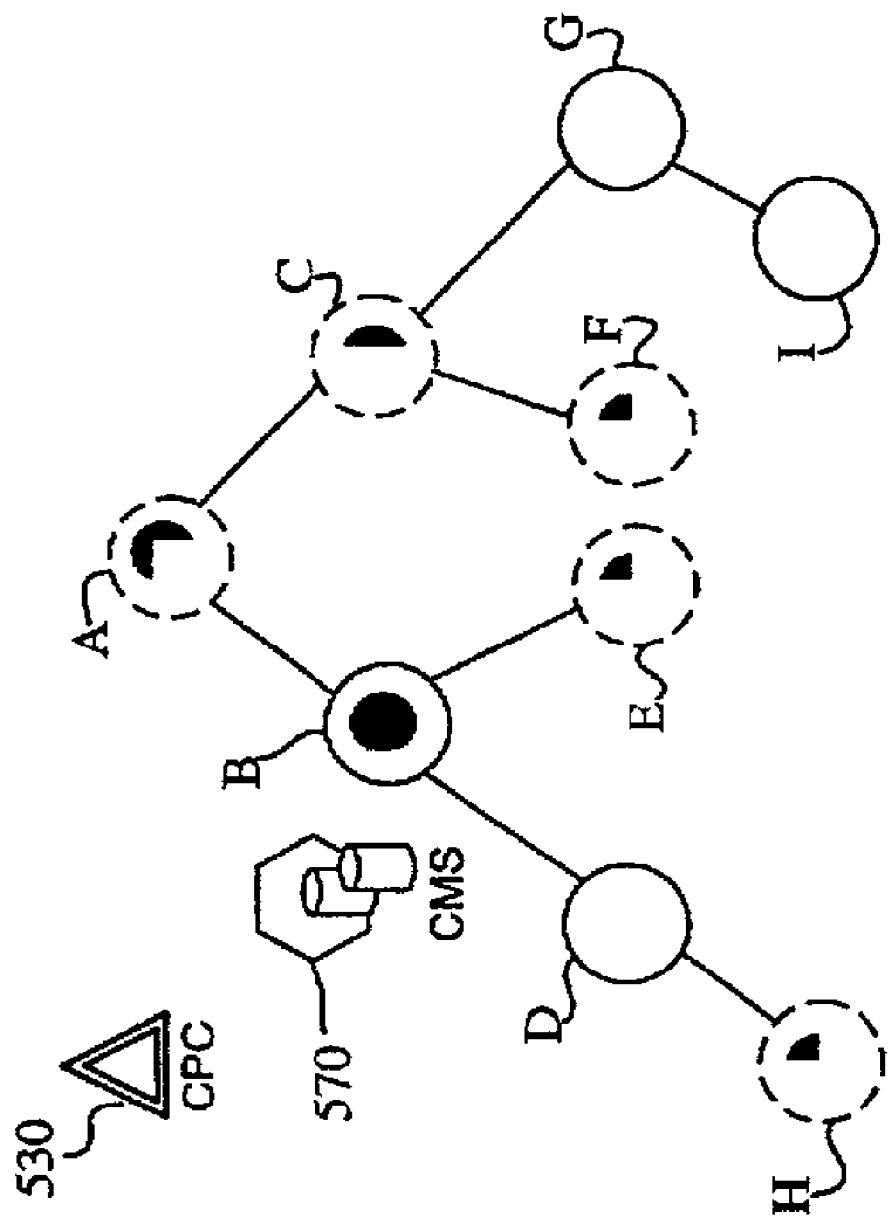
FIG. 13 is an illustrative embodiment of the distribution of a large payload file within the network of the present invention.

FIG. 13 is an illustrative embodiment of the distribution of a large payload file within an SCDN. A content provider uploads a large payload file into the content management server (CMS) 570, which is connected to node B of the SCDN, using any content publishing and management software running on the content provider's client system (CPC) 530. The content provider also uploads the distribution criteria onto CMS 570. Content management server 570, as previously described, divides the uploaded file into track files and issues a command similar to the FDP "put" command for each track file to the distribution server located in node B. In other embodiments, the CMS may be connected to any node of the SCDN. At node B, the DS divides the track files into block files for local storage. The full copy of the file is shown at Node B as a filled in dot. The CMS then issues an FDP command of the type "distribute" the distribution server at node B. In response to the distribute command, the DS issues a command to its neighboring nodes A, D, and E to replicate the content (e.g., using the "replicate" command of the FDP). Node D examines the replicate packet and decides its not supposed to have the content thus it passes the replicate command to its neighbor, node H. Nodes A, E, and H examine the replicate packet and decide they all match the distribution criteria (i.e., they are "qualified" nodes). When ready, nodes A, E, and H issue commands to retrieve a portion of the file from the nearest node (e.g., node B) in the SCDN. Nodes E and H are leaf nodes thus they do not propagate the replicate command. However, node A is the root node with child nodes B and C. Node A may not send the replicate command back to node B, because it is the originating node. However, node A may send the replicate request to node C. Node C checks the distribution criteria and decides it's a qualified node therefore it retrieves a portion of the file from the nearest nodes (e.g., the nearest of nodes A, B, E, and H) containing the needed data. Node C subsequently sends the replicate command to nodes F and G. Node F is qualified thus it retrieves a portion of the file from the nearest nodes having the data (e.g. nodes B or C). Nodes G and/are not qualified thus they receive nothing. Node G is a terminating node because the rolled-up attribute of its branch does not satisfy the distribution criteria. This initial replication process continues until all the qualified nodes in SCDN are at least partially populated. In one or more embodiments, the same portion (e.g., blocks) of the large payload file is contained in at least one node of the SCDN. Preferably, a plurality of nodes maintains the same portion thereby creating redundancy and preventing loss of any portion of the large payload file when one or more nodes or storage volumes become unavailable. For example, when a storage volume (or device) becomes unavailable (i.e., lost), a DS at that station need not take any special action to recover contents of the damaged volume since the portions of large payload files stored and hence lost in that volume are automatically downloaded from other network nodes upon demand to service a user request. The distribution servers also relay control information of a failed station to neighbors of the failed station to prevent improper termination of control commands.

During normal operation, a Distribution Server sends FDP commands, such as replicate, info, search, and clean commands that are forwarded to all or part of the network, through other Distribution Servers in the immediate neighbor stations in its control path. For example, when a Distribution Server receives an FDP command such as replicate or info, it sends the command to its neighbor DSs based on the FDP distribution criteria. In the situation when one of the neighbor stations is failed, the DS keeps the job in its job queue, and repeatedly retries until the job is successfully completed. At the same time, the DS temporarily assumes the role of the DS in the failed station by forwarding the FDP command to the neighbor DSs of the failed station.

The FDP uses the content provider's distribution criteria to direct the distribution of the large payload file in whole or in part to all nodes in the network meeting the provider's distribution criteria. A distribution request can start from any node in the tree, and traverses up and down the tree until it reaches a leaf node or arrives at a terminating node. For any node having the appropriate attributes, the file is partially downloaded from the nearest neighbors that meet specific performance criteria if those neighbors contain the portion of the file to be downloaded. The nearest neighbor when downloading content is not necessarily the nearest in the virtual tree but nearest in terms of distance. This prevents massive transfers from the node at which the file is initially uploaded. Moreover, the staging nature of the distribution prevents excessive demands on the network around the initial node (e.g., node B). By delivering smaller blocks and only a partial file this delivery method reduces network load. Additionally, because the distribution requests stop progressing through the SCDN when they arrive at a "terminating" node, the present invention prevents unnecessary distribution request packets from flooding the network.

Accessing Large Payload Files

An end-user may request access to a large payload file (e.g., a movie) via an interface, such as a Web-browser, on the end-user's client system. The request is forwarded to an appropriate Application Server (i.e., one that is closer to the end-user and with bandwidth to service the request) that will provide the file to the end-user, e.g., a Streaming Server for delivering large video files, or an FTP Server for delivering large, media rich documents, or any media player that is capable of mounting the VFCS as its remote file system in order to have access to content in the SCDN. The application server is in the network and thus may be connected to the nearest node of the SCDN. The SCDN node's storage volumes (i.e., cache memory) may contain some, none, or all of the blocks of the end-user's requested file. If either additional or the full content of the file is needed at the Application Server, the SCDN node's VFCS communicates with a local DS to issue a search request, on behalf of the Application Server, to all the DS's neighbors to locate the needed (non-resident) portions of the file.

For example, assume the requested large payload file is 10 Gbytes in length, corresponding to a total of 20 blocks of 500 Mbyte storage (i.e., if each block is 500 Mbyte). Further, assume only 6 such 500 Mbyte blocks reside locally within the SCDN node. Even though only 3 G bytes of the requested file are actually stored in the SCDN node's storage system, the entire file "appears" exist locally to the Application Server via the VFCS. At the request of the VFCS, the non-resident portions of the file are pulled from different distribution servers in the SCDN and stored locally as the Application Server streams the file to the end-user. Portions of the file might be retrieved from several distribution servers concurrently. Typically, data received over the SCDN are stored as blocks in the shared Storage (e.g. local storage volumes). The VFCS assembles and multiplexes the stored block files into the 10 GByte file in real time so the Application Server can use it (e.g., stream the file to the end-user).

To locate the non-resident portions of the file, a DS in a cluster of DSs issues a search request that traverses the SCDN tree, starting from its neighbor nodes. The search request may include the distribution criteria of the requested file and a time-to-live counter. A time-to-live counter may, for example, specify that the search request need only traverse two hubs of the SCDN from the requesting node. When a neighbor node receives and evaluates the search request, the node may decrement the counter, for example. A search request terminates when it encounters a leaf node, a "terminating" node or the time-to-live counter is zero (i.e., where the search request includes a counter). Where the missing data is not located and the time-to-live counter reaches zero, i.e., if it is included in the search request, the search request continues by traversing the SCDN nodes in the reverse path of the initial distribution process. A node replies directly to the requesting DS if the requested part of the file exists in that node. Nodes not having any portion of the requested file do not reply. A reply also includes the performance status of the node that sends the reply and the portions of the file available. When the requesting DS cluster receives reply packets from any nodes in the SCDN indicating that they contain part or all of the requested file, the DSs in the cluster download the missing content from those nodes that are least congested and stores it locally in the distribution server's shared storage volumes. Thus, as the application server is providing the data to the end-user, the distribution servers are obtaining the remainder of the file from other nodes and there is no break in the communication between the application server and the VFCS.

As discussed earlier, a large payload file is broken down into portions (e.g., block files) and distributed throughout the SCDN. Thus, when nodes that contain portions of the file are found through the search request, a cluster of DSs can download portions of that file in parallel from multiple nodes, especially from those nodes that are currently the least congested. The initiating DS cluster decides, based on the performance information in the reply packets, where to download (i.e., "pull") missing content so as to minimize the latency and bandwidth demands on other distribution server nodes.

Content portions are pulled from the appropriate distribution servers and assembled in real-time for the end-user by the VFCS, running on one or more VFCS Servers. The VFCS enables the Application Servers to view the distributed storage volumes that exist in the SCDN as a single, large virtual file system.

Retrieving Non-Contiguous File Segments

From one perspective, each stored block in the system storage of an SCDN node corresponds to a contiguous segment of a large payload file (e.g., a contiguous interval of movie). For example, the segments that comprise a movie, if viewed one after the other from the first segment to the last segment, would result in viewing the entire movie. Since the same content portions (i.e., segments) are located at several different nodes in the SCDN, non-contiguous segments of a file (e.g., non-contiguous portions of a film) can be retrieved independently and in parallel. This has several important side effects. For example, since a DS can obtain needed content portions from several different distribution servers, the reliability and availability of the SCDN are significantly increased. Additionally, the end-user can efficiently access segments of a large payload "out-of-order", e.g., fast-forwarding of a movie can be realized without actually having to download all of the portions of the film that are not actually viewed. Importantly, pruning (freeing the storage used by some blocks for use by other blocks) can be done at the "block level" (versus the entire "file level") based on specific content provider policies, e.g., pruning can be based on usage patterns. Usage of the content can also be rated at the block level.

Block Size and File Distribution

The size of the blocks affects the performance of both content distribution and content delivery. Several important factors are considered in determining a block size: 1) Ethernet MTU (Maximum Transmission Unit) size, 2) the size of the physical units of storage, 3) the time required to transfer a block (which is related to the network bandwidth), and 4) the shortest acceptable period to be skipped in response to a fast forward or rewind command during content delivery (this is called the minimum flash interval).

Several goals come into play in determining the block size. One goal is to maximize space usage within an MTU, which would make content distribution more efficient. Another goal is to minimize congestion at the distribution nodes. Another important goal for determining block size is to prevent storage fragmentation, since fragmentation degrades file system performance, again consistent with achieving the other goals.

Block sizes that are too big or too small can affect performance. Consider the fast forward command, for example. If the block size were too big, server response to fast forward requests during a download would be sluggish, as the server has to finish downloading the particular block file before it can process such requests. Conversely, if the block size were too small, fast forwarding to the end of the block would be very quick. If the block size is within the minimum flash interval, another distribution server can respond to fast forward requests by retrieving the block containing the target content.

Based on the above criteria, assumptions made about the physical network that supports the SCDN, and assumption relating to the size of the flash interval and minimizing network congestion, the block size in a one embodiment may be 256 Kbytes, for example. It will be evident to those of ordinary skill in the art that the block size could change when one or more of the assumptions change and that the value may be implementation and application specific.

Additionally, the block size in the storage of a delivery network does not have to be a constant. Each DS in the network may have its own setting depending on the specific nature of the storage devices and its network condition. Each file may have a different block size.

The number of blocks distributed to a qualified node during the initial file distribution phase is determined by a number of factors, including the distance from the originating DS (i.e., where the file was uploaded) to the node, the front and back end bandwidth of the node (the current network conditions), predicted network conditions, the history usage information of the node, a "popularity" index set by the content provider, as well as the storage available at that node to the content provider.

Scalability and Adaptability (Learning and Pruning)

A SCDN in accordance with an embodiment of the present invention is highly scalable. For example, when a new node is added to the SCDN, it downloads the initial content it needs by employing one of several different adaptable initialization processes. In one embodiment of the invention, an "Auto-initialization" process is used. When a node is added to an SCDN, it is given a set of attributes. In the auto-initialization process, as soon as the node is connected to the network, it issues an FDP "Learn" similar request to all its neighbors. The node encodes its attributes in the learn request. The neighbors offer content, consistent with the new node's attributes, to it for downloading. The neighbors then pass on the new nodes learn request to all of their neighbors, which take similar action. Thus, the new node's learn request traverses the entire network and all the nodes in the network respond to the learn request if they have contents appropriate for the new node. The new node collects all the information, downloads the necessary initial contents, and is now a functioning element of the SCDN.

Figure 25:
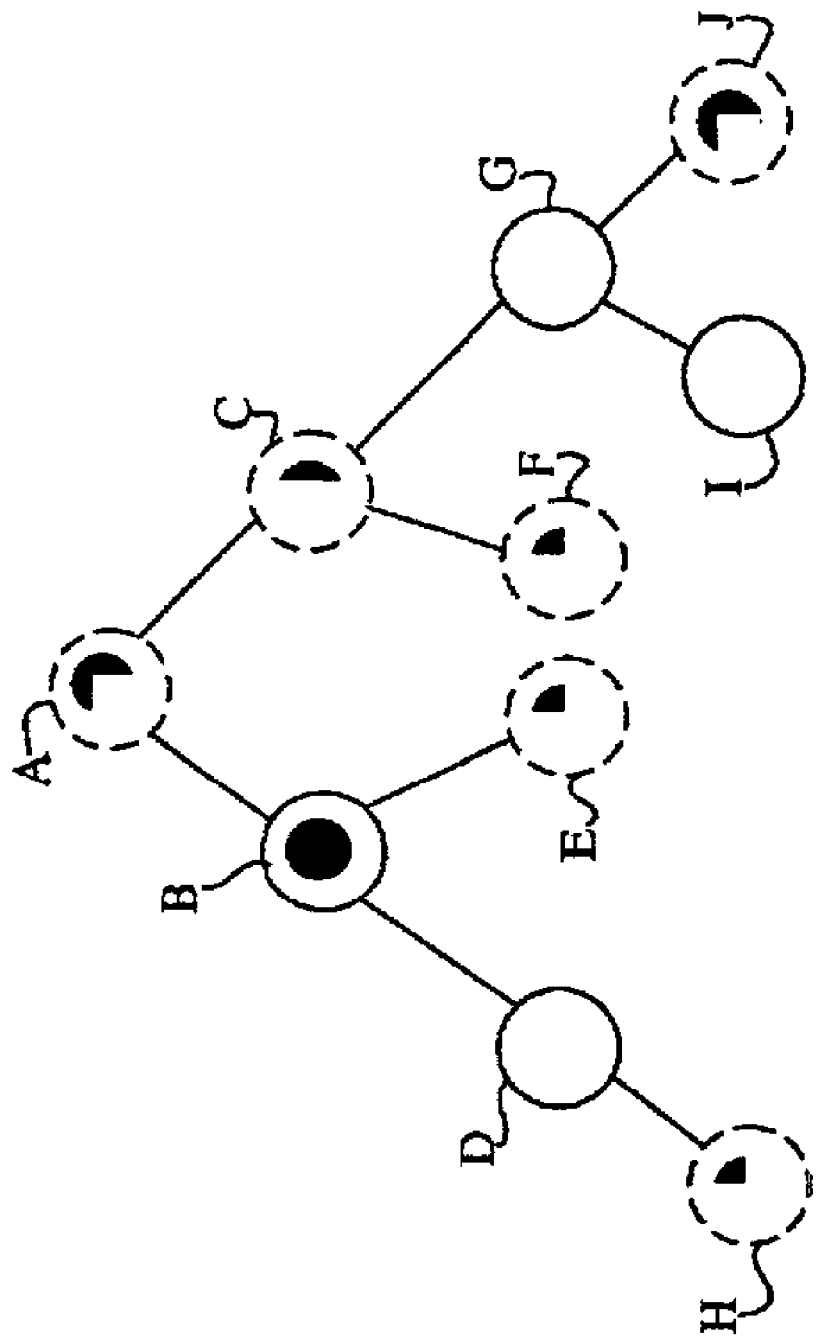
FIG. 25 illustrates how new nodes adaptively initialize by learning and downloading content they should have, within the scalable content delivery network.

An example of this auto-initialization process will be discussed in the context of FIG. 25, which illustrates new node j added to the SCDN. A learn request is initiated by node j as soon as it is connected to the SCDN. It issues the learn request, which contains its attribute bitmap, to all its neighbors.

In this example, there is only one immediate neighbor, node G. When node G receives the "learn" request, it compares node J's attribute bitmap to the distribution criteria of its own content. Node G replies to J if it has any appropriate content for node J to download. Node G then passes the learn request to all its neighbors (i.e., Nodes I and C) other than node J, the initiating node. Each node to which the request is passed likewise evaluates the learn request, conditionally replies, and propagates the request in accordance with the foregoing. The learn request terminates when it encounters a leaf node or a "terminating" node.

As the learn request traverses the SCDN, all the nodes respond to node J if they have contents that node J should have. Finally, node j collects all the response information and downloads the necessary initial contents from the nodes that can most optimally supply them. Node J is now available to service content delivery requests.

There are additional situations in which learning and adaptation processes may be used in other embodiments of the invention. For example, as a large payload file is accessed, VFCS serves the content to Application Servers (such as Streaming Servers), while it also communicates with distribution servers to pull missing content portions from other locations. As more and more content portions are downloaded to satisfy end-user requests, the storage space for each content provider must be carefully monitored. Based on storage availability and usage information collected by VFCS, a pruning process could be used to remove certain blocks of media files. The policy associated with the pruning process should address: (1) when to prune, (2) how much to prune, and (3) which blocks to prune. After pruning, a server's storage system may contain entire media files or non-contiguous segments of files that are accessed frequently by local users. Additionally, the content provider might be apprised that more storage or more Distribution Servers, Application Servers, or VFCS Servers should be added to the network.

Scalable Content Delivery Network with Stations

Figure 14:
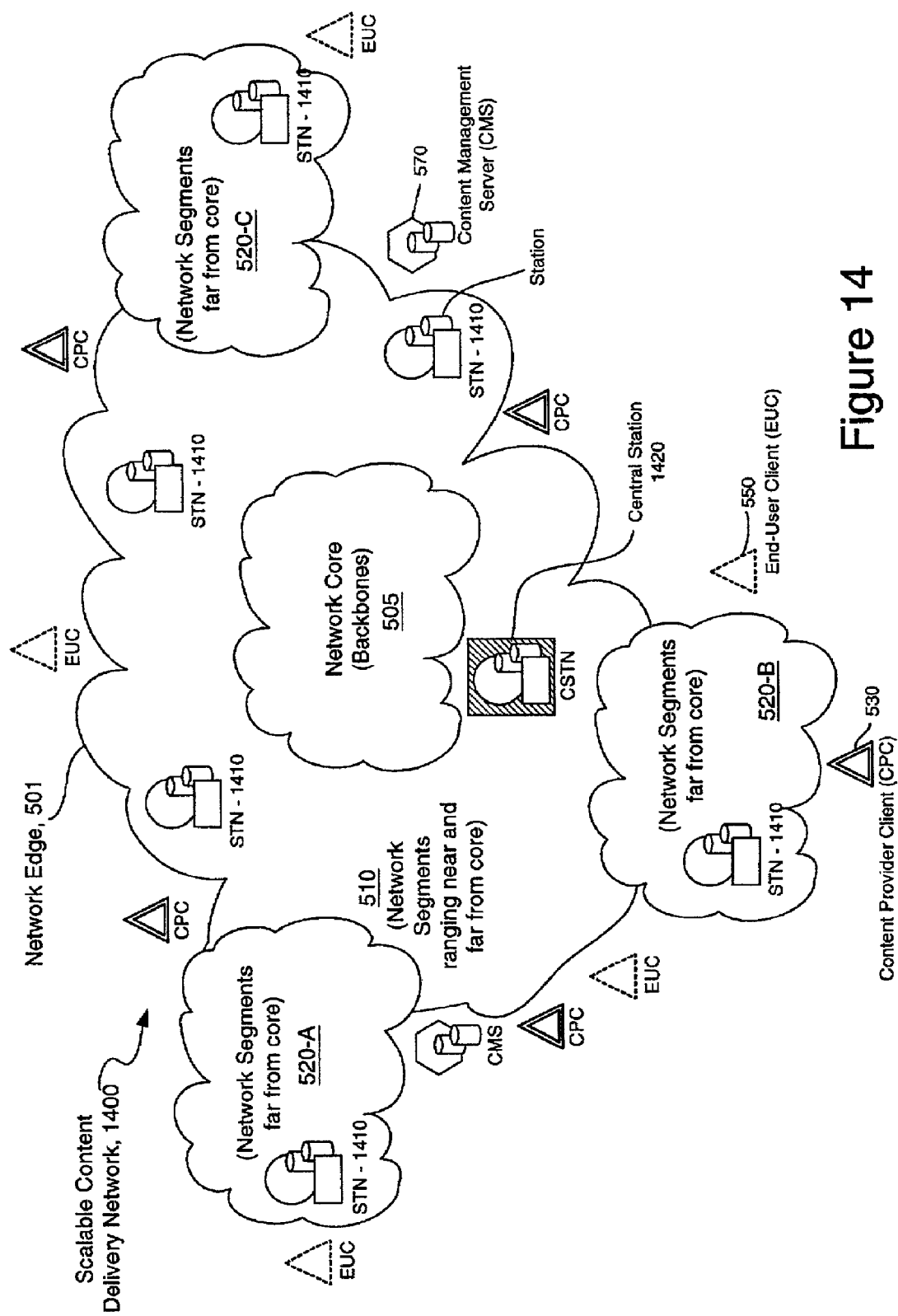
FIG. 14 is an illustrative example of another embodiment of the Scalable Content Delivery Network.

FIG. 14 is an illustrative example of another embodiment of the Scalable Content Delivery Network. SCDN 1400 is essentially the same as SCDN 500 (see FIG. 5) with the individual Distribution Centers and individual Application Servers of SCDN 500 replaced by a plurality of SCDN Stations 1410 and a Central Station 1420.

As in the earlier embodiments, the stations of SCDN 1400 are organized in a logical virtual tree structure in which each node in the tree has a set of attributes. Thus, each Station has an attribute set that is stored in the node and can be represented in any convenient data structure, e.g., the attribute set can be represented as an attribute bitmap. Furthermore, each Station (i.e., node) also contains a representation of the rolled up attribute set of each of the station's child-Stations. This representation is called the "Rolled Up Set of Attributes" any convenient data structure can be used for it, e.g., a "Rolled Up Bitmap", which may be the defined as the "binary OR" combination of all rolled up attribute bitmaps from the child-Stations. The distribution servers within a Distribution Server Cluster use the attribute bitmap to distribute and route portions of large payload files and they use the aggregated rolled-up attribute bitmap to terminate unnecessary propagation of messages. One of the Stations in an SCDN is designated the "Central Station". The Central Station holds an attribute database table that matches text strings to bit positions, e.g., a reference table. Central Station 1420 is not necessarily a data repository for all content but may contain some or all the content.

Figure 15:
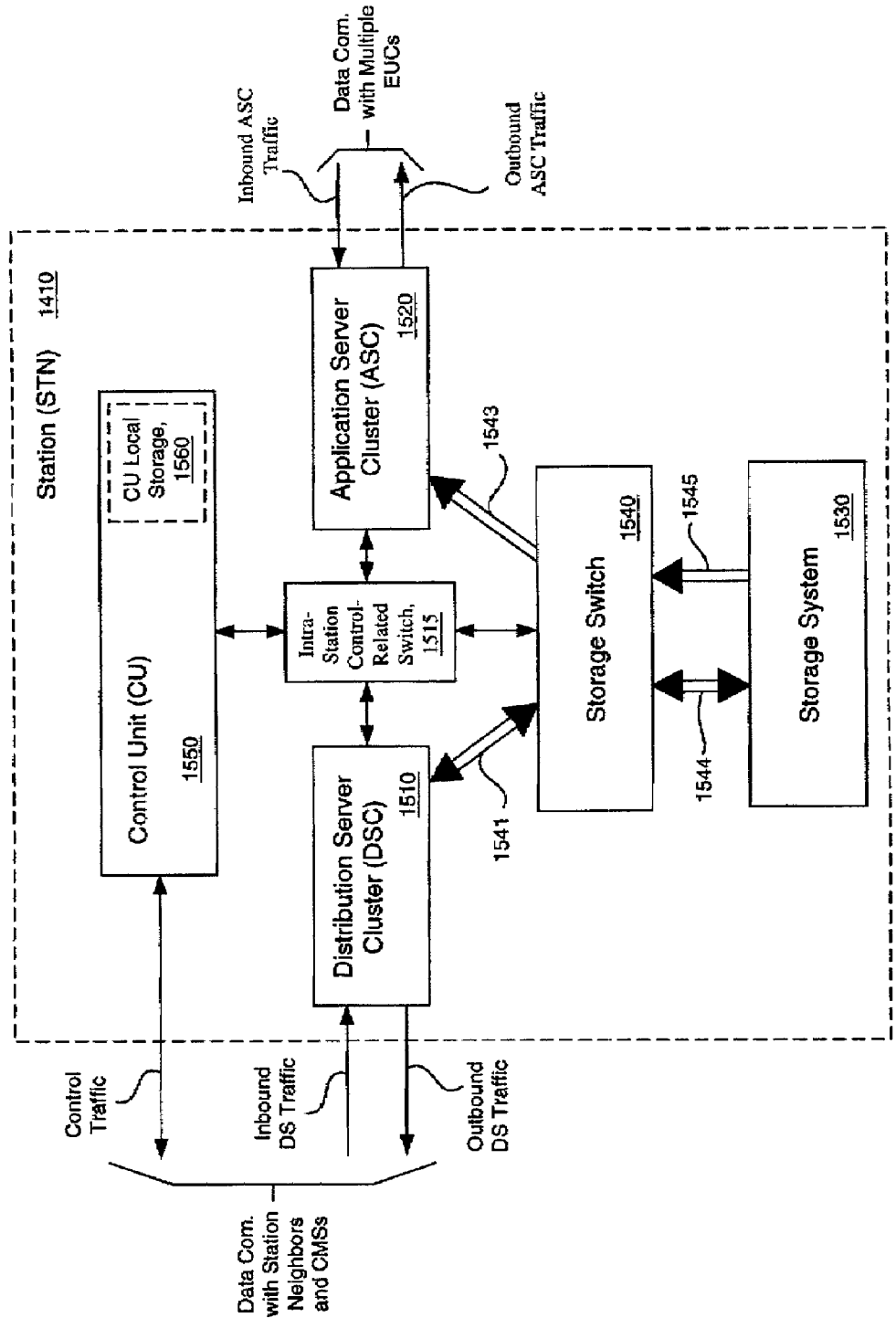
FIG. 15 is an illustration of a scalable content delivery network station in accordance with an embodiment of the present invention.

In one or more embodiments of the present invention, an SCDN station (a.k.a. "Data Center") may be configured as shown in FIG. 15. Station 1410 includes a Distribution Server Cluster (DSC) 1510, an Application Server Cluster (ASC) 1520, a Control Unit (CU) 1550, a shared Storage System 1530, a Storage Switch 1540, and Intra-Station Control related Switch 1515. The distribution server cluster 1510 communicates with storage system 1530 through storage switch 1540 using communication links 1541 and 1544. The application server cluster 1520 communicates with storage system 1530 through storage switch 1540 using communication links 1543 and 1545. The control unit 1550, distribution server cluster 1510, and application server cluster 1520 all communicate through intra-station control related switch 1515, which communicates with storage switch 1540. The control unit has its local storage system 1560. The various components will be discussed in more detail later in this specification.

Figure 16:
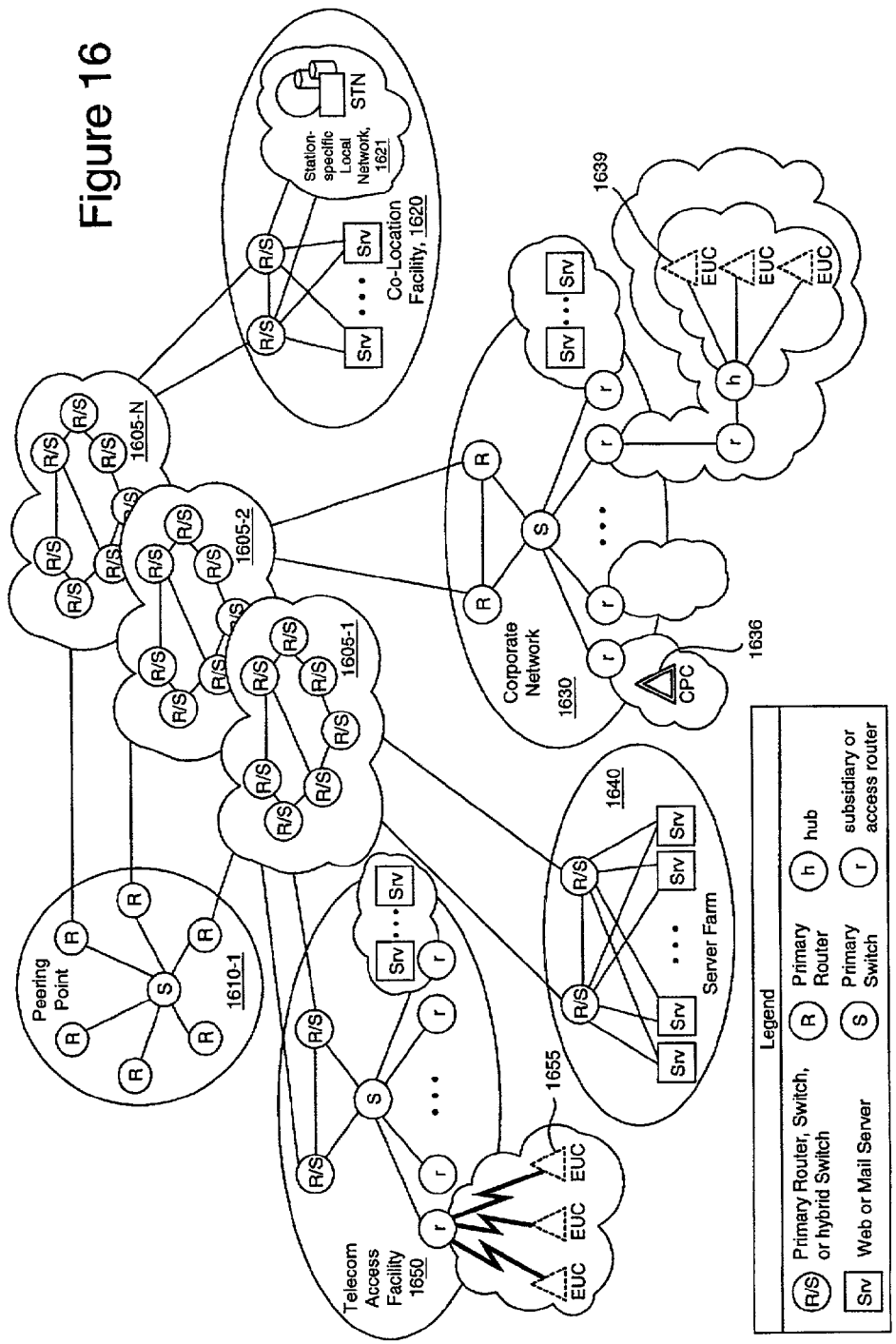
FIG. 16 provides an alternate illustration of the Scalable Content Delivery Network of FIG. 14.

FIG. 16 provides an alternate illustration of the SCDN of FIG. 14. FIG. 16 is an abstract representation of the Internet. Comparable to the network core 505 of FIG. 14, high-speed backbones 1605-1 through 1605-N, generally owned and operated by long-haul communications providers, are coupled via peering point 1610-1 (and other peering points not shown). Telecom Access Facility 1650, Server Farm Facility 1640, Corporate Network 1630, and Co-location Facility 1620, arrange with one or more long-haul communications providers to gain access to one or more of the backbones. Each of these major facility types generally provides fractional access to the backbones to secondary companies, groups, and individuals under a wide variety of arrangements. (Telecom Access Facility 1650, should be construed to included such telecommunication variants as Internet Service Providers providing Dial-up Analog Modem access, Cable System Head Ends providing cable modem access, and Telephone Company Central Offices providing DSL and other data communication variants.)

As shown, end-user client systems (e.g., EUC 1655 and EUC 1639), generally access or provide email, web-pages, and other Internet-based resources, via Telecom Access Facility 1650 or via connection through subsidiary portions of corporate networks 1630. CPCs (e.g., 1636) generally upload content via connections within a corporate network, although access via a telecom access facility is also common.

The station specific local network 1621 may include one or more hubs, switches, or routers that interface the station components to the network within the facility where the station is located. The exact configuration of station specific local network 1621 is a function of the scale of the station configuration (i.e., the number of each particular kind of server and the number of storage volumes), the various traffic flows expected for each station component, and the particular details of the facility where the station is located. While the station is shown at co-location facility 1620, this is merely illustrative, as the station could be located anywhere within the larger network.

Distribution Server Clusters

Figure 17:
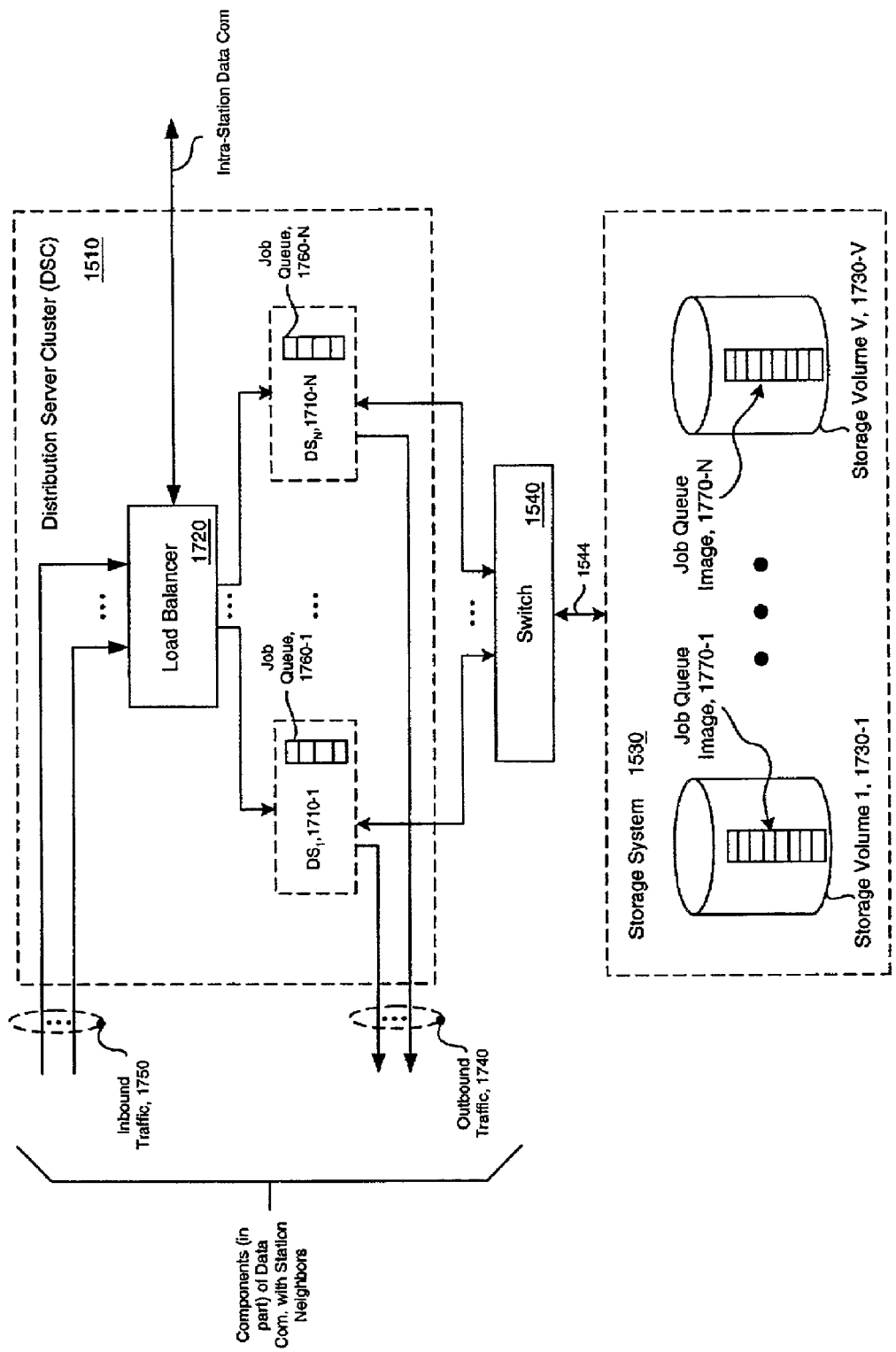
FIG. 17 is an illustration of a distribution server cluster configuration in accordance with an embodiment of the present invention.

A Distribution Server Cluster (DSC) provides, among other things, system fault tolerance and scalability. FIG. 17 is an illustration of a distribution server cluster configuration. DSC 1510 includes a plurality of Distribution Servers 1710-1 through 1710-N (collectively, 1710) and a Load Balancer 1720. The distribution servers, 1710, access data (e.g., Block Files) on Storage Volumes 1730-1 through 1730-V (collectively, 1730) in the shared Storage System 1530 via Switch 1540. A DS (e.g., DS 1710-1) in the distribution server cluster may issue a request (e.g., a search request) to a DS of a neighbor station via requests that are components of Outbound Traffic 1740. Similarly, a DS of a neighbor station may issue a request (e.g., a learn request) to a DS within DSC 1510 via requests that are components of Inbound Traffic 1750. The Load Balancer 1720 dispatches the Inbound Traffic 1750 to one of the distribution servers 1710-1 through 1710-N. Load Balancer 1720 may be implemented as a load balancing router in various topological combinations with a standard router and may also handle the outbound DS Traffic (e.g., 1740).

Each DS treats its requests (search, learn, etc.) as jobs to be executed. The jobs are stored and managed in Job Queues 1760-1 through 1760-N (collectively, 1760) in the memory (e.g., random access memory) of each respective server. Job Queue Images 1770-1 through 1770-N (collectively, 1770) corresponding respectively to Job Queues 1760-1 through 1760-N, are stored in a database in the Storage System 1530. As discussed below, the station's Control Unit (CU) 1550 manages this and a number of other databases in Storage System 1530. Note that the database containing Job Queue Image 1770 is mapped onto Storage Volumes 1730 merely for convenience in making the illustration. It should be apparent to those of ordinary skill in the art that the Job Queue Image database and other SCDN-related databases may be mapped onto any available Storage Volumes.

Each DS periodically registers a "heartbeat" in a Control Unit database and, periodically, they watch for each other's heartbeat. During startup (e.g., power-up), the distribution servers in a DSC vote for a "Master Server". If, for example, DS 1710-1, misses h heartbeats, where h is a configurable parameter, it is assumed that DS 1710-1 is no longer functioning. The Master Server then re-distributes the jobs associated with DS 1710-1 to the active (i.e., living) distribution servers within the DSC. If the Master Server ceases to function, all the living distribution servers vote for a new Master Server. The new Master Server then re-distributes the previous Master server's orphaned jobs, if any exist.

In the event that the Control Unit's database is no longer accessible, the distribution servers function as usual except that their job queues are mirrored to the local storage of each individual server machine. During this time, it could happen that either a DS's job queue database cannot be accessed or a DS crashes. If either event occurs, the server machine would eventually need to be re-started. It would then read and recover all the jobs saved in its local file system prior to the failure.

Application Server Clusters

Figure 18A:
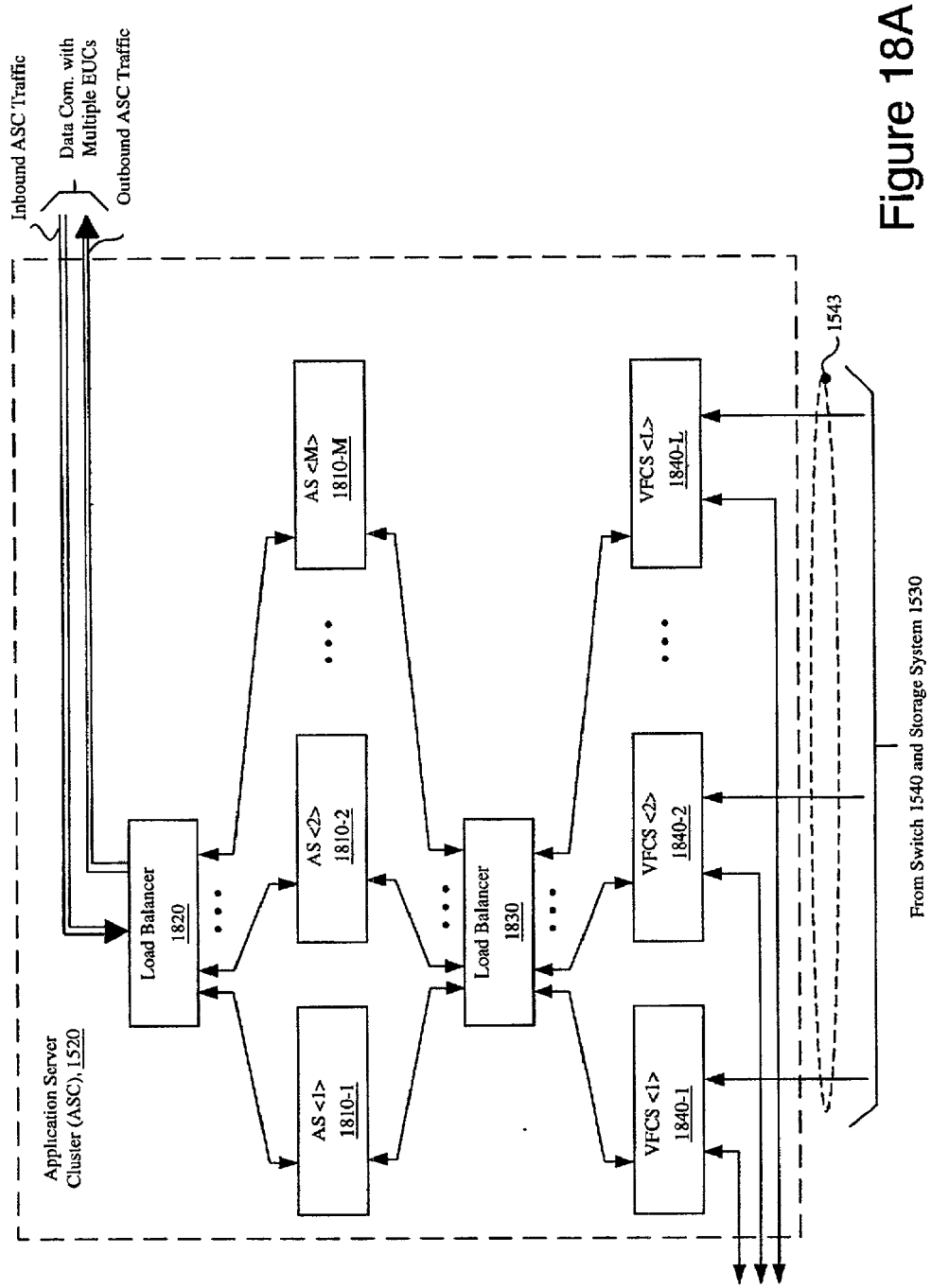
FIGS. 18A–18C provide three illustrative embodiments of the application server cluster in accordance with embodiments of the present invention.
Figure 18B:
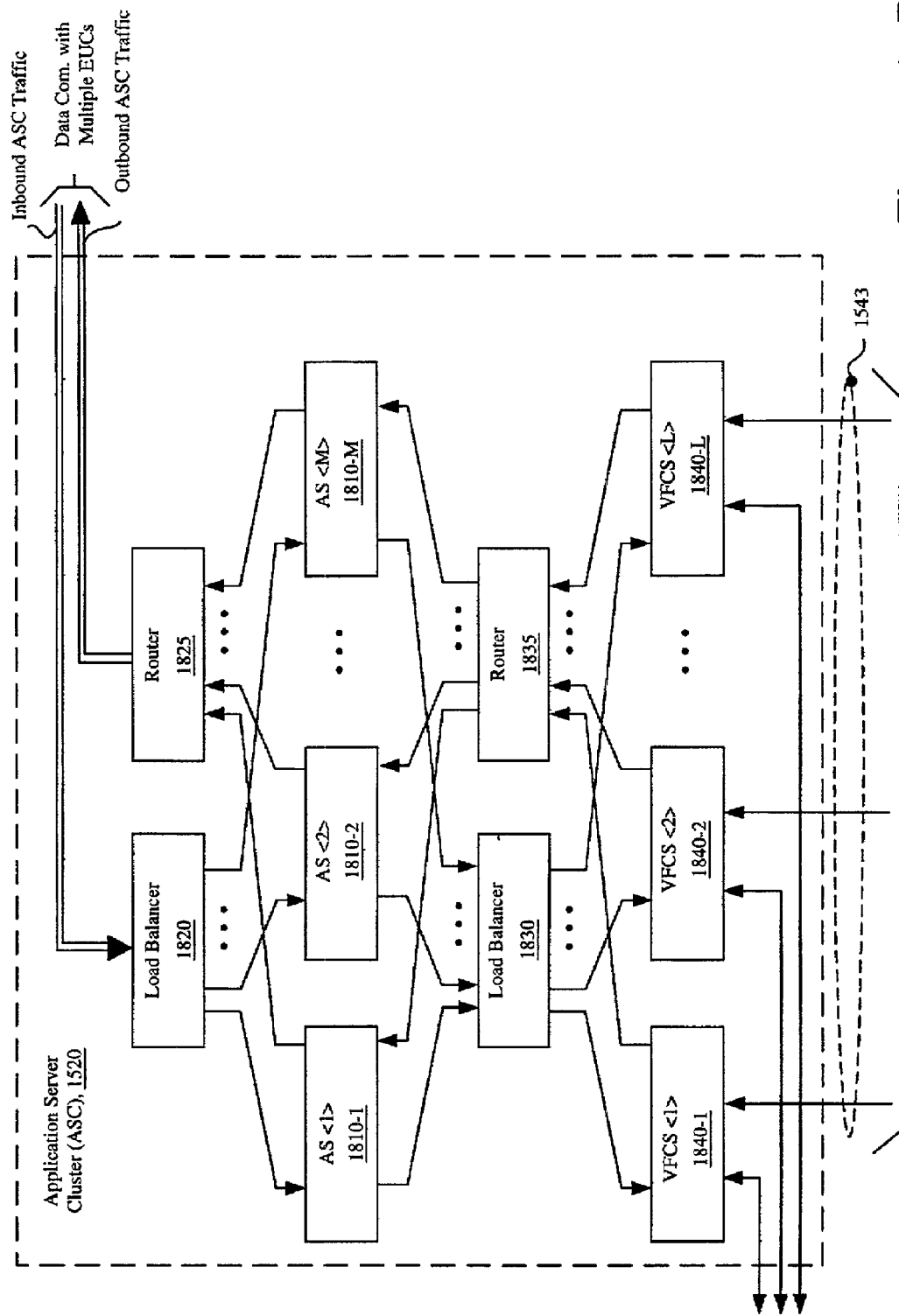
Figure 18C:
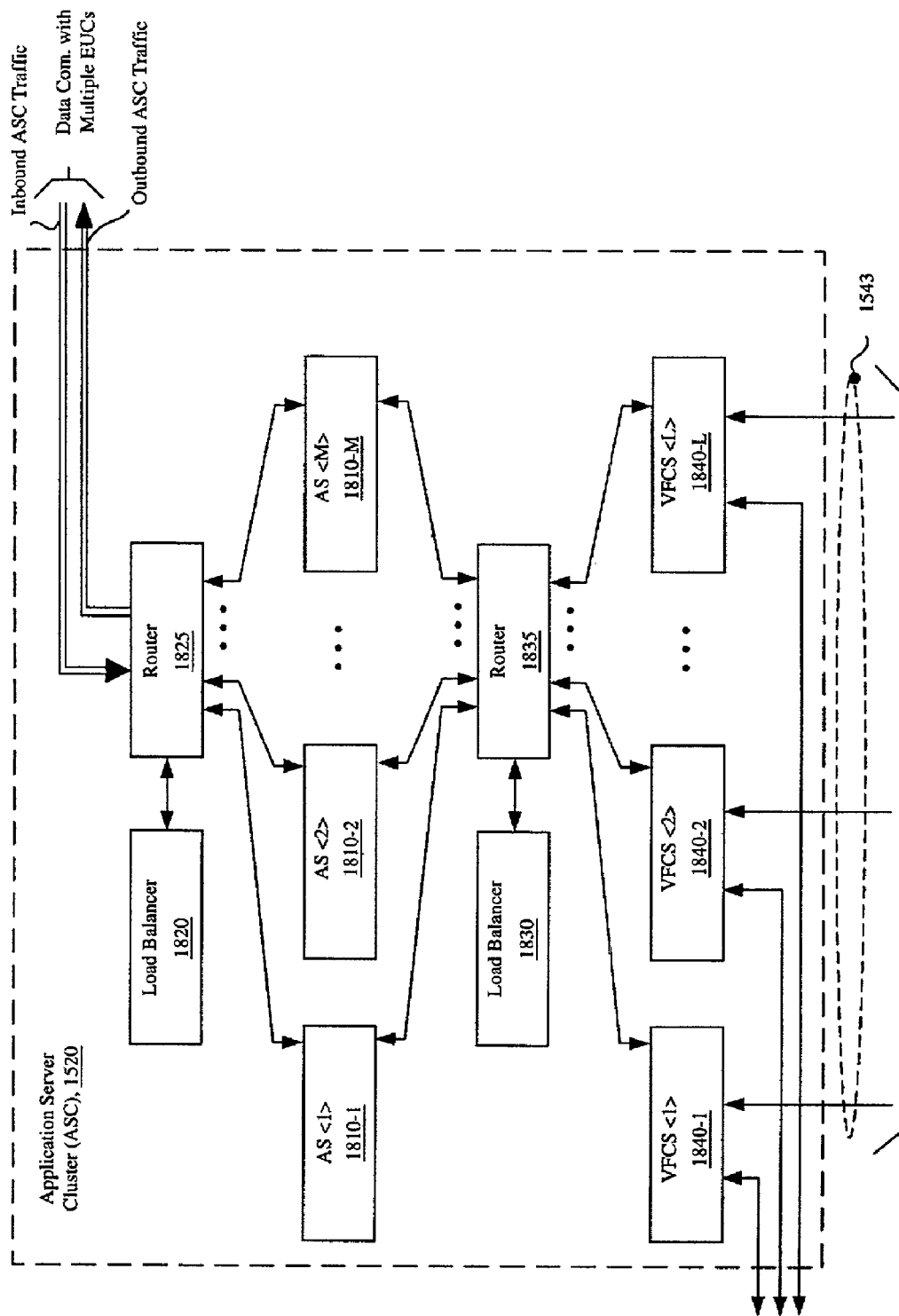

An Application Server Cluster (ASC) provides, among other things, services to the end-user (e.g., streaming a full-length movie to an end-user's client system), while providing system fault tolerance and scalability. FIGS. 18A through 18C provide three illustrative embodiments of the application server cluster. Across all three embodiments, ASC 1520 includes Load Balancers 1820 and 1830, a plurality of Application Servers 1810-1 through 1810-M (collectively 1810), and a plurality of VFCS Servers 1840-1 through 1840-L (collectively 1840). The application server clusters provide fault-tolerant and scalable system performance. For example, if one of the Application Servers fail or if one of the VFCS Servers fail, one of the other existing Application Servers or VFCS Servers, respectively, will process the requests. Similarly, if more system performance is required, the Application Servers, VFCS Servers, or storage capacity of the Storage System can be increased as required.

FIG. 18A is an illustrative embodiment of the Application Server Cluster 1520 of FIG. 15. Each Application Server 1810 accesses data (e.g., large payload files) via one of the station's VFCS Servers 1840, which in turn access data in the Storage System 1530 via Switch 1540. Although they are shown logically as two separate units in FIG. 18A, Load Balancer 1820 and Load Balancer 1830 may be the same physical unit. Also, Application Server 1810 and VFCS server 1840 may be contained in the same physical unit thereby eliminating one of load balancers 1820 and 1830.

An end-user requests a large payload file using a standard interface (such as a web browser) that is running on the end-user's client machine. As a result, a service request for the file is sent to an ASC and arrives at Load Balancer 1820. The inbound data packets for the service request are forwarded by Load Balancer 1820 to one of the Application Servers 1810, e.g., Application Server 1810-1 (an arbitrary illustrative one of 1810-1 through 1810-M). Application Server 1810-1 issues a request for the required data to Load Balancer 1830. Load Balancer 1830 selects one the of station's VFCS Servers 1840, e.g., VFCS 1840-3 (an arbitrary illustrative one of 1840-1 through 1840-L), to handle the request and forwards the data packets from Application Server 1810-1 to VFCS 1840-3. Assuming all of the requested data is present in Storage System 1530, VFCS 1840-3 processes the request by accessing the data in Storage System 1530 via Switch 1540 and sends data and response back to Application Server 1810-1 via Load Balancer 1830.

When Application Server 1810-1 establishes a session with VFCS 1840-3, Load Balancer 1830 continues to forward data back and forth between Application Server 1810-1 and VFCS 1840-3. If Load Balancer 1830 supports the previously described (i.e., in the background section) "sticky" feature and the "sticky" feature is turned "on", data from Application Server 1810-1 may continue to be directed to VFCS 1840-3 beyond the current session, if VFCS 1840-3 remains available (i.e., if Load Balancer 1830 does not allocate VFCS 1840-3 to another Application Server). When VFCS 1840-3 becomes unavailable, Load Balancer 1830 directs data packets from Application Server 1810-1 to another VFCS Server, e.g., VFCS 1840-1 (another arbitrary illustrative one of 1840-1 through 1840-M). VFCS 1840-1 processes the request from Application Server 1810-1 and sends response data packets to Application Server 1810-1 via Load Balancer 1830. Data packets from Application Server 1810-1 are sent back to the client via Load Balancer 1820. Just like Load Balancer 1830, Load Balancer 1820 maintains a persistent session between the end-user's client system and Application Server 1810-1. Load Balancer 1820 may also provide the "sticky" feature.

When a new request from a different end-user client system arrives at Load Balancer 1820 of the ASC, Load Balancer 1820 forwards the new request to an available Application Server, e.g., Application Server 1810-3 (another arbitrary illustrative one of 1810-1 through 1810-M). Application Server 1810-3 processes the request and in turn makes a data request to one of the station's VFCS Servers via Load Balancer 1830, e.g., VFCS 1840-2 (another arbitrary illustrative one of 1840-1 through 1840-L). Load Balancer 1830 then forwards the data packets from Application Server 1810-3 to VFCS 1840-2. VFCS 1840-2 processes the request from Application Server 1810-3 and sends responses back to Application Server 1810-3 via Load Balancer 1830. Application Server 1810-3 sends responses to the new end-user client system via Load Balancer 1820.

FIG. 18B is another illustrative embodiment of the Application Server Cluster 1520 of FIG. 15. The embodiment of ASC 1520 in FIG. 18B, includes one or more Application Servers 1810-1 through 1810-M (collectively 1810), Load Balancer 1820 with low bandwidth capability, Router 1825 with high network throughput, Load Balancer 1830 (also with low bandwidth capability), Router 1835 and one or more VFCS Servers 1840-1 through 1840-L (collectively, 1840). Each Application Server accesses data (e.g., large payload files) via one of the station's VFCS Servers 1840, which in turn accesses data in Storage System 1530 via Switch 1540. Although they are shown logically as two separate units in FIG. 18B, Load Balancer 1820 and Load Balancer 1830 may be the same physical unit, and Router 1825 and Router 1835 may be the same physical unit. Also, Application Server 1810 and VFCS server 1840 may be contained in the same physical unit thereby eliminating one of load balancers 1820 and 1830 and routers 1825 and 1835. Thus, a configuration according to an embodiment of the present invention eliminates load balancer 1830, router 1835, and combines application server 1810 with VFCS server 1840.

The present embodiment leverages the fact that the outbound traffic from both the VFCS Servers 1840 and the Application Servers 1810 of the application server cluster is significantly higher than the inbound traffic. As shown in FIG. 18B, the outbound traffic is sent to Router 1825 and Router 1835 and Load Balancer 1820 and Load Balancer 1830, while the inbound traffic is sent to the load balancers and not the routers. By separating the inbound and outbound traffic, this embodiment contributes to network performance improvement.

An end-user requests a large payload file using a standard interface (such as a web browser) that is running on the end-user's client machine. As a result, a service request for the file is sent to an ASC and arrives at Load Balancer 1820. The inbound data packets of the service request are forwarded by Load Balancer 1820 to one of Application Servers 1810, e.g., Application Server 1810-1 (an arbitrary illustrative one of 1810-1 through 1810-M). Application Server 1810-1 issues a request for the required data to Load Balancer 1830. Load Balancer 1830 selects one of VFCS Servers 1840, e.g., VFCS 1840-1 (an arbitrary illustrative one of 1840-1 through 1840-L), to handle the request and forwards the data packets from Application Server 1810-1 to VFCS 1840-1. Assuming all of the requested data is present in Storage System 1530, VFCS 1840-1 processes the request by accessing the data in Storage System 1530 via Switch 1540 and sends the data and a response back to Application Server 1810-1 via Router 1835.

When Application Server 1810-1 establishes a session with VFCS 1840-1, Load Balancer 1830 continues to send data from Application Server 1810-1 to VFCS 1840-1. If Load Balancer 1830 supports the "sticky" feature and that feature is turned "on", data from Application Server 1810-1 may continue to be directed to VFCS 1840-1 beyond the current session, so long as VFCS 1840-1 remains available (i.e., if Load Balancer 1830 does not allocate VFCS 1840-1 to another Application Server). The data from VFCS 1840-1 to Application Server 1810-1 flows through Router 1835. Router 1835 forwards data packets it receives from VFCS 1840-1 to Application Server 1810-1. Application Server 1810-1 sends data packets to the end-user client system via Router 1825.

When a new request from a different end-user client arrives at Load Balancer 1820 of the ASC, Load Balancer 1820 forwards the new request to an available Application Server, e.g., Application Server 1810-3 (another arbitrary illustrative one of 1810-1 through 1810-M). Application Server 1810-3 processes the request and in turn issues a data request to one of the VFCS Servers via Load Balancer 1830, e.g., VFCS 1840-3 (another arbitrary illustrative one of 1840-1 through 1840-L). VFCS 1840-3 processes the request from Application Server 1810-3 and sends data back to Application Server 1810-3 via Router 1835. Application Server 1810-3 sends response data back to the end-user client system via Router 1825.

FIG. 18C is a third illustrative embodiment of the Application Server Cluster 1520 of FIG. 15. This embodiment, which is quite similar to the embodiment of FIG. 18B, differs in two important aspects: (1) all EUC-related data traffic in and out of the ASC passes through Router 1825 and (2) all data traffic between application servers 1810 and the VFCS Servers 1840 passes through Router 1835.

Inbound client data packets flow through Router 1825 to Load Balancer 1820.

Load Balancer 1820 then dispatches the inbound traffic to the Application Servers via Router 1825. All outbound traffic flows through Router 1825 to the end-user client system. Inbound traffic to the VFCS Servers flows from Router 1835 to Load Balancer 1830 and Load Balancer 1830 dispatches the inbound traffic to the VFCS Servers via Router 1835. VFCS Server outbound traffic flows through Router 1835 to the corresponding Application Servers. Again, Load Balancer 1820 and Load Balancer 1830 may be the same physical unit, and Router 1825 and Router 1835 may be the same physical unit. Also, Application Server 1810 and VFCS server 1840 may be contained in the same physical unit thereby eliminating one of load balancers 1820 and 1830 and routers 1825 and 1835. Thus, a configuration according to an embodiment of the present invention eliminates load balancer 1830, router 1835, and combines application server 1810 with VFCS server 1840.

The embodiment of FIG. 18A requires the least hardware. Moreover, it requires a load balancer with enough capacity to handle both inbound and outbound traffic cluster. The embodiments of FIGS. 18B and 18C have obvious advantages for clusters with heavy outbound traffic and lower inbound traffic. Both require two small capacity load balancers. In the embodiment of FIG. 18B, the inbound and outbound traffic is split between the load balancers and routers, while in the embodiment of FIG. 18C, the inbound and outbound traffic goes through the routers, which use the load balancers as a resource. For application server clusters with heavy two-way traffic, smaller capacity load balancers and routers are desired such as in the embodiments of FIGS. 18B and 18C. The embodiments of FIGS. 18B and 18C may be configured using load balancers that can operate in transparent mode.

The Virtual File Control System (VFCS) Protocol and VFCS Servers

Figure 19:
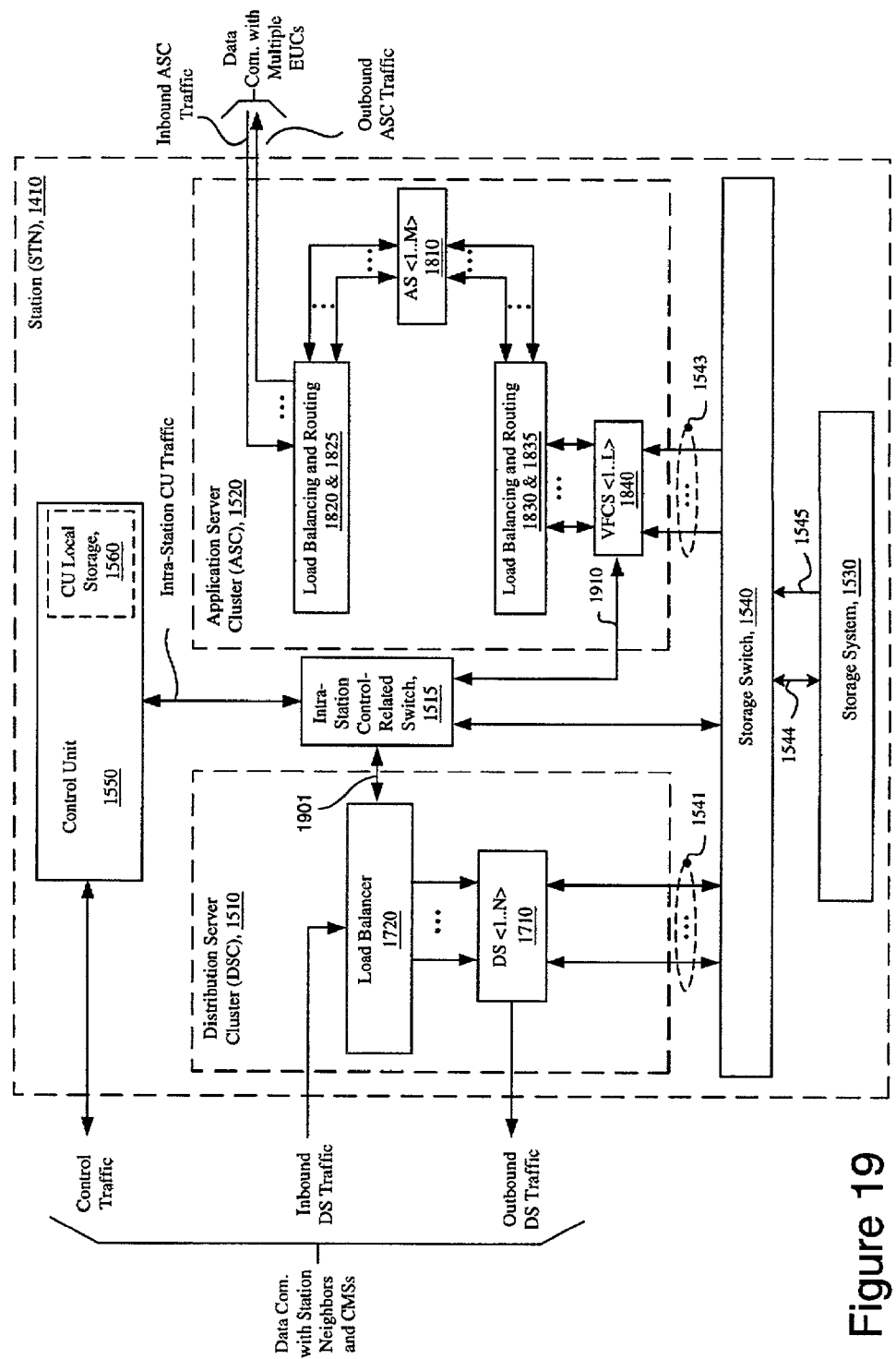
FIG. 19 is used to illustrate the actions of a Virtual File Control System Server in accordance with an embodiment of the present invention.

How a VFCS Server processes an Application Server's file request if all of the requested data is present in the Station's Storage System was discussed in the immediately preceding section. What a VFCS Server does if all of the requested data is not present in the Station's Storage System is now discussed in the context of FIG. 19.

Assuming that VFCS 1840-3 is processing requests for Application Server 1810-1.

If either additional or the full content of the requested file is needed by Application Server 1810-1, VFCS 1840-3 seeks the assistance of a distribution server in the Station's distribution server cluster (e.g., 1510) to retrieve the missing content. This communication may be accomplished using intra-station data communication over a path that includes Intra-Station Control-Related Switch 1515, data communications path 1901 between Load Balancer 1720 and Switch 1515, and data communications path 1910 between VFCS Servers 1840 and Switch 1515. It will be evident to those of ordinary skill in the arts that the path just described is merely illustrative and that many other means for accomplishing the required communication may be used.

VFCS 1840-3's request to the DSC is input to the Load Balancer 1720. The load balancer (e.g., 1720) then selects an available distribution server, e.g., DS 1710-2 (an arbitrary illustrative one of 1710-1 through 1710-N), to service the request. DS 1710-2 issues a search request as a component of Outbound DS Traffic, on behalf of the Application Server 1810-1, to each of its neighbor Stations to locate and download the needed portions of the file. This searching and downloading process has been described above.

When DS 1710-2 receives reply packets from the neighboring Stations indicating that they contain part of or the entire requested file, distribution servers 1710 in DSC 1510 will download the missing content from those Stations that are least congested and stores it locally in Storage System 1530 via Switch 1540. VFCS 1840-3 then processes Application Server 1810-1's request by accessing the data in Storage System 1530 via Switch 1540 and sends data and response back to Application Server 1810-1 via Load Balancer 1830.

The Content Repository of an SCDN station may include several storage volumes (see FIG. 7). During access of a content file via VFCS 1840, if the VFCS detects that all the block files that make up the requested content file are not available locally, it signals the DSC 1510 via an FDP prepare command to download the missing portions from other SCDN nodes. A DS in the DSC 1510 issues an FDP search command to DSs in its neighbor nodes in attempts to locate and download the missing block files from the least congested stations. As the block files are downloaded, the metadata of the content file is updated to register the existence of the block files in the local storage volumes.

In the event of failure of local storage volumes, data resident in the local storage volumes that are destroyed are treated as if they are missing by the VFCS. Hence, when a storage volume is destroyed, and access to some block files of a content file is requested, the VFCS will detect that the block files are not accessible and signal the DSC that the block files are missing via the FDP prepare or similar command. A DS in the DSC simply assumes that the block files do not exist locally under this situation, thus it searches for the missing blocks in the SCDN network. When the missing data is located, the DSs in the DSC download the missing blocks and then update the file metadata accordingly. Over time, block files on destroyed storage volumes are automatically recovered and stored in the good storage volumes.

In order to achieve the VFCS functions described in this and previous sections, the VFCS can be implemented either as a stackable file system, as a proxy file server using an underlying network file system such as NFS or CIFS, or as a storage area network, or direct attached storage, or as a combination of these methods. One such implementation in which VFCS is a proxy file server using the NFS protocol as an underlying network file system protocol is described.

One of the main tasks of the VFCS is to reassemble block files in real time before sending them back to an Application Server such that the Application Server thinks that file I/O is done on a single file. In one embodiment of the invention, the Application Server may use the NFS protocol to communicate with the VFCS. In the NFS Protocol, a NFS client needs to obtain the file handle for the root of a file system before the file can be accessed remotely. A NFS client uses the NFS "mount" protocol to obtain a "file handle" from a remote physical file system. The NFS mount protocol allows the server to hand out remote access privileges to a restricted set of clients and to perform various operating system-specific functions that allow, for example, attaching a remote directory tree to a local file system.

The VFCS enables the Application Servers to view the distributed storage volumes that exist within the SCDN stations as a single, large, distributed virtual storage system via the VFCS distributed virtual file system. While the VFCS does not actually provide the Application Servers with direct (physical) access to the real disk files, each VFCS Server may do an NFS mount in such a way that the Application Server it is serving perceives the VFCS distributed virtual file system as being physically mounted on the VFCS. To achieve this, each VFCS Server acts as both NFS server and NFS client at the same time when performing a single file I/O request for an Application Server. Each VFCS Server has to support the NFS mount protocol when its role is as an NFS server and it must do an NFS mount as a client when accessing files from the station's Storage System devices, such as NAS devices. Thus, there are two different "mount" operations supported in VFCS to achieve file I/O transparently with respect to the Application Servers.

VFCS Server File System Overview

When each VFCS Server is initialized during its startup procedure, a VFCS mount daemon initializes a locally instantiated (private to each VFCS Server) "File System" via the NFS mount procedure. The file system does not necessarily exist physically on any attached storage devices. In an illustrative embodiment, a private file system exists in the main memory (e.g., some variant of Dynamic Random Access Memory) of each VFCS Server. Each VFCS server's private file system uses a "VFCS name space" that is identical across all the VFCS Servers. That is, each VFCS Server references the files held in the shared System Storage using a common hierarchy and naming protocol. More specifically, every file in each VFCS server's private file system tree has a common and unique locator (path name) and handle. This common VFCS name space allows each file mounted at the station to have a unique content locator (filename) associated with it. This allows the same filename to be used by all of the station's VFCS Servers with identical result. Thus all of the VFCS Servers within a Station have equal access to the entire collection of large payload files that are mounted at the Station. Whenever an Application Server invokes its VFCS Client (i.e., a VFCS access routine running on the Application Server) to mount the distributed virtual VFCS, the root file handle of the distributed virtual VFCS file system in the station's Storage System is returned. This root file handle is then used to access large payload files in the distributed virtual VFCS. Because all of the station's VFCS Servers access the identical VFCS name space, any VFCS Server could use the root handle. In the event a VFCS Server crashes, the VFCS Client (running on the Application Server) retries accessing the requested file using the root file handle. Transparent to the Application Server, the retry request is routed to a different VFCS Server. The file handle thus offers a persistence feature across all of the VFCS Servers in that it can survive crashes of one or more individual VFCS Servers.

Station Control Unit and Data Repository

Figure 20:
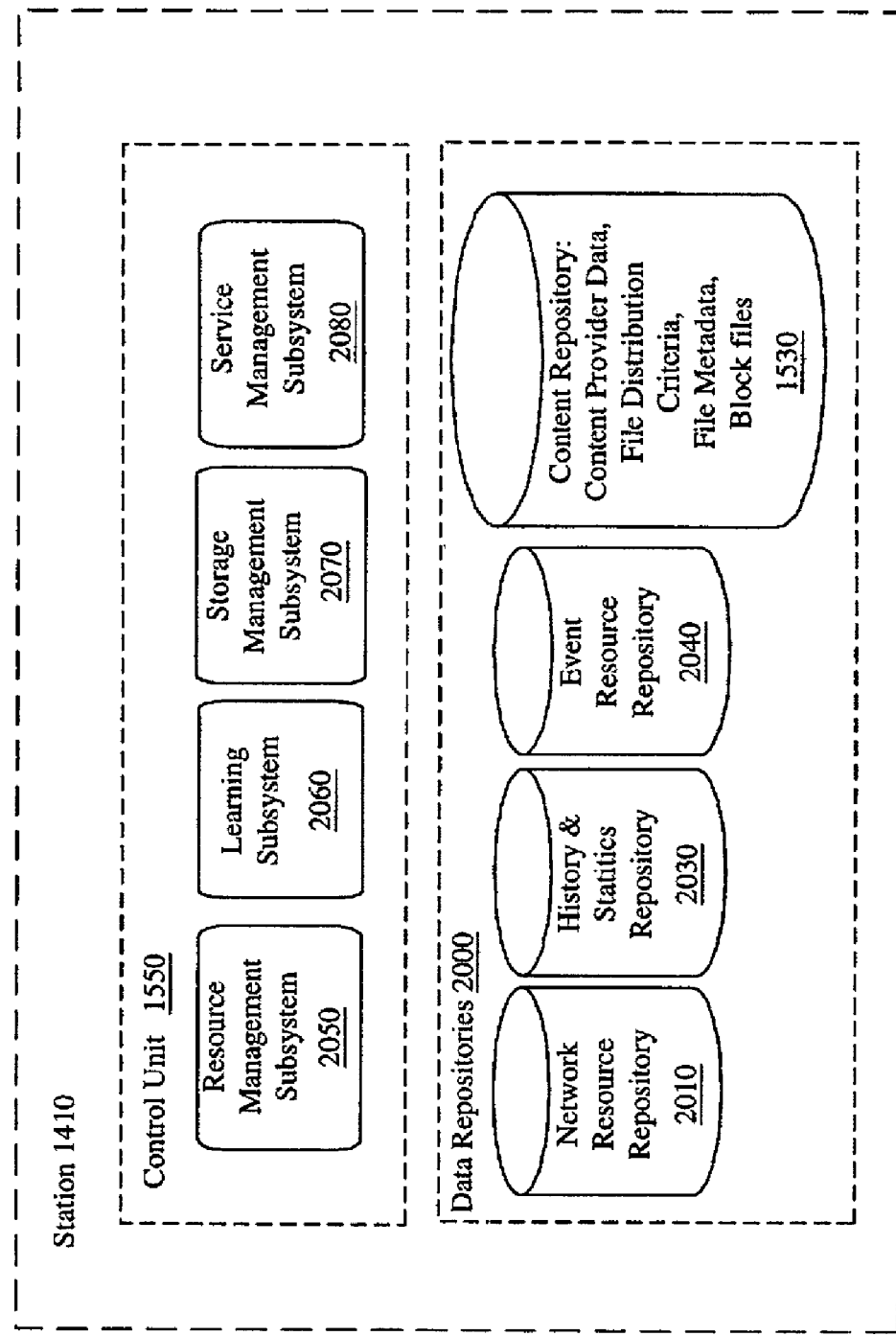
FIG. 20 is an illustration of the control unit and data of a station in the scalable content delivery network in accordance with an embodiment of the present invention.

FIG. 20 is an illustration of the control unit and data of a station in the SCDN in accordance with an embodiment of the present invention. Station 1410 includes control unit 1550 and data repositories 2000. Control Unit 1550 may be an embedded system that includes four subsystems, in one embodiment of the invention. FIG. 20 identifies the Control Unit's subsystems and data repositories of a station. Control Unit 1550 includes Resource Management Subsystem 2050, Learning Subsystem 2060, Storage Management Subsystem 2070, and Service Management Subsystem 2080, collectively called control subsystems. Data Repository 2000 within the Station includes Network Resource Repository 2010, History and Statistics Resource Repository 2030, Event Resource Repository 2040, and Content Repository 1530.

The Control Unit's Service Management Subsystem 2080 manages the station's DSs and VFCS Servers. The Resource Management Subsystem 2050 supports SCDN network and service configurations and log and usage data roll up activities. Learning Subsystem 2060 supports auto-initialization, incremental content learning, and other adaptive methods for management and control of the station. Storage Management Subsystem 2070 monitors cluster storage usage, supports content rating and pruning, and notifies the CMS of the storage usage of each content provider. Service Management Subsystem 2080 monitors and controls services based on threshold settings, issues SNMP (Simple Network Management Protocol) traps, export Enterprise MIB (management information bases), and export history, statistics, and event data. It will be evident to those of ordinary skill in the art that the functions described herein are used for convenience and that other functions may be added, subtracted, or substituted so long as they result in efficient and reliable control and management of the SCDN station.

Control Subsystems of the Station Control Unit

Resource Management Subsystem 2050 includes a Configuration Server, a Resource Manager, and a Content Usage Statistics Rollup Agent. The Configuration Server supports the configuration of the Station, i.e., the initialization and maintenance of the configuration data in the Network Resource Repository.

The Configuration Server of the Central Station allows the configuration of an attribution table for the SCDN. This configuration data is also maintained in Network Resource Repository 2010. Using FIG. 25 as an illustration, when a new station (e.g., Station J) is created and configured, the Resource Manager of Station j notifies the Resource Manager of its parent station (e.g., Station G) and the Resource Manager of the Central Station to update their topology maps and roll up the attributes of Station J. The Resource Manager of Station G updates its partial topology, notifies its DSs of the new station, and sends its neighbor station's (e.g., Stations C and I) Resource Managers the same data. All Resource Managers within a two-hub, for example, vicinity of Station J update their partial topology map and notify their DSs. The Resource Manager of Station G then rolls up the attributes of Station J to the Resource Manager of the parent of Station G. In the successive roll-ups that follow, the attributes of Station J would reach all the way to the SCDN's root station.

When the Resource Manager of the Central Station receives a new station notification, it adds the new station to its SCDN network topology. The Central Station keeps a full copy of the SCDN network topology. Only the Central Station owns the SCDN attribute table; thus, its Resource Manager responds to queries regarding entries in this table.

When attributes of Station H are changed, the attributes are rolled all the way up to SCDN's root station through the chain of Resource Managers. The Resource Manager of Station H also invokes its local Learning Agent to update the local content in accordance with its new attributes.

In the event of changes to the IP address of the Control Unit of Station H, or the IP address of the primary DS of Station H, or the IP address of the DSs "Load Balancing Router of Station H, the Resource Manager of Station H would notify all neighboring stations" Resource Managers to update their Network Resource Repository. These Resource Managers would in turn notify their neighbors of the changes. The propagation of the changes may terminate after two-hubs.

A Resource Manager manages the local Network Resource Repository data, communicates with other Resource Managers to update the data, and distributes the configuration data to the local services, such as the DSs and VFCS Servers. A Content Usage Statistics Rollup Agent periodically rolls up Content Service and Content Usage to the relevant Content Management Server.

The Learning Subsystem 2060 provides adaptive methods of station management and control. Learning occurs when the attributes of a station changes, which includes the creation of a new station. Learning can also be used to recover content due to storage failure. Learning is performed by the Learning Agent in the Learning Subsystem and is invoked by the Resource Manager. In one embodiment of the invention, there are two different learning modes active and passive, content learning includes two phases the discovery phase and the content modification phase.

In Active mode, during the discovery phase, a Learning Agent queries all Content Management servers in the network for a list of contents to be downloaded or deleted as a result of the attribute changes. The Learning Agent locates the Content Management Servers from the Content Provider Data Table in the Content Repository. For a new station, the Learning agent gets the Content Provider Data Table from its SCDN parent node and saves the table into the Content Repository of the new station. During the content modification phase, which follows the discovery phase, the Learning agent deletes unnecessary content by issuing remove requests to a local DS for the specific media files to be removed. To add content, the Learning agent iterates through the content list it obtained during the discovery phase, and for every file in the list, it issues an FDP "fetch" similar request to the DSs in Station H. For each file, a DS in Station H issues a "fetch_info" similar packet to the DSs of the assigned station of the appropriate content provider's CMS. This is done to retrieve each file's metadata. A DS in Station H then issues an FDP search or similar request to each of its neighboring DSs to locate the file. Whenever a DS in the network, for example a DS in Station D, receives a search request for a file, the DS passes the request to all its qualified neighbors (e.g., Station B). If the requested file exists at Station D, the DS in Station D issues an FDP type "search_reply" the DSs in Station H. A DS at Station H then issues FDP "get" download the content. A search request may yield multiple "search_reply" commands being sent to the learning station. Each "search_reply" includes the service and network load of the searched Station D. The DSs at Station H download each file from the least "busy" station(s). A file may be downloaded from multiple locations in parallel. The FDP protocol includes a priority tag. The Learning Agent may control its learning speed by adjusting the priority tag in the prepare request. The Learning Agent may also control its fetch request rate. One advantage of active learning is that the content learning table can be manually created to direct a Learning Agent to delete or download content. As the DSs download new files, the Learning Agent picks up the history log from the local DSs and determines when learning has been completed.

In the passive learning mode, during discovery phase, the Learning Agent issues a learn request to the DSs at every neighboring stations. The learn request includes the old and new attributes of the learning station. Every station forwards the learn request to its own neighbors, such that the learn request would propagate through the entire network. Upon receiving a learn request, a DS at a given Station (e.g., B) examines the old and new attributes of the learning Station (e.g., H), and obtains a list of necessary media files for Station H from Station B's local storage. For each media file in the list, a DS at Station B issues an FDP "replicate" similar request to the DSs at Station H. Station H collects the list of necessary content, figures out what it needs to delete and what it needs to download. During the content modification phase in the passive mode, based on the list of content it obtained during the discovery phase, the DS cluster in Station H issues "remove" command to itself to remove unnecessary content, and "get" commands or similar request to the DSs in the Station where the "replicate" request was issued (e.g., B) to download portions of the file. A DS may yield the processing of learn requests to other more important requests. The learn request may result in the issuance of the "replicate" notification for the same media file from one or more stations, by downloading a file from multiple locations, the DS is preventing congestion of any particular node in the network.

The Storage Management Subsystem 2070 includes a Storage Management Agent as its primary component. The Storage Management Agent 1) monitors the total local storage availability and the storage availability of a content provider; 2) adjusts the "popularity" index of a file; 3) determines a storage safety threshold for each content provider; 4) schedules content pruning; 5) computes pruning amount; 6) removes the least likely to be used blocks of a file; and 7) reports storage usage information and shortage warnings to Content Management servers.

The content provider, through a Content Management application, sets the initial "popularity" index of a file. This initial value serves as a prediction of the likelihood of the file to be accessed in the near future. The DSs rely on the "popularity" index, along with storage availability, location of station, and network environment, to decide on what portions of a file, the initial block size, and the number of blocks that is output to local storage by the blocking process 930 (FIG. 9).

The Storage Management Agent uses the VFCS Server history log data and data in the File Metadata Database to determine a reasonable storage safety threshold, adjusts the "popularity" index of a file, and identifies the least likely to be used blocks. A storage safety threshold is the minimum amount of free storage each content provider must reserve at all times. Based on storage availability and the DS activities, the Storage Management Agent determines the total amount of data to be pruned for each content provider and schedules the deletion of the least likely to be used blocks.

When content pruning rate for a content provider exceeds a certain limit, the Storage Management Agent issues an RPC call (Remote Procedure Call) to notify the Content Management Application server to which the content provider is assigned. The Content Management Application prevents a content provider from uploading any new content when the content provider's storage is low.

In one embodiment of the invention, the Service Management Subsystem 2080 includes the following components: History Log Handler, Statistics Handler, Event Handler, Threshold Monitor, Trap Agent, SNMP (Simple Network Management Protocol) stack, Presentation Agent, and Service Agreement Policy Agents. A History Log Handler and a Statistics Handler collect statistics and task/transaction logs from the local devices and Servers, and save all log and statistic information into the History and Statistics Repository. While a station is learning, a History Log Handler forwards all the file download records to the Learning Agent to notify the agent of the download status. This handler also forwards the inbound and outbound data transfer information recorded from local DSs to the Content Provider Storage Usage Table. The Content Usage and Statistics Database is also updated by the Statistic Handler.

An Event Handler saves received events into the Event Data Repository 2040. The events stored may originate from any of the DSs, VFCS Servers, control units, or any other devices in the station. Depending on the event class and the severity of a problem, the Event Handler may report the event to the Trap Agent. The Threshold Monitor constantly compares various threshold settings against current readings collected by the Statistics Handler. If a threshold is reached, the Threshold Monitor forwards alarms to the Trap Agent. The Trap Agent receives events and alarms from the Event Handler and Threshold Monitor. It logs the events and alarms and forwards them to the Presentation Agent and SNMP Trap Agent to notify operators. The Presentation Agent distributes program objects (e.g., Java applets) to the Service Management application and to the end-user's browser. The applets channel threshold settings, performance data, network topology, usage log, and events from data repositories to network operators.

Data from the History and Statistics Repository and Event Repository can be either pushed to, or pulled from, a Presentation Agent. Service Agreement Policy Agents retrieve data from History and Statistics Repository and feed the information to a Service Agreement Policy Server, where business agreement and policy (such as guaranteed quality of service per customer) can be enforced.

Network Resource Repository of a Station

The Network Resource Repository 2010 contains network and station configuration data. The network configuration data may include the topology of partial or the entire network and a complete attribute table. This data is created and updated by Resource Management Subsystem 2050.

The station configuration data includes the IP addresses of all the devices, station attribute, rolled up attributes, load balancing configurations, database configuration, routing configuration, statistic data collection interval, heartbeat interval, local storage volumes and their configuration, etc. The configuration data is created and updated by Resource Management Subsystem 2050.

History and Statistics Repository of a Station

The History and Statistics Repository 2030 stores data gathered by the Service Management Subsystem. This data repository includes 1) history logs of the devices, 2) server and network statistics, 3) the content provider usage table, and 4) the content usage and statistic table. The foregoing data collections contain information obtained from many sources, including: the DSs, VFCS Servers, Application Servers, Learning Subsystem 2060, load balancers, and Storage Management subsystem 2070.

Learning Subsystem 2060 uses the history information to interpret the state of learning.

Service Management Subsystem 2080 evaluates statistics information and compares it to a user-defined resource-usage threshold to decide whether to send a notification to an operator via the management console, or turn services on or off as configured by the operators.

Storage Management Subsystem 2070 uses the history logs from DSs and VFCSs to determine when, what, and how much content to prune.

The content provider usage table is generated by Storage Management Subsystem 2070 from data gathered by Service Management Subsystem 2080. The data roll up function provided by Resource Management Subsystem 2050 rolls up a copy of this same information to the assigned Content Management Server of each content provider.

The content usage and statistics table data is gathered by Application Server usage log parsers and forwarded to the Control Unit's database by Service Management Subsystem 2080. A copy of this same information is rolled up to the assigned Content Management Server of each content provider by the roll up function provided by Resource Management Subsystem 2050.

Event Resource Repository of a Station

Event Resource Repository 2040 includes data sets that support events (e.g., notification, warning, and error message), job queue, server heartbeat, and server registry data. The server registry data includes the Server ID, service type, etc. The Service Management Subsystem gathers the notification, warning, and error messages from a variety of local sources, including the DSs, VFCS servers, the Resource Management Subsystem, the load balancers, the Learning Subsystem, and the Storage Management Subsystem. Station "events" organized into different categories, and notifications are generated and forwarded to the management console in accordance with station configuration data. Service Management subsystem 2080 relies on the heartbeat table to determine if a server is functioning. The DSs use the server registry, heartbeat table, and job queue to load-balance their server cluster, and to monitor one another for fault-tolerance. Service Management Subsystem 2080 uses the server registry and heartbeat table to monitor the services in the station, it shutdown during power failure and restart services upon server failure.

Content Repository of a Station

Content Repository 1530 includes Content Provider Information, File Distribution Criteria of the media files residing locally, File Metadata, and the content blocks. The content provider information includes the content provider's account information, assigned Content Management Server, reserved storage, number of media files, etc. The File Metadata includes the media file's attributes, information on how the media file is divided into block files, and the indexes in the local storage volumes for its block files. The content repository 1530 may span multiple local storage volumes. For example, content blocks of a media file are distributed across multiple storage volumes. The Content repository is also called the Shared Storage System.

There are multiple storage volumes in the shared Storage System 1530 (FIG. 15). These volumes contain a number of important databases illustrated in FIG. 20 such as: The Content Provider Data Table, File Distribution Criteria Table, the File Metadata Database, and the content block files. These databases are stored independently and may be mapped arbitrarily anywhere within shared Storage System 1530. The Content Provider Data Table and File Distribution Criteria Table also exist in each Content Management Server system. The tables in the Content Management Server only include the data of the content providers that are assigned to that CMS. The Content Provider Data Table at each station includes the information of all the content providers of the SCDN, and the File Distribution Criteria Table includes only the media files that are replicated to the station.

Only the DSs, VFCS Servers, and the SMS 2070 can access the Storage System. The DSs can read and write to the shared Storage System; however, the VFCS Servers and the SMS 2070 can only access it in a read-only mode. The Learning Agent also writes to the Storage System when it creates the initial Content Provider Data Table during the Learning Agent's initialization phase.

The Content Provider Data Table includes information such as content provider account information, the content provider assigned Content Management Server address, reserved storage, content provider's policy server, etc.

File Distribution Criteria Database includes the distribution criteria for each content file.

Block files contain the actual content for each content file. A hashed key which is a combination of the content provider ID, media file ID, track ID, and block number is used to define the path name of the block files for accelerated data access.

The File Metadata Database

The File Metadata Database holds file metadata related to the block files which includes content provider ID, initial popularity index, block size, actual usage rating, media size, attributes, minimum retained size, access time stamps, track file indices, block file indices, storage volume indices, etc.

As indicated, the file metadata specifies the block size used for its associated file. All blocks in the file are the same size, except for the last block, which will be smaller unless the file (if the file is a linear file) or the last track (if the file is a non-linear file) happens to be of a size that is an exact multiple of the block size.

The file metadata also includes information to construct a block's actual location. Since blocks can be distributed across multiple storage devices within the Storage System, there may be multiple block storage path roots. Within each storage path root, a block's location and file name are deterministic. A series of subdirectories is created to ensure that a limited number of files and subdirectories are contained within a given directory.

Distribution servers communicate with one another and the Content Management application in order to transfer large payload files in the SCDN. The DSs modify entries in the File Metadata Database when they add or remove blocks in the shared Storage System. A sequence server, which serves essentially as a lock manager, may be used to synchronize access to the file metadata database by multiple DSs, VFCS servers, storage managers, etc., to prevent possible race (e.g., conflict) condition. VFCS servers use information in the File Metadata Database to assemble and multiplex appropriate blocks into files for the Application Servers. The Storage Management Subsystem watches the available shared storage, the content provider's reserved storage, and the usage logs. It initiates the removal of less popular content to make room for more popular and new content when available storage is running low. It does this by instructing the DS to remove some of their associated blocks that are least likely to be used. It accesses the File Metadata Database to determine how many and which blocks it will request to be deleted.

The particular implementation of the Content Repository depends on the host environment. For example, it could be a traditional RDBMS (relational database management system) or it could be a collection of flat files in directories. For performance and reliability reasons, one embodiment of the invention uses flat files in directories to implement the Content Repository. Tables are implemented as either a single file with fixed-length records, or as separate files for each record. Using a single file has performance advantages when reading a complete list of records or when searching records when the record ID is not known. Using separate files has performance advantages when accessing a record via a known record ID. The Content Provider Data Table, File Distribution Criteria Table, and File Metadata Database are stored in a directory whose path is known to the interface that the DSs, VFCS Servers, and the SMS 2070 use to access the file metadata stored therein.

Station Operation and Data Flow

Figure 21A:
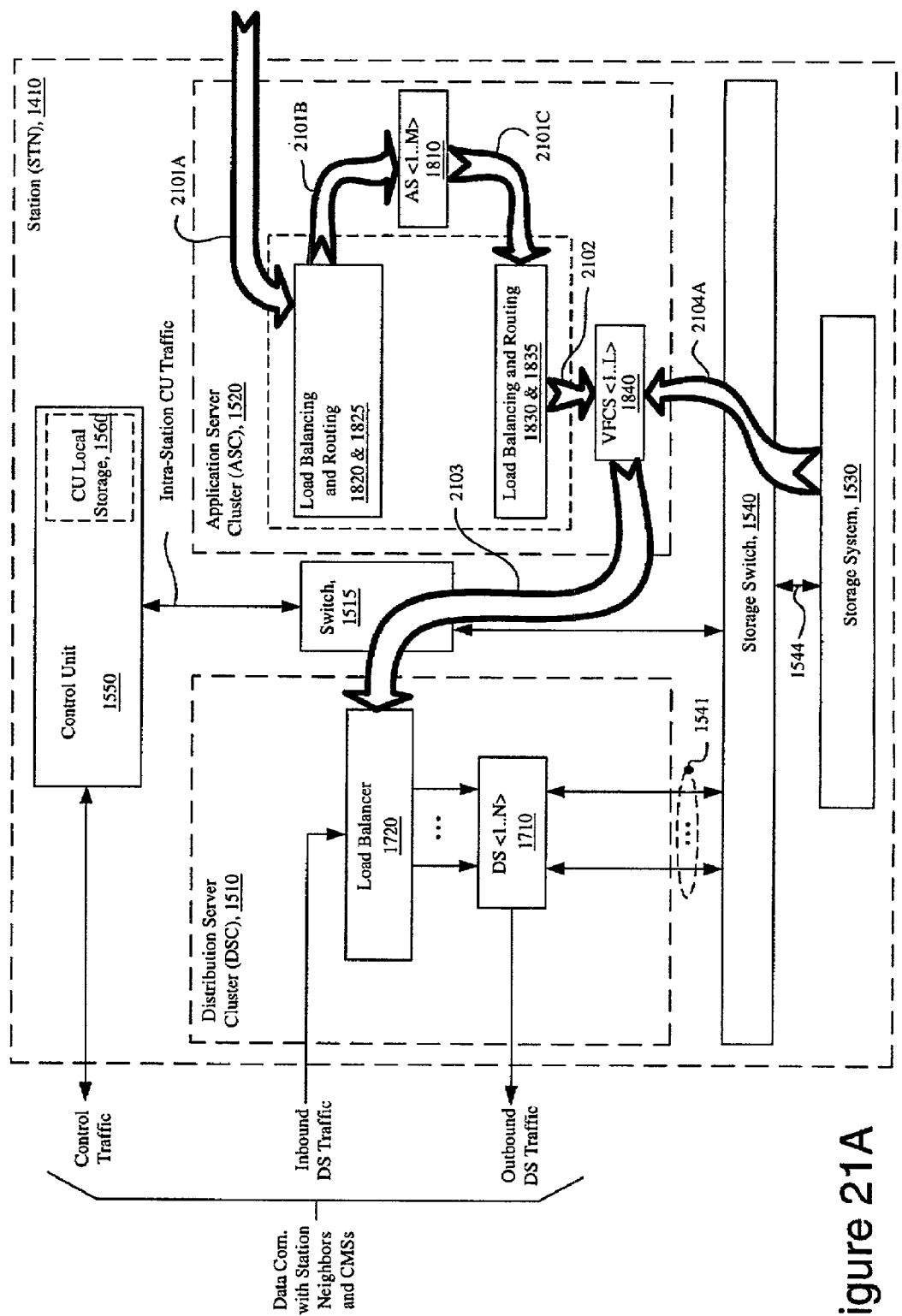
FIGS. 21A through 21G are illustrative examples of Station operation and data flow in accordance with embodiments of the present invention.

Examples of Station operation and data flow are given in the context of FIGS. 21A through 21G. In conjunction with these figures, several interactions between the Application Servers, VFCS Servers, and the Distribution Servers will be identified below:

FIG. 21A illustrates the request of a large payload file, the passing of the request to a selected VFCS server, a request to a DS to prepare the file, initial retrieval of the file from shared storage. Table 1 shows the station interactions:

TABLE 1

Station Interactions in FIG. 21A

| Reference # | Interaction Description |
|---|---|
| 2101A | Incoming request to Load Balancing and Routing Function 1820 and 1825 from end-user |
| 2101B | Request delivered to selected AS within AS<1..M> 1810 |
| 2101C | Application Server request delivered to Load Balancing and Routing Function 1830 and 1835 |
| 2102 | Load Balancing and Routing Function 1830 and 1835 selects one of the VFCS Servers, e.g., VFCS 1840-1 (an arbitrary illustrative one of 1840-1 through 1840-L), and passes the request to it. |
| 2103 | VFCS 1840-1 requests a DS, via Load Balancer 1720, to "prepare" the file |
| 2104A | VFCS 1840-1 begins retrieving data from the shared storage. |

Figure 21B:
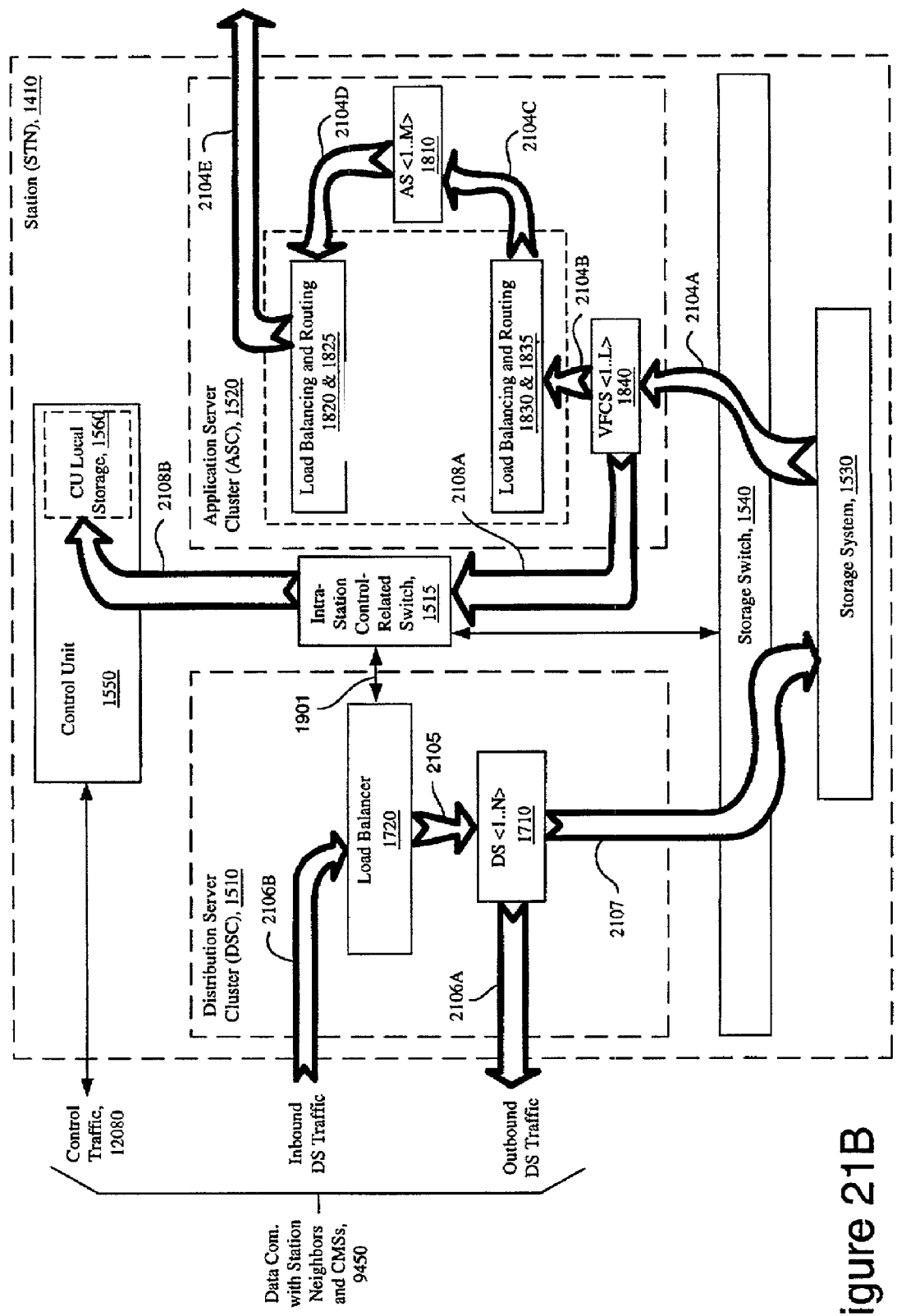

FIG. 21B illustrates initial return of file data, forwarding the request to a selected DS, the issuance of a search request for missing portions, storage of network retrieved portions, and logging of usage information. Table 2 shows the station interactions:

TABLE 2

Station Interactions in FIG. 21B

| Reference # | Interaction Description |
|---|---|
| 2104A | VFCS 1840-1 assembles and multiplexes the blocks retrieved from Storage System 1530 into a file in real time. (Whenever a block is required, i.e., either now or in the future, the VFCS signals the DS of this fact. VFCS 1840-1 then polls the File Metadata Database until the fact that the required block has been stored in the Storage System has been indicated.) |
| 2104B | VFCS 1840-1 passes data for the Application Server through Load Balancing and Routing Function 1830 and 1835. |
| 2104C | Load Balancing and Routing Function 1830 and 1835 returns data originating from VFCS 1840-1 to the Application Server. (The Application Server continues to request data from VFCS 1840-1 until the entire file has been returned or VFCS 1840-1 fails.) |
| 2104D | The Application Server passes data for the end-user through Load Balancing and Routing Function 1820 and 1825. |
| 2104E | Load Balancing and Routing Function 1820 and 1825 returns data originating from the Application Server to the end-user. |
| 2105 | Load Balancer 1720 selects an available DS, e.g., DS 1710-1 (an arbitrary illustrative one of 1710-1 through 1710-N), and forwards the request from VFCS 1840-1 to DS 1710-1. |
| 2106A | DS 1710-1 issues a search request for the missing portions and locates the most available DSs. |
| 2106B | Multiple DSs in DS cluster 1710 download missing portions from multiple remote DSs in parallel. |
| 2107 | DSs 1710 create or update related File Metadata Database information as appropriate for the downloaded portions, and save the downloaded portions as blocks. The blocks are stored across multiple storage volumes. |
| 2108A | As VFCS 1840-1 returns data to the Application Server, VFCS 1840-1 logs the usage information into a Usage Log database in CU Local Storage 2005. |
| 2108B | The VFCS 1840-1 access to the CU Local Storage is via Switch 1515. |

Figure 21C:
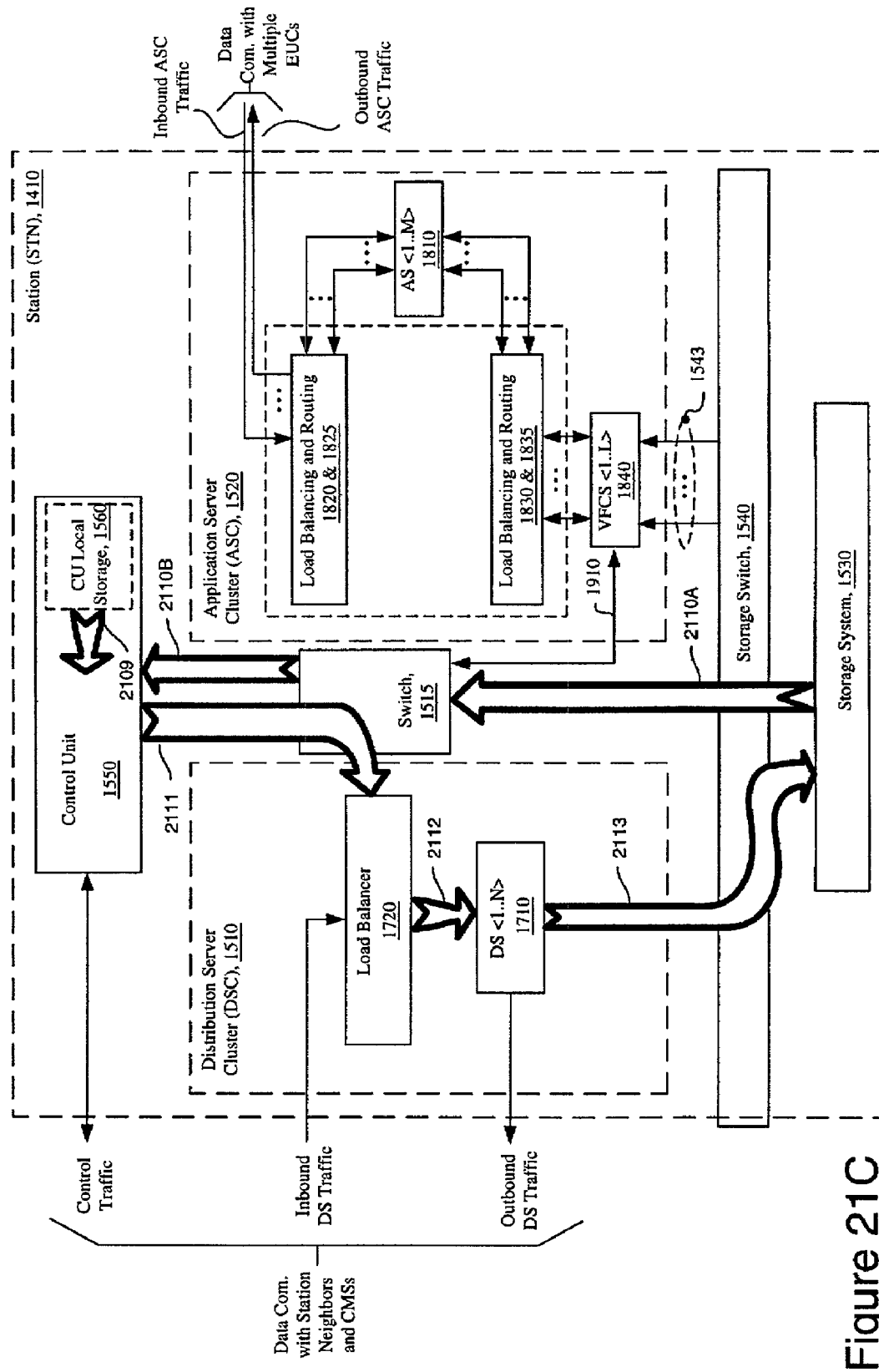

FIG. 21C illustrates retrieval of usage information, retrieval of content provider storage reservation and storage availability data, and related storage management activities commanded by the control unit and carried out by a selected DS. Table 3 shows the station interactions:

TABLE 3

Station Interactions in FIG. 21C

| Reference # | Interaction Description |
|---|---|
| 2109 | The Storage Management Subsystem within the Control Unit 1550 retrieves the file usage information. |
| 2110a | Via Switch 1515, the Storage Management Subsystem retrieves the Content Provider data, and reads the shared storage availability of the File Metadata Database. |
| 2110B | The Storage Management Subsystem receives the data from the Switch 1515 and uses the Content Provider data to identify the content provider's storage reservation. |
| 2111 | Based on the storage availability, content provider's storage reservation, media file usage information, and media file's storage occupancy, the Storage Management Subsystem instructs DS, via Load Balancer 1720, to remove the least likely to be used blocks. The Storage Management Subsystem also updates the file's popularity level. The Storage Management Subsystem has multiple pruning engines that it can apply based on the storage and network traffic situation. |
| 2112 | The request from Storage Management Subsystem arrives at Load Balancer 1720, which selects an available DS, e.g., DS 1710-2 (another arbitrary illustrative one of 1710-1 through 1710-N). |
| 2113 | DS 1710-2 removes blocks from the specified files and updates the File Metadata Database appropriately |

Figure 21D:
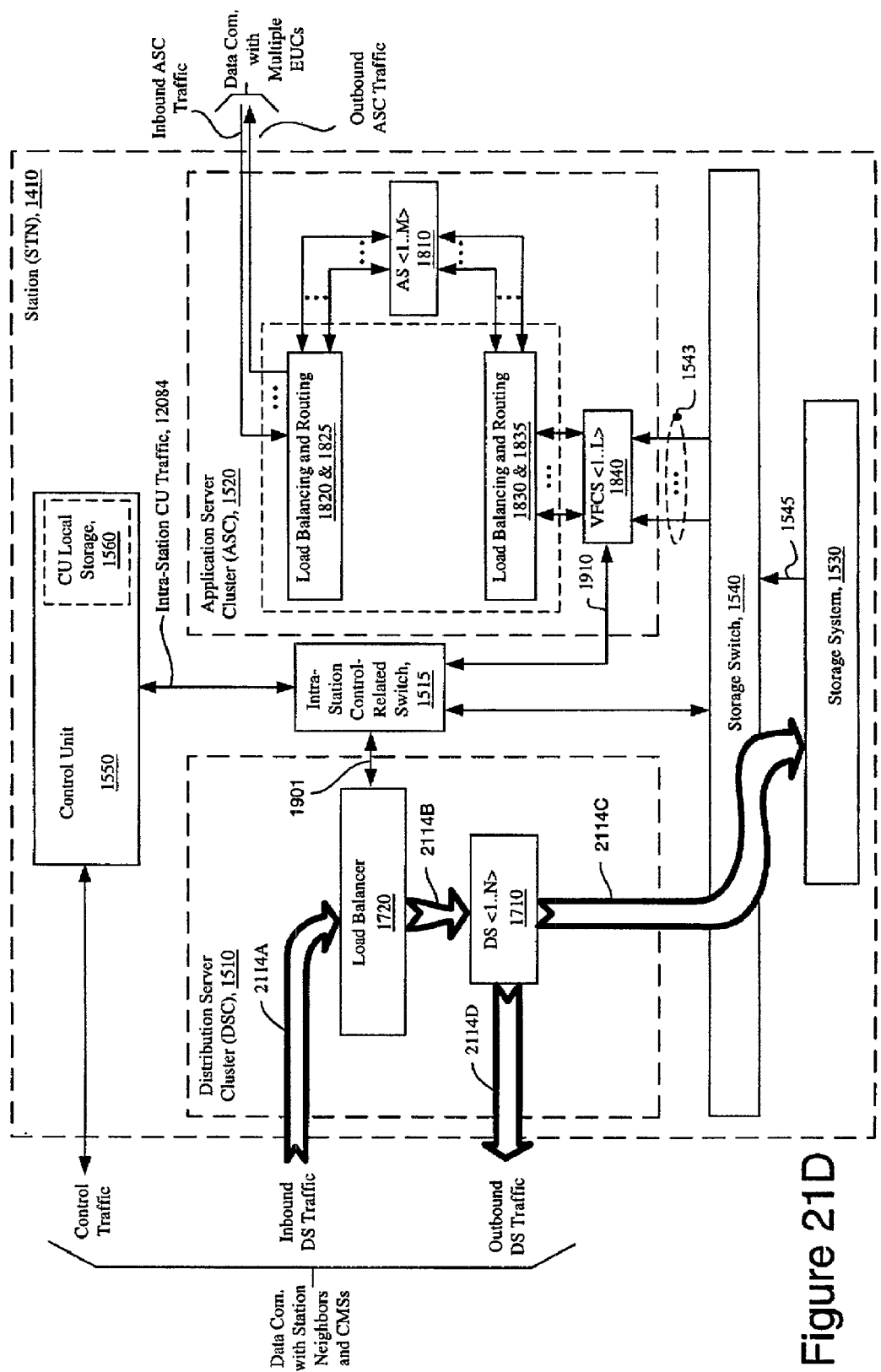

FIG. 21D illustrates the receipt and update of content provider information. Table 4 shows the station interactions:

TABLE 4

Station Interactions in FIG. 21D

| Reference # | Interaction Description |
|---|---|
| 2114A | When a new content provider is added to Content Management application database, or when the content provider's information changes, the Content Management application sends an "content provider info" packet to all the stations in the SCDN. Load Balancer 1720 receives this packet. |
| 2114B | The DS load balancer of each station selects a DS and forwards the "info" packet to that particular DS. |
| 2114C | The selected DS updates or adds the content provider information into the Content Provider Data Table. |
| 2114D | DS sends information packet to all its other neighbors |

Figure 21E:
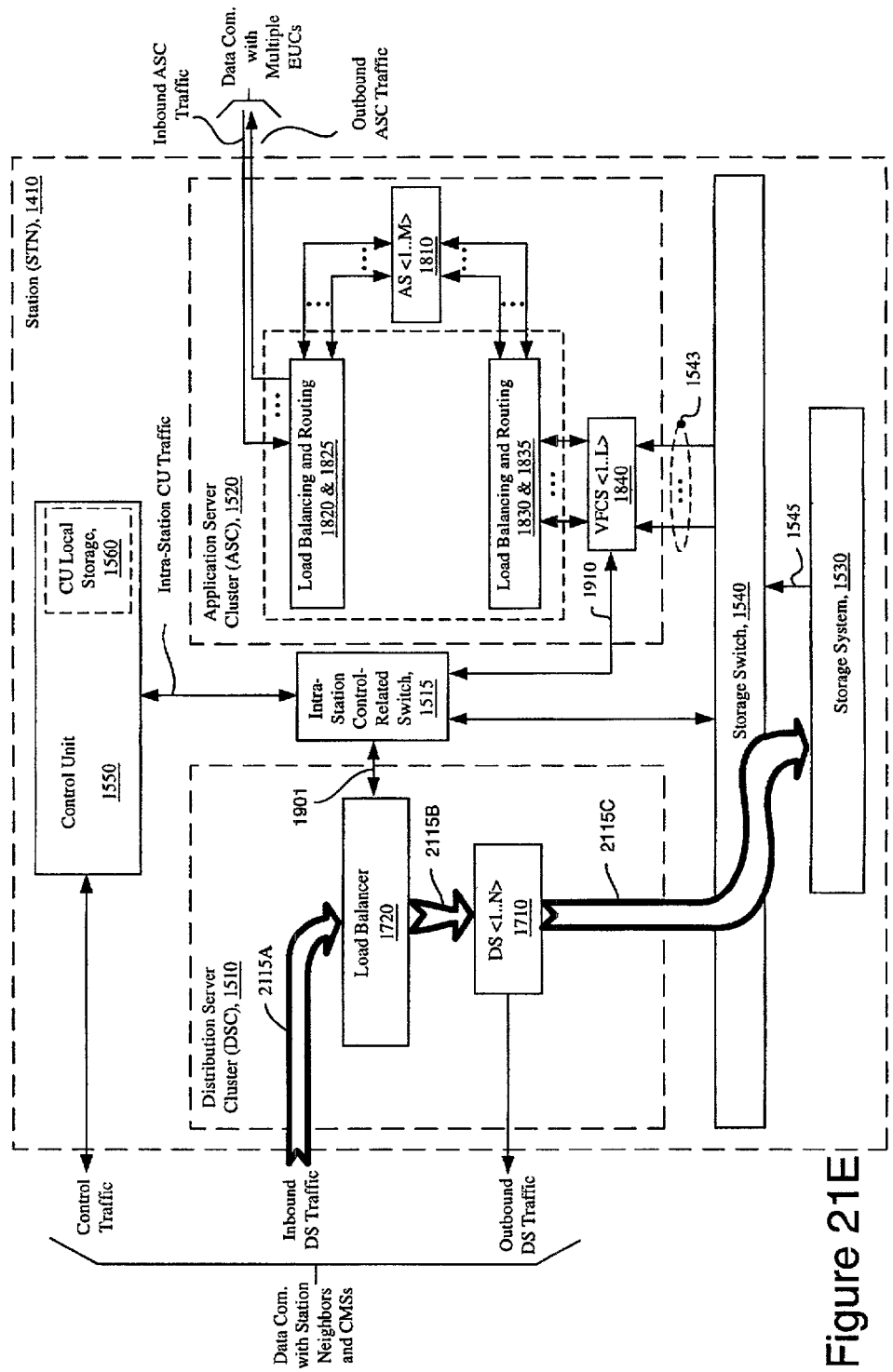

FIG. 21E illustrates the receipt and organization of content portions in the primary station assigned to a CMS. Table 5 shows the station interactions:

TABLE 5

Station Interactions in FIG. 21E

| Reference # | Interaction Description |
|---|---|
| 2115A | When a new file is uploaded to the SCDN, the Content Management application issues "put" request along with the file targeted to a DS of its assigned station. Load Balancer 1720 receives this put request. |
| 2115B | The DSC's load balancer of the assigned station selects a DS and forwards the put request to that particular DS. |
| 2115C | The DS selected by the DSC's load balancer divides the received portions into blocks and saves the blocks into it shared storage and creates entries into the |

TABLE 5-continued

Station Interactions in FIG. 21E

| Reference # | Interaction Description |
|---|---|
| | File Metadata Database. (The Content Management application then issues a "distribution" request to distribute the file in accordance with the FDP protocol.) |

Figure 21F:
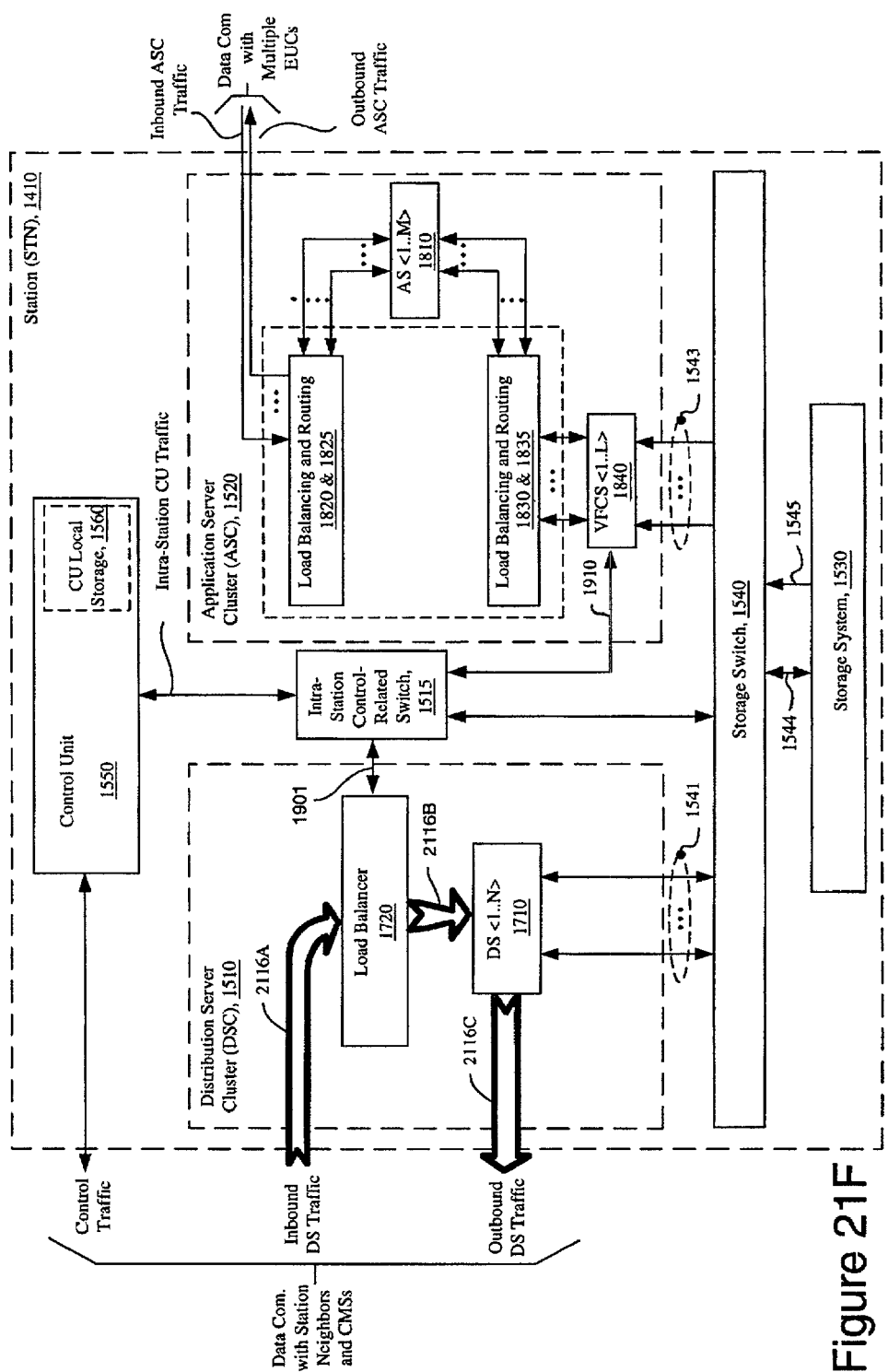

FIG. 21F illustrates receipt of a distribution request and the issuance of a replicate request. Table 6 shows the station interactions:

TABLE 6

Station Interactions in FIG. 21F

| Reference # | Interaction Description |
|---|---|
| 2116A | The Content Management Application connected to the assigned station associated with a CMS issues a "distribution" request to distribute a file in accordance with the FDP protocol. The DSC's Load Balancer 1720 of the assigned Station (i.e., FIG. 21F) receives this distribution request. |
| 2116B | The DSC's load balancer of the assigned station selects a DS and forwards the distribution request to that particular DS. |
| 2116C | Upon receiving the distribution request, the Station's DS issues "replicate" request packets to its neighbor stations, initiating delivery of content portions to the balance of the SCDN in accordance with the FDP protocol. |

Figure 21G:
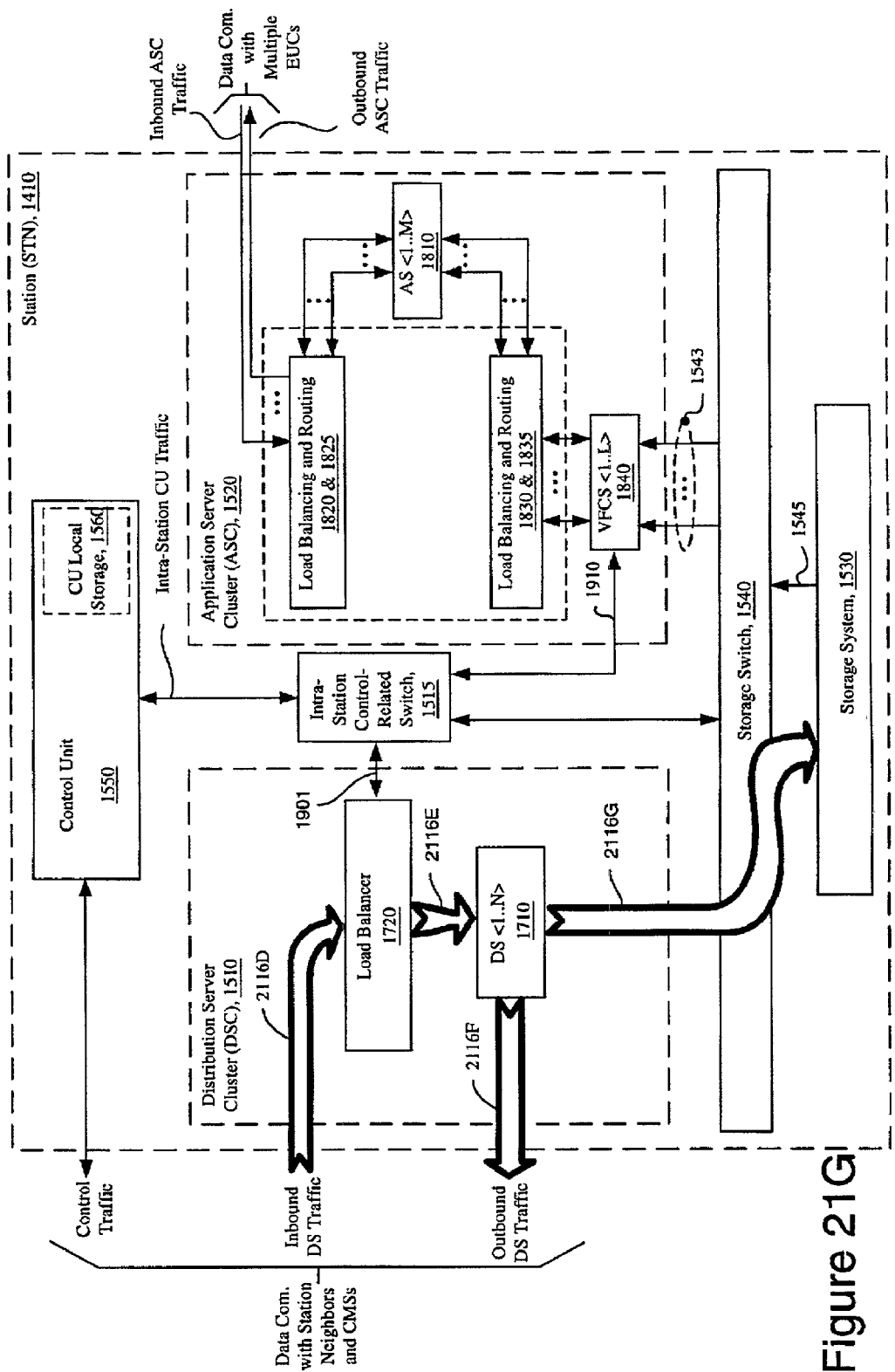

FIG. 21G is an illustration of receipt of a replicate request and the issuance of a get request. Table 7 shows the station interactions:

TABLE 7

Station Interactions in FIG. 21G

| Reference # | Interaction Description |
|---|---|
| 2116D | Load Balancer 1720 receives a replicate request |
| 2116E | The DSC's load balancer of the station selects a DS and forwards the replicate request to that particular DS. |
| 2116F | The DS issues a "get" request to retrieve the content from multiple stations in the distribution path. |
| 2116G | Upon retrieval of the content, the DS creates relevant entries in the Distribution Data database and the File Metadata Database. |

VFCS File System Implementation and Initialization

Each VFCS Server maintains a private file system that implements a distributed virtual file system. This distributed virtual file system provides the illusion to an Application Server (AS) that the VFCS Server locally holds as a contiguous atomic whole the content file that the AS desires, when in fact the content is generally stored in blocks across multiple volumes across a network of stations. Furthermore, portions of the content may be in transit from other nodes of the SCDN. Each VFCS Server file system implements only a skeletal tree structure and additional file metadata components are added on an as-needed and just-in-time basis. Important to the understanding of the present section, these additional components are only added at the particular VFCS Server where they are required. In the remaining discussion of this section, matters are described from the perspective of each VFCS Server. Unless otherwise indicated, the behavior described is independent of the existence of any other VFCS Servers.

The distributed VFCS File System may be implemented in a number of ways. In one embodiment of the invention, it is represented by a Unix V NODE structure in which a node is either a directory or a file. Each VNODE has a unique identifier that represents either a content provider or a content vendor file in the SCDN. A specific content provider file can only be retrieved using a file path that is encoded with its content provider's name.

The root directory of the VFCS server's private file system contains a list of the names of each content provider and a subdirectory for each content provider. Each content provider subdirectory contains a list of that provider's files. When its private file system is initialized, the VFCS Server accesses the list of the content provider names in order to initialize the content provider directories. However, the content provider's content files are not initialized when the VFCS Server is initialized. Rather, they are populated upon an Application Server request for the content files or notification from the DS or sequence server as popular new contents arrive. This process is referred to herein as "selective and dynamic initialization". In accordance with the invention, the particular elements selected for initialization and the time at which they are initialized (at initialization time or at run time) are selected based on system performance concerns.

The VFCS Server maintains several caches in its main-memory, typical examples include:

1. a cache for content provider information.
2. a cache for content provider file information.
3. a cache containing portions of the framework of the VFCS File System (i.e., the VFCS VNODE data, but generally not the entire VNODE tree).
4. a cache for "pre-fetched" blocks that are used to increase the performance of the assembly and multiplexing processes.

The VFCS Server periodically checks the Content Provider Data Table and the File Metadata Database to determine if entries in either have changed and, if so, updates its caches appropriately. The periodic check could also be realized by a notification mechanism initiated by a DS or sequence server to notify all of the VFCS Servers when any entries have changed, such as when a new file is uploaded or when an old file has been pruned (discarded) to save storage space. When an Application Server attempts to access a file for which the file metadata information is not in cache, the VFCS Server verifies that the file is not accessible from the SCDN before returning an error indication, "file not found".

In one embodiment of the invention, the VFCS may maintain caches such as:

1. Content Provider Name Cache: content provider name and ID.
2. File Name Cache: file name, ID, number of tracks, number of blocks per tracks, the origin location of the media file, number of blocks currently residing in the shared Storage System.
3. File System Cache: In an VFCS VNODE tree embodiment, each node in the tree has a handle. The root forms the "first layer" the tree and its handle is a constant. The "second layer" the tree includes the content provider nodes and the content provider ID is used as the handle. The "third layer" the tree includes the file nodes and the file ID is used as the handle.

4. Pre-Fetched Blocks Cache: blocks that have been pre-fetched to be used in the assembly and multiplexing processes.

In an ideal environment where there is unlimited memory, performance could be maximized by pre-populating the VFCS server's private file system with the information necessary to support an AS request to any file stored at the station.

However, in the more general limited memory scenario, "selective and dynamic initialization" "selective and dynamic caching" done as described previously to achieve the best possible performance. The VFCS Server reads the Content Provider Data Table and the File Metadata Database from the shared System Storage 1530 during its initialization process and caches portions of this data in its main-memory. Upon servicing a request by an AS for a specific content provider file, the VFCS Server will augment its private file system to include the particular file's attributes. The VFCS Server obtains the additional file attribute information from the file metadata that was cached during the VFCS server's initialization. The additional file-specific information is maintained in the VFCS server's private file system until the server restarts or when memory is low and the file has not been accessed for a long period of time.

VFCS Initialization Procedure

Figure 22:
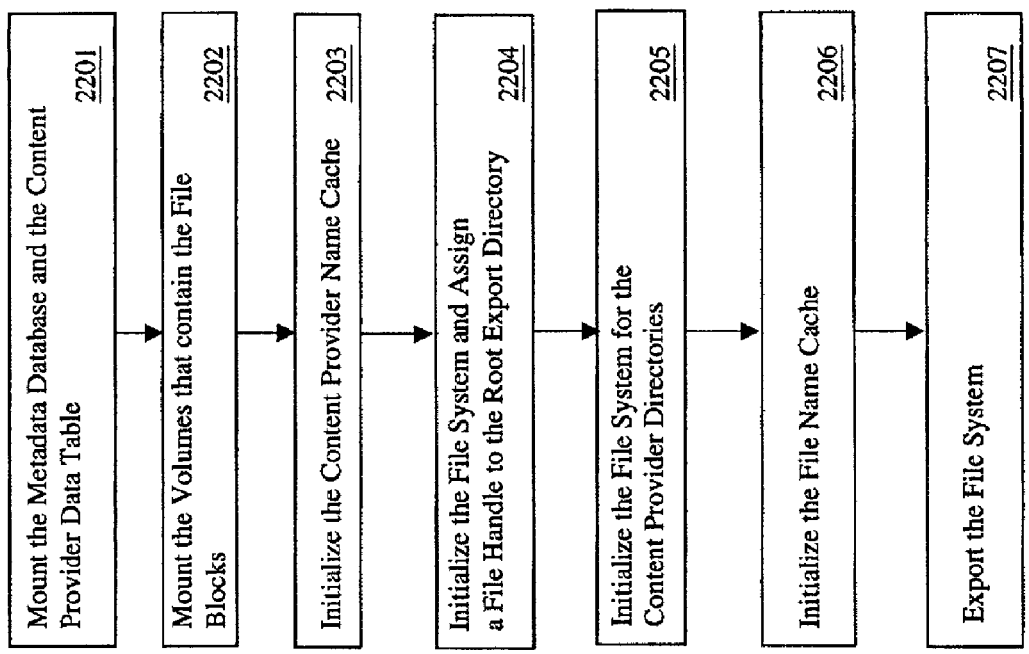
FIG. 22 is a flow diagram of the operations of a VFCS Server performed during the VFCS initialization process in accordance with an embodiment of the present invention.

FIG. 22 is a flow diagram of the operations of a VFCS Server performed during the VFCS initialization process in accordance with an embodiment of the present invention. In this illustration, network attached storage (NAS) devices are used for the shared storage system. The Content Provider Data Table and the File Metadata Database are mounted in operation 2201 in order to provide access their data. For purposes of this illustration, assume these files are mounted on /mp/metadata. In order to access the entire set of blocks available in the storage system, all of the content volumes are mounted in operation 2202. For purposes of this explanation, the mount points are /mp/blockfiles, e.g., /mp/blockfiles/v1, /mp/blockfiles/v2, etc. The VFCS Server initializes the content provider's name cache by loading the Content Provider Data Table into the cache (e.g., operation 2203). The Content Provider Name Cache includes the content provider names and IDs. In operation 2204, the VFCS Server begins building the file system Cache. At this step, the structure of the file system to be exported may be initialized. One embodiment of the invention may use a Unix VNODE tree to represent the In-Memory file system. Thus, the initialization includes the creation of a root VFCS VNODE for the exported root directory and the assignment of a constant handle to this directory. For purposes of this explanation, the exported directory is /export. The VFCS then, as indicated in operation 2205, continues to build the file system Cache by creating the Content Provider Directories, i.e., the content provider VNODE data and structure are initialized. For example, the Content Provider Directories take the form /export/cp_name1, /export/cp_name2, etc. There is one VNODE for each directory and the handle of each directory is the provider's ID. Suppose, for example, Studio X is a content provider and its provider ID is "123". When an application accesses the Studio X directory using its name, a handle of 123 is returned to the application. The application can also use "123" access the Studio X directory, in which case, a numeric handle of 123 is returned. In operation 2206, VFCS initializes the Content Provider File Name Cache. For example, the VFCS Server obtains a complete or partial list, depending on memory availability, of file names and IDs for each content provider from the File Metadata Database. VFCS does not create the VNODEs for these files until they are accessed. In operation 2207, VFCS exports its file system. This is an example of "selective and dynamic caching", i.e., the caches that are selected for populating and when they are populated (at initialization time or at run time) are determined for performance reasons.

VFCS continues to build the file system Cache during run time when files are accessed. When an Application Server accesses a specific file, for example, /export /cp_namej/ file_nameX, the VFCS Server servicing the request looks up file_name in the content provider file_name list, creates a VFCS_VNODE for the corresponding file in both /export/cp directory, and obtains the list of block files for the file. At the same time, the VFCS Server issues a "prepare" request packet to a DS via the DSC Load Balancer. After the DS downloads the requested content portions, stores the portions as blocks, updates the File Metadata Database to reflect this; and after the VFCS polls the File Metadata Database and recognizes the blocks are present in the Storage System; the VFCS Server reads, assembles, and multiplexes them and sends the content to the requesting Application Server. Each VFCS Server performs read-ahead caching to improve performance.

VFCS File Access Procedure

Figure 23:
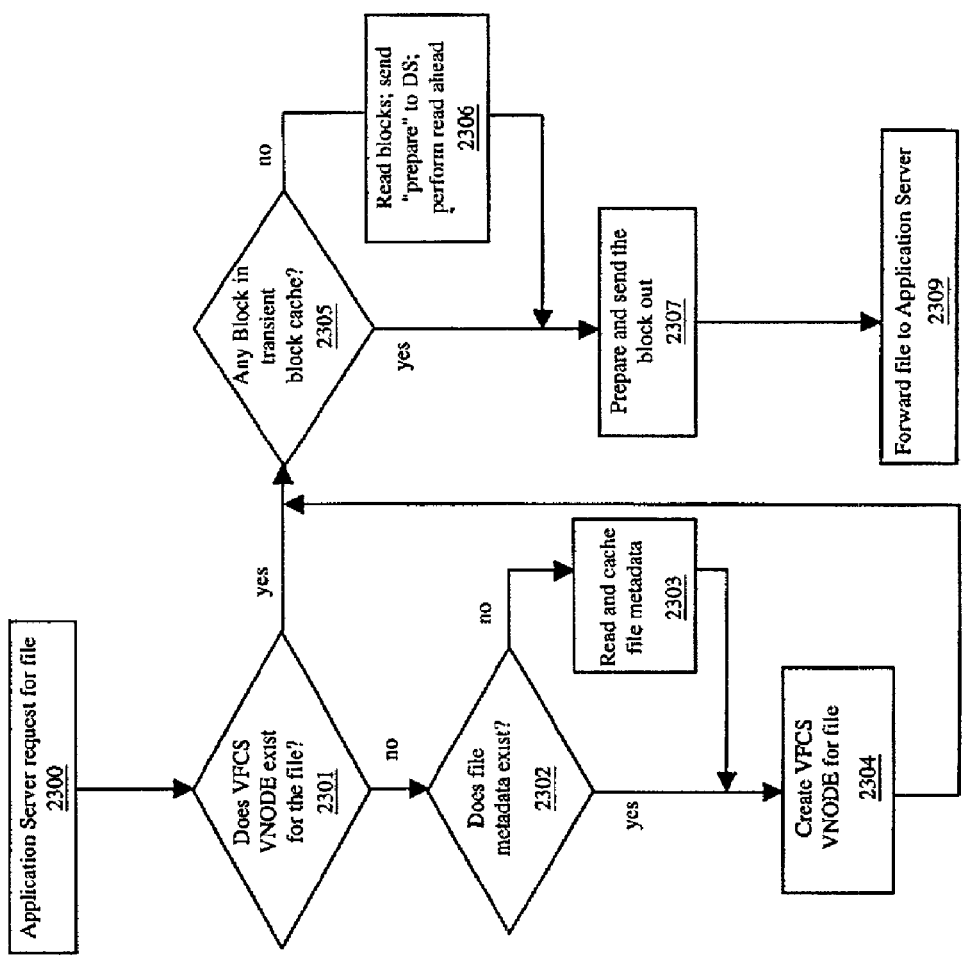
FIG. 23 shows the VFCS Server operations performed during run time.

FIG. 23 shows the VFCS Server operations performed during run time. When an Application Server requests access to a file, the VFCS first checks to see if there is a node for the file in the VFCS File System, in operation 2301, wherein the VFCS Server addresses the question, whether a VFCS node exist for the file?If it does, the VFCS server proceeds to step 2305, otherwise, it proceeds to step 2302. At step 2302 the VFCS examines its File Name Cache to determine if an entry for the file exists in the cache (i.e., does the Related File Metadata Exist?). If no related file metadata exists, the VFCS Server proceeds to operation 2303 and reads the File Metadata Database, caches the related file metadata for the file in the File Name Cache and then proceeds to operation 2304. However, if related file metadata already exists in the File Name Cache, the VFCS Server proceeds immediately to operation 2304, where it creates the VFCS File System node for the file. After doing this, the VFCS proceeds directly to operation 2305.

In operation 2305, the VFCS File Server checks to see if there are any blocks for the requested file in the Pre-Fetch (transient) Block Cache. If there are no such blocks, the VFCS Server proceeds to operation 2306 where it reads blocks associated with the requested file from the station's Storage System, sends a "prepare" request packet to the station's DSC to repopulate the missing blocks, performs a read ahead, and then proceeds to operation 2307. However, if there are one or more blocks for the requested file in the Pre-Fetched Blocks Cache, the VFCS Server proceeds directly to operation 2307 from 2305.

In operation 2307, the VFCS Server assembles and multiplexes the blocks and forwards the data to the Application Server. VFCS may perform read-ahead caching to improve performance. Furthermore, the VFCS Server does packet spoofing to ship data directly from back-end storage to front-end application without buffer copying.

When initialized, the VFCS File System contains a root node and the Content Provider directories in the first two layers of the VFCS File System tree. The third level of the VFCS File System tree contains the content provider file directories and is populated dynamically. If a content provider's file's metadata is not in cache when the file is requested by an Application Server, the VFCS Server must read the file's metadata from the File Metadata Database, cache this information, and then create and attach a VNODE for the file in the VFCS File System's VNODE tree. Once a file is attached to the VFCS File System, the VFCS Server sends a "prepare" request packet to a local DS, and performs "read ahead" operations until it reaches the end of the file.

The number of pre-fetched blocks a VFCS Server caches depends on the local memory availability in the VFCS Server. The third layer of the VFCS File System may be pruned and the Pre-fetched Blocks Cache may be flushed when memory is running low. Depending on memory availability, the VFCS Server may cache a complete or partial set of these directories. With limited memory, it caches the file metadata for only the most frequently accessed files and then updates the cache regularly based on the recent usage information.

To support a specific number of content providers, say XCP, a specific Y number of content provider files, say YF, and a number of concurrent users, say ZU, each with N number of pre-fetched blocks for best possible performance, a VFCS Server is configured with a memory size using the following formula:

Memory Size in Mbytes=(VFCS Server OS Memory Requirement)+(VFCS Server Runtime Memory Requirement)+XCP*(Memory Required for each Content Provider Name Cache)+YF*(Memory Required for each File Name Cache)+(1+XCP+YF)* (Size of VNODE tree)+ZU*N* (Block Size)

Content Publishing and Management and Other System-Related Tools

The Content Management Applications are suite of tools that allow: (1) the owner of an SCDN (i.e., a service provider) to manage content provider accounts and (2) the content providers to manage their files in the SCDN. The tools access and update data distributed throughout the SCDN. Content Management Applications cause data or request packets to be routed to the appropriate SCDN station(s).

Content Management Applications execute in a Client/Server paradigm, i.e., a client running on a Content Provider Client System is used to invoke a Content Management Application that executes either on: (1) a Content Management Server (CMS); (2) a combination of the CMS and the Content Provider Client System using program objects such as applets and servlets; or any combination thereof.

There may be one or more CMSs in an SCDN. In addition to typical resources such as processor and memory, each CMS has its own local storage devices on which various content management related databases are stored.

Each Content Provider uses a specific CMS. The service provider assigns the CMS used by a Content Provider to a specific Station. What this means is that the assigned Station processes the CMS requests that result from the execution of the Content Management Applications by that Content Provider. In one embodiment, one of the DSs in the assigned station's DSC is selected by its load balancer to process the CMS's request. In addition to data related to Content Management Applications being stored on the CMS's local storage devices, other such data is selectively stored in either the station's Storage System or the station's Control Unit's local storage devices.

Each Content Provider may be assigned to only one CMS; however, more than one Content Provider may be assigned to the same CMS. Furthermore, a CMS may only be assigned to a Station where the Content Provider can upload files into the SCDN. When a Content Provider is assigned to a CMS, the CMS propagates the Content Provider information and the IP address of the CMS to the entire SCDN via its assigned DS using an FDP "info" packet, for example. A Content Usage Statistics Rollup Client (a component of the associated station's Resource Management Subsystem) connects to the CMS to roll up storage and content usage information for each content provider. The Content Management Server also uses the FDP "info" packet to propagate changes in the Content Provider Data Table.

Various Content Management Applications are used for entering and managing content provider information, the content's meta information, and the actual content. Applications are also used to retrieve usage information and performance statistics of the storage system and content.

Content Management Application Tools

The Content Management Applications include tools that may be located on the CPC, the CMS, and the SCDN stations. These tools may be in the form of program objects, e.g., Java applets. Some typical tools are presented below with reference to FIG. 20.

The Content Provider Management Client is a tool that provides User Interface for content providers and operators to update content provider information that is stored in the Content Provider Table in the CMS system.

Content Provider Management Server is a tool that manages the Content Provider Data Table and sends information packets to the SCDN via a DS in its assigned station. The DS creates its own Content Provider Data Table in the station's Storage System.

The Content Management Client is a tool that provides a User Interface for content providers to upload and delete their content, check storage usage, reserve storage, check content usage, etc.

The Content Management Server is a tool that acts as a bridge between the Content Management Client tool and the distribution server. It communicates with a DS in its assigned station using the FDP protocol (e.g., using the "put", "distribute", and "clean" commands). When the Content Management Client tool uploads a new file, the Content Management Server tool distributes (i.e., injects) the file into the SCDN via its assigned DS using FDP "put" "distribute" packets. Content Management Server saves content provider information, and content distribution criteria in its database. While content is distributed to the SCDN, the DSs involved in processing the distribution request store information related to the files and their constituent portions in the File Distribution Criteria Database and the File Metadata Database. The files and their constituent blocks are stored in the content repository distributed in the SCDN, also by DS involved in processing the request. The Content Management Server uses the FDP "clean" packet to remove a file from an SCDN. When a DS in the SCDN receives a "clean" packet, it removes the relevant information from File Distribution Criteria Database, File Metadata Database, and the actual content blocks from the content repository.

The Content Usage Statistic Rollup Client is a tool that is implemented in the Control Unit of every Station. It forwards the content usage information from the History and Statistics Repository to the Content Usage Statistic Rollup Server tool at the CMS system, where the content provider is assigned. The Content Usage Statistic Rollup Server tool receives usage and statistic data and saves the data into Usage and Statistic Database.

The assigned station's Control Unit's Storage Management Subsystem periodically forwards the content provider storage usage from the content data repository to the Content Provider Storage tool agents. A Content Provider Storage tool agent only receives storage usage of the content providers assigned to its Content Management Server, it stores the storage usage data into the Content Provider Storage Usage Table.

A Billing tool and a Statistics tool are provided to export information from the Usage and Statistics Database and the Usage and Statistics Database so both service and content providers can customize invoice statements and other communications with their customers.

Illustration of the Database Contents

Figure 24:
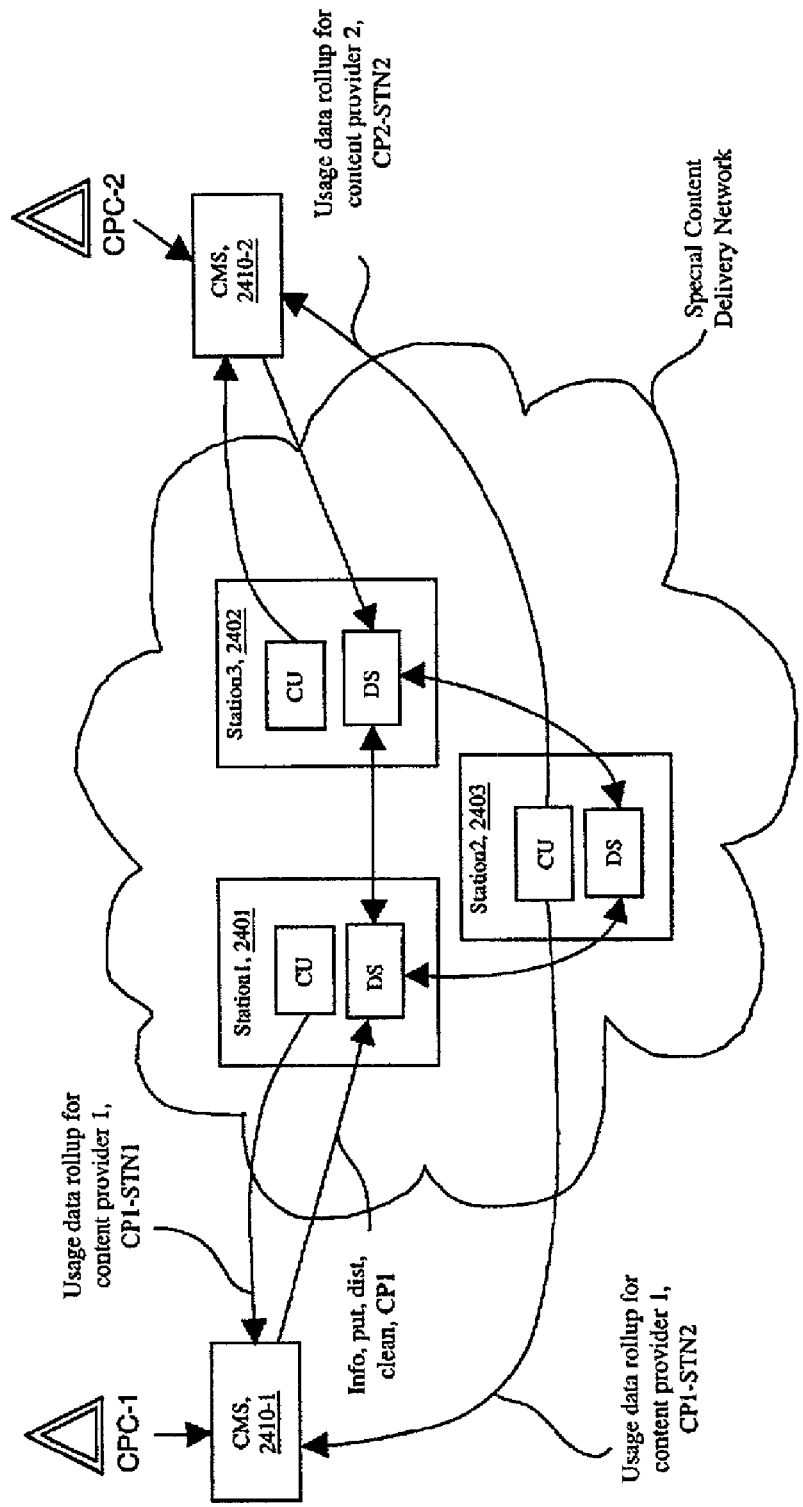
FIG. 24 is an illustration of the contents of the content management and usage database of FIG. 20.

FIG. 24 is an illustration of the contents of the content management and usage database of FIG. 20. Two CMSs are used in this illustration, CMS 2410 and CMS 2411, three stations, Station 2401, Station 2402, and Station 2403, and two content providers, CPC-1, and CPC-2. In this example, the following will be assumed:

| | |
|---|---|
| 1 | CMS 2410 is assigned to Station 2401 |
| 2 | CMS 2411 is assigned to Station 2403. |
| 3 | CPC-1 is assigned to CMS 2410 |
| 4 | CPC-2 is assigned to CMS 2411 |
| 5 | CPC-1 owns Content C1 (hereinafter simply referred to as C1) |
| 6 | CPC-2 owns Content C2 (hereinafter simply referred to as C2) |
| 7 | C1 has been distributed to Station 2401 and Station 2402 |
| 8 | C2 has been distributed to Station 2403 and Station 2402. |

Given these assumptions, in this example, for CMS 2410, we have:

| | |
|---|---|
| 1 | Content Provider Database includes CPC-1 |
| 2 | Content Provider Usage Database includes storage usage of CPC-1 at Station 2401, Station 2402, and Station 2403 |
| 3 | File Distribution Criteria Database includes Distribution Criteria of C1 |
| 4 | Content Usage and Statistics Database includes C1's usage information from Station 2401, Station 2402, and Station 2403 |
| 5 | Since C1 is not distributed to Station 2403, there will be no record from Station 2403 |

For CMS 2411, we have:

| | |
|---|---|
| 1 | Content Provider Database includes CPC-2 |
| 2 | Content Provider Usage Database includes storage usage of CPC-2 at Station 2401, Station 2402, and Station 2403 |
| 3 | File Distribution Criteria Database includes Distribution Criteria of C2 |
| 4 | Content Usage and Statistics Database includes C2's usage information from Station 2401, Station 2402, and Station 2403 |
| 5 | Since C2 is not distributed to Station 2401, there will be no record from Station 2401 |

For Station 2410, we have:

| | |
|---|---|
| 1 | Content Provider Database includes CPC-1 and CPC-2 because content provider data is replicated to the entire SCDN |
| 2 | Content Provider Usage Database includes storage usage of CPC-1 and CPC-2 at Station 2401 |
| 3 | File Distribution Criteria Database includes Distribution Criteria of C1 |
| 4 | File Metadata Database includes C1's file metadata |
| 5 | Data Blocks includes C1's content |
| 6 | Content Usage and Statistics Database includes C1's usage information at Station 2401 |

For Station 2402, we have:

| | |
|---|---|
| 1 | Content Provider Database includes CPC-1 and CPC-2 |
| 2 | Content Provider Usage Database includes storage usage of CPC-1 and CPC-2 at Station 2402 |
| 3 | File Distribution Criteria Database includes Distribution Criteria of C1 and C2 |
| 4 | File Metadata Database includes C1 and C2's file metadata |
| 5 | Data Blocks includes C1 and C2's content |
| 6 | Content Usage and Statistics Database includes C1 and C2's usage information at Station 2402 |

For Station 2403, we have:

| | |
|---|---|
| 1 | Content Provider Database includes CPC-1 and CPC-2 |
| 2 | Content Provider Usage Database includes storage usage of CPC-1 and CPC-2 at Station 2403 |
| 3 | File Distribution Criteria Database includes Distribution Criteria of C2 |
| 4 | File Metadata Database includes C2's file metadata |
| 5 | Data Blocks includes C2's content |
| 6 | Content Usage and Statistics Database includes C2's usage information at Station 2403 |

Out of Band Signaling and Control

In one embodiment of the invention, plug-in modules are provided at each Distribution Node for the Application Servers to use and locate the "Out-of-Band" signals. The plug-in modules can invoke remote control modules for access control and value_added services. By providing such an infrastructure, the distribution network allows content providers to control their content at the edge of the network, and provide dynamic value added services.

Access control includes authentication and licensing by region, number of concurrent access, by user, etc. Value added services include dynamic localized and targeted advertisement insertion, dynamic preview and trailer insertions, and more.

The "Out-Of-Band" signal also serves as a notification to content providers.

The invention claimed is:

1. A method comprising:

distributing content to multiple nodes in a network having a plurality of nodes arranged in the form of a virtual tree, wherein each node in the virtual tree stores a portion of the content and is configured to appear as if all of the content is stored locally at the node;

distributing the content as one or more incoming tasks to one or more available servers in a first network node having a plurality of servers capable of processing the one or more incoming tasks; and maintaining a list of tasks including all tasks from the one or more incoming tasks distributed for each of the one or more available servers.

2. The method of claim 1, further comprising redistributing all tasks of a first server of the plurality of servers that becomes designated as an unavailable server among the one or more available servers.

3. The method of claim 2, wherein each of one or more available servers monitor a heartbeat of other available servers and uses the heartbeat to determine when at least one server of the plurality of servers becomes designated as the unavailable server.

4. The method of claim 1, wherein the all tasks are treated as jobs to be executed and the list of tasks comprises a job queue.

5. The method of claim 1, wherein the one or more available servers vote for a master server at power up.

6. The method of claim 1, wherein each one of the one or more available servers registers a heartbeat in a database.

7. The method of claim 5, wherein if the unavailable server is the master server, the one or more available servers vote for a new master server.

8. The method of claim 5, wherein the distributing the all tasks from the list of tasks is performed by the master server.

9. A method comprising:
distributing content to multiple nodes in a network having a plurality of nodes arranged in the form of a virtual tree, wherein each node in the virtual tree stores a portion of the content and is configured to appear as if all of the content is stored locally at the node;
distributing the content as one or more incoming tasks to one or more available servers in a first network node having a plurality of servers capable of processing the one or more incoming tasks, wherein the one or more available servers comprises a functioning subset of the plurality of servers; and
maintaining a job queue including all tasks from the one or more incoming tasks distributed to the one or more available servers; and
the master server redistributing all jobs from the job queue of each of the plurality of servers that becomes designated as an unavailable server to the one or more available servers.

10. The method of claim 9, further comprising selecting a master server amongst the plurality of servers in the first network node.

11. The method of claim 10, wherein selecting the master server is performed by the plurality of servers.

12. The method of claim 9, further comprising:
each of the one or more available servers monitoring a heartbeat of other available servers; and
using the heartbeat to determine when at least one server of the plurality of servers becomes designated as the unavailable server.

13. A computer program product comprising: a computer usable medium comprising computer readable code for managing a plurality of servers in a content delivery network, the computer readable program code configured to:
distribute content to multiple nodes in a network having a plurality of nodes arranged in the form of a virtual tree, wherein each node in the virtual tree stores a portion of the content and is configured to appear as if all of the content is stored locally at the node;
distribute the content as one or more incoming tasks to one or more available servers in a first network node having a plurality of servers capable of processing the one or more incoming tasks; and
maintain a list of tasks including all tasks from the one or more incoming tasks distributed for each of the one or more available servers.

14. The computer readable program code of claim 13 further configured to redistribute all tasks of a first server of the plurality of servers that becomes designated as an unavailable server among the one or more available servers.

15. The computer readable program code of claim 14, wherein each of one or more available servers monitor a heartbeat of other available servers and uses the heartbeat to determine when at least one server of the plurality of servers becomes designated as the unavailable server.

16. The computer readable program code of claim 13, wherein the all tasks are treated as jobs to be executed and the list of tasks comprises a job queue.

17. The computer readable program code of claim 13, wherein the one or more available servers vote for a master server at power up.

18. The computer readable program code of claim 13, wherein each one of the one or more available servers registers a heartbeat in a database.

19. The computer readable program code of claim 18, wherein if the unavailable server is the master server, the one or more available servers vote for a new master server.

20. The computer readable program code of claim 18, wherein the distributing the all tasks from the list of tasks is performed by the master server.

21. A network comprising:
a first network node; and
a second network node, wherein the first and second network nodes are arranged in the form of a virtual tree, store a portion of content and are configured to appear as if all of the content is stored locally at each node, wherein each node includes:
a plurality of servers capable of performing identical tasks;
a load balancer to distribute one or more incoming tasks to one or more available servers in the network node, wherein, each of the plurality of servers maintain a list of tasks including the distributed incoming tasks;
a master server to redistribute to the one or more available servers all tasks from the list of tasks of a server of the plurality of servers that becomes designated as an unavailable server.

22. The network of claim 21, wherein the load balancer redistributes all tasks of a first server of the plurality of servers that becomes designated as an unavailable server among the one or more available servers.

23. The network of claim 22, wherein each of one or more available servers monitor a heartbeat of other available servers and uses the heartbeat to determine when at least one server of the plurality of servers becomes designated as the unavailable server.

24. The network of claim 21, wherein the tasks are treated as jobs to be executed and the list of tasks comprises a job queue.

25. The network of claim 21, wherein the one or more available servers vote for the master server at power up.

* * * * *